(12) United States Patent
Kim et al.

(10) Patent No.: US 7,130,358 B2
(45) Date of Patent: Oct. 31, 2006

(54) METHOD AND APPARATUS FOR REARRANGING CODEWORD SEQUENCE IN A COMMUNICATION SYSTEM

(75) Inventors: Min-Goo Kim, Suwon-shi (KR); Sang-Hyuck Ha, Suwon-shi (KR); Seong-Woo Ahn, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 929 days.

(21) Appl. No.: 10/166,480

(22) Filed: Jun. 10, 2002

(65) Prior Publication Data
US 2002/0186784 A1 Dec. 12, 2002

(30) Foreign Application Priority Data
Jun. 9, 2001 (KR) .............................. P2001-32355

(51) Int. Cl.
H04L 27/36 (2006.01)
H04L 27/20 (2006.01)
H04L 1/18 (2006.01)
H04Q 7/20 (2006.01)

(52) U.S. Cl. .................. 375/298; 375/308; 455/456; 714/749

(58) Field of Classification Search ............... 375/298, 375/261, 341; 455/456; 714/749
See application file for complete search history.

(56) References Cited

U.S. PATENT DOCUMENTS

| | | | | |
|---|---|---|---|---|
| 5,903,844 A | * | 5/1999 | Bruckert et al. | 455/456.2 |
| 6,198,582 B1 | * | 3/2001 | Tsang et al. | 360/40 |
| 6,347,120 B1 | * | 2/2002 | Sakoda | 375/259 |
| 6,642,864 B1 | * | 11/2003 | Djupsjobacka et al. | 341/100 |
| 6,704,368 B1 | * | 3/2004 | Nefedov | 375/265 |
| 6,975,665 B1 | * | 12/2005 | McCorkle | 375/130 |
| 2004/0049725 A1 | * | 3/2004 | Golitschek et al. | 714/749 |
| 2005/0047522 A1 | * | 3/2005 | Kim et al. | 375/298 |

FOREIGN PATENT DOCUMENTS

| | | |
|---|---|---|
| EP | 0 485 105 | 10/1991 |
| EP | 1 043 858 | 10/2000 |
| EP | 1 189 380 | 3/2002 |
| EP | 1 204 256 | 5/2002 |
| EP | 1 235 404 | 8/2002 |
| JP | 6-6399 | 1/1994 |
| JP | 11-298371 | 10/1999 |

(Continued)

OTHER PUBLICATIONS

Combined Search and Examination Report dated Dec. 16, 2002 issued in a counterpart application, namely, Appln. No. GB 0213196.9.

(Continued)

*Primary Examiner*—Khai Tran
*Assistant Examiner*—Cicely Ware
(74) *Attorney, Agent, or Firm*—Dilworth & Barrese LLP

(57) ABSTRACT

Disclosed is provided a method and apparatus for mapping a stream of bits output from an encoder to a stream of bits for $2^m$-ary modulation. The method and apparatus divides the stream of bits from the encoder into a first period and a second period. The first period includes bits with higher priority in the stream of the bits output from the encoder, and the second period includes bits with lower priority. The method and apparatus maps the bits existing in the first period to bit positions with higher reliability in a stream of m bits representing each of the bits for $2^m$-ary modulation, and maps the bits existing in the second period to bit positions with lower reliability in the stream of m bits.

48 Claims, 33 Drawing Sheets

FOREIGN PATENT DOCUMENTS

| | | |
|---|---|---|
| JP | 2000-013310 | 1/2000 |
| WO | WO 00/74296 | 12/2000 |

OTHER PUBLICATIONS

T.H. Liew et al., "Comparative Study of Space Time Block Codes and Various Concatenated Turbo Coding Schemes", 2000 IEEE.

European Search Report dated Feb. 19, 2003, issued in a counterpart application, namely, Appln. No. 02012444.2.

Andrej Stefanov et al., "Turbo Coded Modulation for Systems with Transmit and Receive Antenna Diversity," 1999 IEEE, Global Telecommunications Conference—Globecom '99.

Papke et al., "Combined Multilevel Turbo-Code with MR-Modulation", 1995 IEEE, pp. 668-672.

Samsung Electronics Co., "Enhanced Symbol Mapping Method for the Modulation of Turbo-Coded Bits Based on Bit Priority", 3GPP TSG RAN WG1/WG2 Joint Meeting on HSDPA, Apr. 5-6, 2001.

* cited by examiner $S_5S_4S_3S_2S_1S_0$

|  |  |  |  |  |  |  |  |
|---|---|---|---|---|---|---|---|
| 101111 | 101101 | 100101 | 100111 | 000111 | 000101 | 001101 | 001111 |
| 101110 | 101100 | 100100 | 100110 | 000110 | 000100 | 001100 | 001110 |
| 101010 | 101000 | 100000 | 100010 | 000010 | 000000 | 001000 | 001010 |
| 101011 | 101001 | 100001 | 100011 | 000011 | 000001 | 001001 | 001011 |
| 111011 | 111001 | 110001 | 110011 | 010011 | 010001 | 011001 | 011011 |
| 111010 | 111000 | 110000 | 110010 | 010010 | 010000 | 011000 | 011010 |
| 111110 | 111100 | 110100 | 110110 | 010110 | 010100 | 011100 | 011110 |
| 111111 | 111101 | 110101 | 110111 | 010111 | 010101 | 011101 | 011111 |

FIG.5

METHOD AND APPARATUS FOR REARRANGING CODEWORD SEQUENCE IN A COMMUNICATION SYSTEM

This application claims priority to an application entitled "Method and Apparatus for Rearranging Codeword Sequence in a Communication System" filed in the Korean Industrial Property Office on Jun. 9, 2001 and assigned Ser. No. 2001-32355, the contents of which are incorporated herein by reference.

BACKGROUND OF THE INVENTION

1. Field of the Invention

The present invention relates generally to a communication system using multi-level modulation/demodulation, and in particular, to a method and apparatus for rearranging a bit stream of a codeword sequence before modulation, and arranging an output of a demodulator in the form of an original codeword sequence.

2. Description of the Related Art

An IMT-2000 (International Mobile Telecommunication-2000) system or a UMTS (Universal Mobile Telecommunication System) system, a typical CDMA (Code Division Multiple Access) mobile communication system, uses multi-level modulation/demodulation in order to increase spectral efficiency. Here, the "multi-level modulation" refers to 8PSK (8-ary Phase Shift Keying), 16QAM (16-ary Quadrature Amplitude Modulation) and 64QAM modulations as $2^m$-ary modulation having a higher modulation level than QPSK (Quadrature Phase Shift Keying) modulation. When generating modulated bits using the multi-level modulation, there occurs a difference in reliability between a plurality of bits constituting each modulated bit. Due to the reliability difference, the respective bits have different average bit error rates.

Meanwhile, when an encoder comprised of a plurality of system encoders, such as a turbo encoder, is used as a channel encoder, codeword bits from the system encoders are divided into a systematic part, a stream of bits with higher priority (importance), and a parity part, a stream of bits with lower priority. In the case where one information sequence is input to a plurality of constituent encoders, a decrease in a bit error rate of bits belonging to the systematic part of the codeword bits may result in a decrease in an average bit error rate and an average packet error rate of an information sequence output from a channel decoder. That is, when the codeword bits belonging to the systematic part with higher priority assuredly have higher reliability than the codeword bits belonging to the parity part with lower priority, it is possible to expect a performance improvement in terms of an error rate of an information sequence generated after decoding.

SUMMARY OF THE INVENTION

It is, therefore, an object of the present invention to provide a method and apparatus for rearranging bits of a codeword sequence output from a channel encoder before modulation, such that bits belonging to a systematic part with higher priority are arranged in bit positions with higher reliability of a modulated bit, in a communication system using multi-level modulation.

It is another object of the present invention to provide a method and apparatus for rearranging bits of a codeword sequence output from a channel encoder before modulation, such that bits belonging to a systematic part with higher priority are arranged in bit positions with higher reliability of a modulated bit, and arranging a demodulated bit in the order of an original codeword sequence, in a communication system using multi-level modulation.

It is further another object of the present invention to provide a method and apparatus for improving an average bit error rate and an average packet error rate of an information sequence generated after decoding, in a communication system.

To achieve the above and other objects, there is provided a method and apparatus for mapping a stream of bits output from an encoder to a stream of bits for $2^m$-ary modulation. The method and apparatus divides the stream of bits from the encoder into a first period and a second period. The first period includes bits with higher priority in the stream of the bits output from the encoder, and the second period includes bits with lower priority. The method and apparatus maps the bits existing in the first period to bit positions with higher reliability in a stream of m bits representing each of the bits for $2^m$-ary modulation, and maps the bits existing in the second period to bit positions with lower reliability in the stream of m bits.

BRIEF DESCRIPTION OF THE DRAWINGS

The above and other objects, features and advantages of the present invention will become more apparent from the following detailed description when taken in conjunction with the accompanying drawings in which:

FIG. 5 illustrates a signal constellation diagram for 64QAM (64-ary Quadrature Amplitude Modulation);

DETAILED DESCRIPTION OF THE PREFERRED EMBODIMENT

Figure 1:
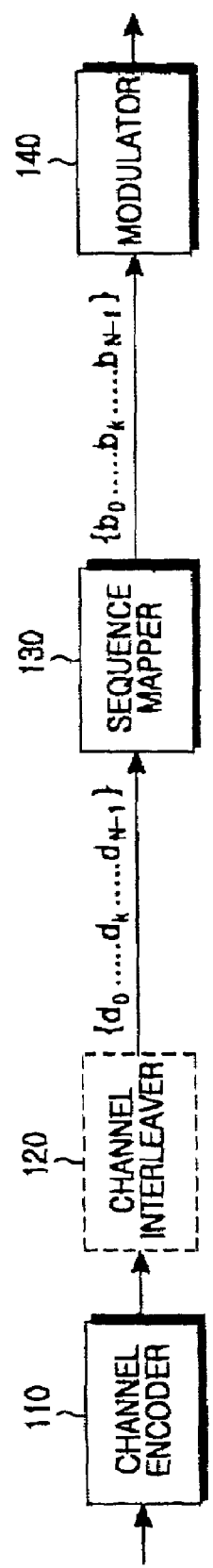
FIG. 1 illustrates a structure of a transmission apparatus including a sequence mapper for rearranging a codeword sequence according to an embodiment of the present invention.

A preferred embodiment of the present invention will be described herein below with reference to the accompanying drawings. In the following description, well-known functions or constructions are not described in detail since they would obscure the invention in unnecessary detail.

The present invention provides (1) a method for rearranging bits of a codeword sequence output from a channel encoder before modulation such that the bits with higher reliability, such as the bits belonging to a systematic part, are arranged in positions with higher reliability among the bits constituting a modulated bit, in a communication system using multi-level modulation/demodulation such as 8PSK, 16QAM and 64QAM having a higher modulation level than QPSK, (2) a method for arranging output values of a demodulator in original positions of the codeword sequence, and (3) an apparatus for performing the methods. If a channel interleaver is not used in the following stage of the channel encoder or if, though a channel interleaver is used, an interleaved sequence can be divided into a systematic part with higher priority and a parity part with lower priority, then the present invention can improve system performance by utilizing a method for rearranging output bits of the channel encoder or the channel interleaver before modulation by taking into consideration a reliability difference between bits in the multi-level modulation/demodulation, and by arranging output values of a demodulator in the original positions before channel decoding or channel deinterleaving. Herein, first, a description will be made of a transmission apparatus for rearranging a codeword sequence according to an embodiment of the present invention, and a reception apparatus corresponding to the transmission apparatus. Next, an operation of rearranging a codeword sequence according to different embodiments of the present invention will be described. The description of the codeword sequence rearranging operation will be made from two different perspectives. Embodiments A-1, A-2, A-3, B-1, B-2 and B-3 based on a first perspective demonstrate how the codeword sequence rearranging operation is performed from the perspective of the codeword sequences. Embodiments C-1, C-2, C-3, D-1, D-2 and D-3 based on a second perspective demonstrate how the codeword sequence rearranging operation is performed from the perspective of the modulated bits. The embodiments based on the first perspective will be described on the assumption that the codeword sequence has N bits, and the embodiments based on the second perspective will be described on the assumption that the number of modulated bits is N. Although the codeword sequence rearranging operation according to the present invention will be described from two different perspectives, it should be noted that both operations are substantially identical to each other. Finally, performance of the codeword sequence rearranging operation according to the present invention will be analyzed.

FIG. 1 illustrates a structure of a transmission apparatus including a sequence mapper for rearranging a codeword sequence according to an embodiment of the present invention. Referring to FIG. 1, a channel encoder 110 encodes an input information bit stream, and outputs a codeword sequence comprised of a plurality of bit streams. For example, a turbo encoder can be used as the channel encoder 110. A channel interleaver 120 interleaves the codeword sequence output from the channel encoder 110, and outputs an interleaved codeword sequence. A sequence mapper 130, a particular element according to the present invention, rearranges the codeword sequence for modulation according to different embodiments of the present invention. A modulator 140 modulates the codeword sequence rearranged by the sequence mapper 130 according to a corresponding modulation technique, and generates modulated bits. The modulator 140 is a multi-level modulator using the multi-level ($2^m$-ary) modulation such as 8PSK, 16QAM and 64QAM. A codeword sequence rearranging operation by the sequence mapper 130 can be determined depending on the modulation technique of the modulator 140. That is, the sequence mapper 130 performs the codeword sequence rearranging operation according to one of the 8PSK, 16QAM and 64QAM modulations, used by the modulator 140.

Figure 2:
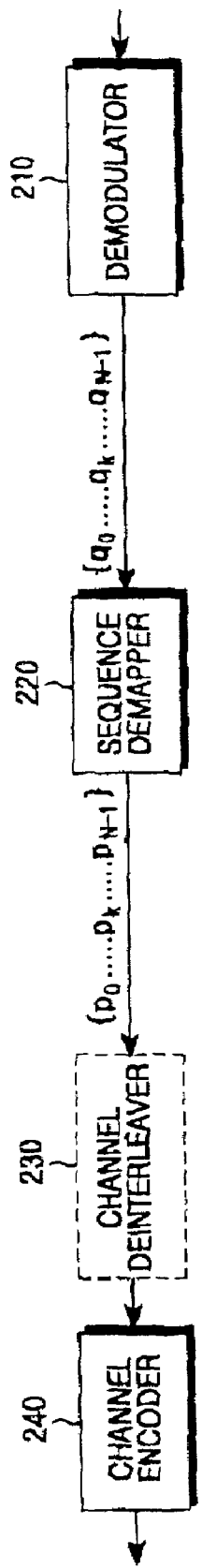
FIG. 2 illustrates a structure of a reception apparatus including a sequence demapper according to an embodiment of the present invention.

FIG. 2 illustrates a structure of a reception apparatus including a sequence demapper according to an embodiment of the present invention. The reception apparatus, corresponding to the transmission apparatus of FIG. 1, includes elements corresponding to the elements of the transmission apparatus and performing reverse operations of the corresponding elements of the transmitter.

Referring to FIG. 2, a demodulator 210, an element corresponding to the modulator 140, demodulates received information and outputs a demodulated bit. A sequence demapper 220, an element corresponding to the sequence mapper 130, arranges the demodulated bit from the demodulator 210 in the order of the original codeword sequence before being rearranged by the sequence mapper 130. A channel deinterleaver 230, an element corresponding to the channel interleaver 120, deinterleaves the codeword sequence from the sequence demapper 220. A channel decoder 240, an element corresponding to the channel encoder 110, decodes the output of the channel deinterleaver 230. A turbo decoder can be used as the channel decoder 240.

Before a detailed description of the present invention, reference will be made to how the sequence mapper 130 according to the present invention maps (or constellates) the input codeword sequence according to the modulation techniques. The codeword sequence may be either a codeword sequence directly output from the channel encoder 110 of FIG. 1, or a codeword sequence interleaved by the channel interleaver 120 after being encoded by the channel interleaver 110 as illustrate in FIG. 1. Therefore, the term "codeword sequence" as used herein refers to a codeword sequence output from the channel encoder 110, or a codeword sequence interleaved by the channel interleaver 120 after being encoded by the channel interleaver 110.

During modulation, the codeword sequence output from the channel encoder 110 is divided by m bits, and then constellated to a specific signal point among $M=2^m$ signal points according to, for example, Gray coding rule. This can be expressed by $$s_{m-1}s_{m-2} \ldots s_0 \overset{f}{\to} I, Q \qquad (1)$$

In Equation (1), $s_i$ (i=0,1, ... ,m−1) represents an $(i+1)^{th}$ bit of the codeword sequence output from the channel encoder, constellated to one modulated bit. Further, I and Q represent an in-phase component and a quadrature-phase component of the corresponding modulated bit, respectively. In the case of 8PSK modulation, m=3. In the case of 16QAM and 64QAM modulations, m=4 and 6, respectively.

In the multi-level modulation, reliabilities between bits constituting one modulated bit are different from one another. This is because error probabilities due to a distance difference up to a region where each bit value of the modulated bit constellated to a specific position on the I-Q plane can be inverted by noises that are different from one another. Due to this phenomenon, LLRs (Log Likelihood Ratios) of the respective bits have different values, causing a reduction in performance of the channel decoder that expects soft values for the bits having the same error rate.

Figure 3:
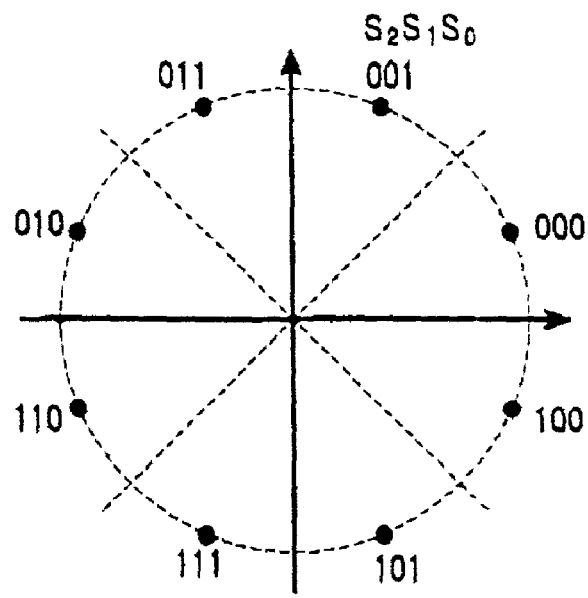
FIG. 3 illustrates a signal constellation diagram for 8PSK (8-ary Phase Shift Keying) modulation.
Figure 4:
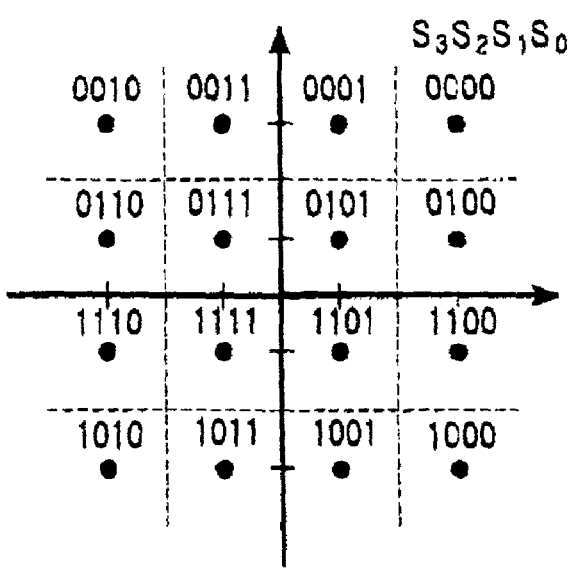
FIG. 4 illustrates a signal constellation diagram for 16QAM (16-ary Quadrature Amplitude Modulation)

In the case of 8PSK, 2 of 3 bits constituting one modulated bit have the same reliability, whereas the remaining one bit has lower reliability than the other bits. For example, when a signal constellation diagram for 8PSK of FIG. 3 is applied, a second bit $s_1$ and a third bit $s_2$ among the 3 bits have higher reliability than a first bit $s_0$. In the case of 16QAM, 2 of 4 bits constituting one modulated bit have higher reliability than the remaining 2 bits. For example, when a signal constellation diagram for 16QAM of FIG. 4 is applied, a second bit $s_1$ and a fourth bit $s_3$ among the 4 bits have higher reliability than a first bit $s_0$ and a third bit $s_2$. In the case of 64QAM, 6 bits have different reliabilities in pairs. For example, when a signal constellation diagram for 64QAM of FIG. 5 is applied, a third bit $s_2$ and a sixth bit $s_5$ among the 6 bits have higher reliability than a second bit $s_1$ and a fifth bit $s_4$, and a first bit $s_0$ and a fourth bit $s_3$ have the lowest reliability. However, the bit positions having different reliabilities may depend on the signal constellation diagram applied.

First, a description will be made of an operation of rearranging bits of a codeword sequence output from a channel encoder or a channel interleaver before modulation.

Principle of Invention

A fundamental principle of rearrangement according to the present invention is to rearrange the codeword sequence output from the channel encoder or the channel interleaver such that as many bits with higher priority as possible, such as the codeword bits belonging to a systematic part, are arranged in the bit positions with higher reliability of the bits representing a modulated bit. Bit rearrangement on the codeword sequence to be performed before generation of the modulated bit can be differently applied depending on the form of power to be allocated to the codeword sequence, observing the above principle.

Embodiments Based on First Viewpoint

A description of the bit rearrangement operation according to embodiments of the present invention will be separately made for one case where power is uniformly allocated to the codeword sequence and another case where different power levels are allocated to the front part and the rear part of the codeword sequence. Further, a description of each case will be separately made for 8PSK, 16QAM and 64QAM. In the following description of the bit rearrangement operation, it will be assumed that one codeword sequence is comprised of N bits, and N is a multiple of 3 for 8PSK modulation, a multiple of 4 for 16QAM modulation, and a multiple of 6 for 64QAM modulation. In addition, the codeword sequence before rearrangement is represented by $\{d_0, d_1, \ldots, d_k, \ldots, d_{N-2}, d_{N-1}\}$, and the codeword sequence after rearrangement is represented by $\{b_0, b_1, \ldots, b_k, \ldots, b_{N-2}, b_{N-1}\}$. Moreover, it will be assumed that the codeword sequence before rearrangement, i.e., the output codeword sequence of the channel encoder or the channel interleaver is arranged in the order of the systematic part and the parity part. If the codeword sequence is not arranged in the order of the systematic part and the parity part, a separate straightforward pre-processing to achieve this ordering is performed first.

A. Power Being Uniformly Allocated to Codeword Sequence

Figure 6:
FIG. 6 illustrates a case where power is uniformly allocated to the codeword sequence.
Figure 6:

When the power is uniformly allocated to the codeword sequence, it is possible to achieve performance improvement in terms of an average packet error rate by utilizing the intact rearrangement principle. FIG. 6 illustrates a case where the power is uniformly allocated to the codeword sequence.

Embodiment A-1 (for 8PSK Modulation)

As mentioned before, 2 of 3 bits constituting one 8PSK-modulated bit have higher reliability than the remaining 1 bit. If it is assumed that the signal constellation diagram of FIG. 3 is used, a second bit $s_1$ and a third bit $s_2$ have higher reliability than a first bit $s_0$. In this case, an operation of rearranging the output codeword sequence of the channel encoder or the channel interleaver before modulation by the sequence mapper 130 of FIG. 1 is performed as follows.

1. For the bits in a first period, the sequence mapper 130 sequentially maps first to $\{(2/3)\times N\}^{th}$ bits to positions of a second bit $s_1$ and a third bit $s_2$ in each of (N/3) modulated bits.

2. For the bits in a second period, the sequence mapper 130 sequentially maps the remaining $\{(2/3)\times N+1\}^{th}$ to $N^{th}$ bits to a position of a first bit $s_0$ in each of (N/3) modulated bits.

Figure 9:
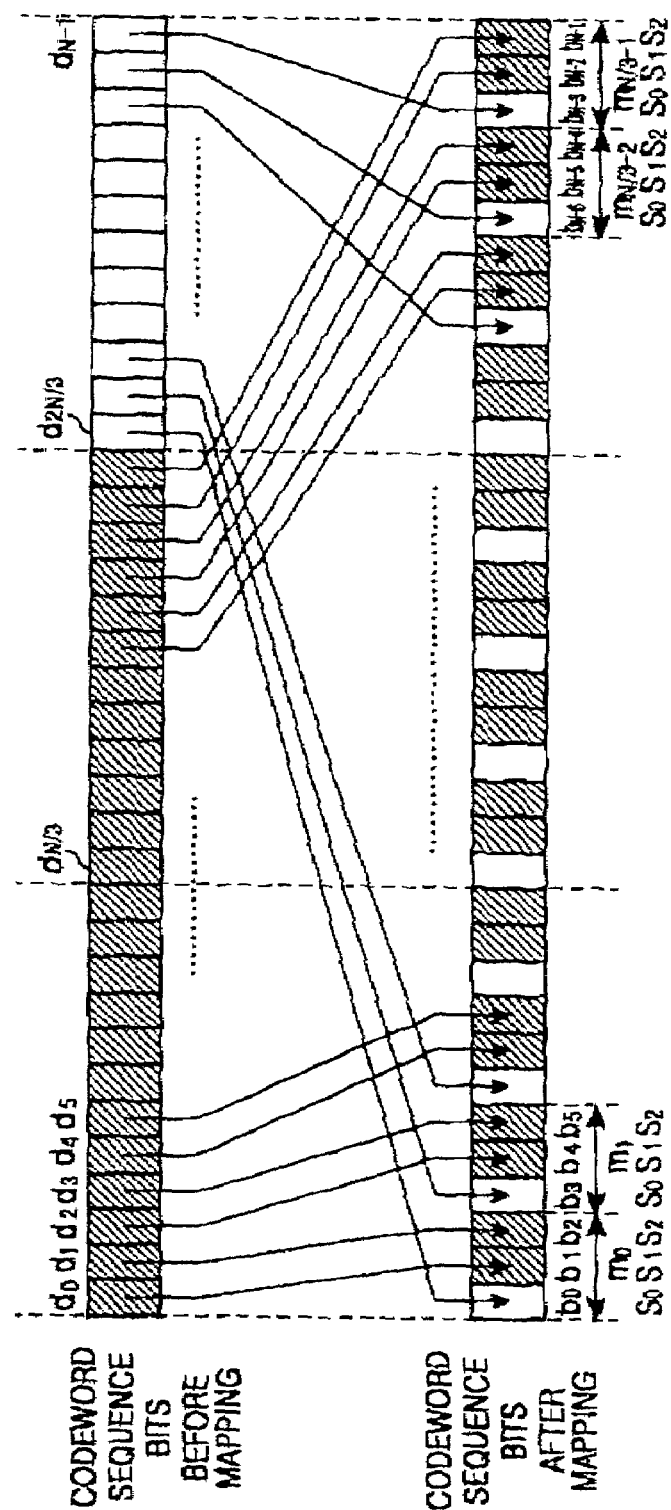
FIG. 9 illustrates a bit rearrangement operation for 8PSK modulation in which power is uniformly allocated to the codeword sequence according to an embodiment of the present invention.

These processes are summarized into Equations (2) and (3). The bits of the codeword sequence before rearrangement are rearranged as shown in FIG. 9.

$$b_{3\times\lfloor k/2 \rfloor+(k \bmod 2)+1} = d_k, \text{ for } k<(2/3)\times N \quad (2)$$

$$b_{(3\times k)-(2\times N)} = d_k, \text{ for } k\geq(2/3)\times N \quad (3)$$

In the Equations (2) and (3), 'A mod B' indicates a remainder obtained by dividing A by B, and $\lfloor X \rfloor$ indicates a maximum integer less than X.

FIG. 9 illustrates a bit rearrangement operation for 8PSK modulation in which power is uniformly allocated to the codeword sequence according to an embodiment of the present invention. Referring to FIG. 9, a codeword sequence comprised of an N-bit stream is divided into a first period and a second period. The first period is a duration between a first bit $d_0$ and a $\{(2/3)\times N\}^{th}$ bit $d_{2N/3-1}$ of the codeword sequence, and the second period is a duration between a $\{(2/3)\times N+1\}^{th}$ bit $d_{2N/3}$ and an $N^{th}$ bit $d_{N-1}$ of the codeword sequence. Here, the modulated bit is comprised of 3 bits, and the number of modulated bits corresponding to the codeword sequence is N/3.

A first bit $d_0$ in the first period of the codeword sequence is mapped to a second bit position $m_0, s_1$ (i.e. $b_1$) of a first modulated bit, and a second bit $d_1$ in the first period of the codeword sequence is mapped to a third bit position $m_0, s_2$ (i.e. $b_2$) of the first modulated bit. A third bit $d_2$ in the first period is mapped to a second bit position $m_1, s_1$ (i.e. $b_4$) of a second modulated bit, and a fourth bit $d_3$ in the first period is mapped to a third bit position $m_1, s_2$ (i.e. $b_5$) of the second modulated bit. A $\{(2/3)\times N-1\}^{th}$ bit $d_{2N/3-2}$ in the first period is mapped to a second bit position $m_{N/3-1}, s_1$ (i.e. $b_{N-2}$) of an $(N/3)^{th}$ modulated bit, the last modulated bit, and a $\{(2/3)\times N\}^{th}$ bit $d_{2N/3-1}$, the last bit in the first period is mapped to a third bit position $m_{N/3-1}, s_2$ (i.e. $b_{N-1}$) of the last modulated bit.

A $\{(2/3)\times N+1\}^{th}$ bit $d_{2N/3}$, a first bit in the second period is mapped to a first bit position $m_0, s_0$ (i.e. $b_0$) of the first modulated bit, and a $\{(2/3)\times N+2\}^{th}$ bit $d_{2N/3+1}$, a second bit in the second period is mapped to a first bit position $m_1, s_0$ of the second modulated bit. An $(N-1)^{th}$ bit $d_{N-2}$ in the second period is mapped to a first bit position $m_{N/3-2}, s_0$ (i.e. $b_{N-6}$) of an $\{N/3-1\}^{th}$ modulated bit, and an $N^{th}$ bit $d_{N-1}$, the last bit in the second period is mapped to a first bit position $m_{N/3-1}, s_0$ (i.e. $b_{N-3}$) of an $(N/3)^{th}$ modulated bit, the last modulated bit.

Figure 10:
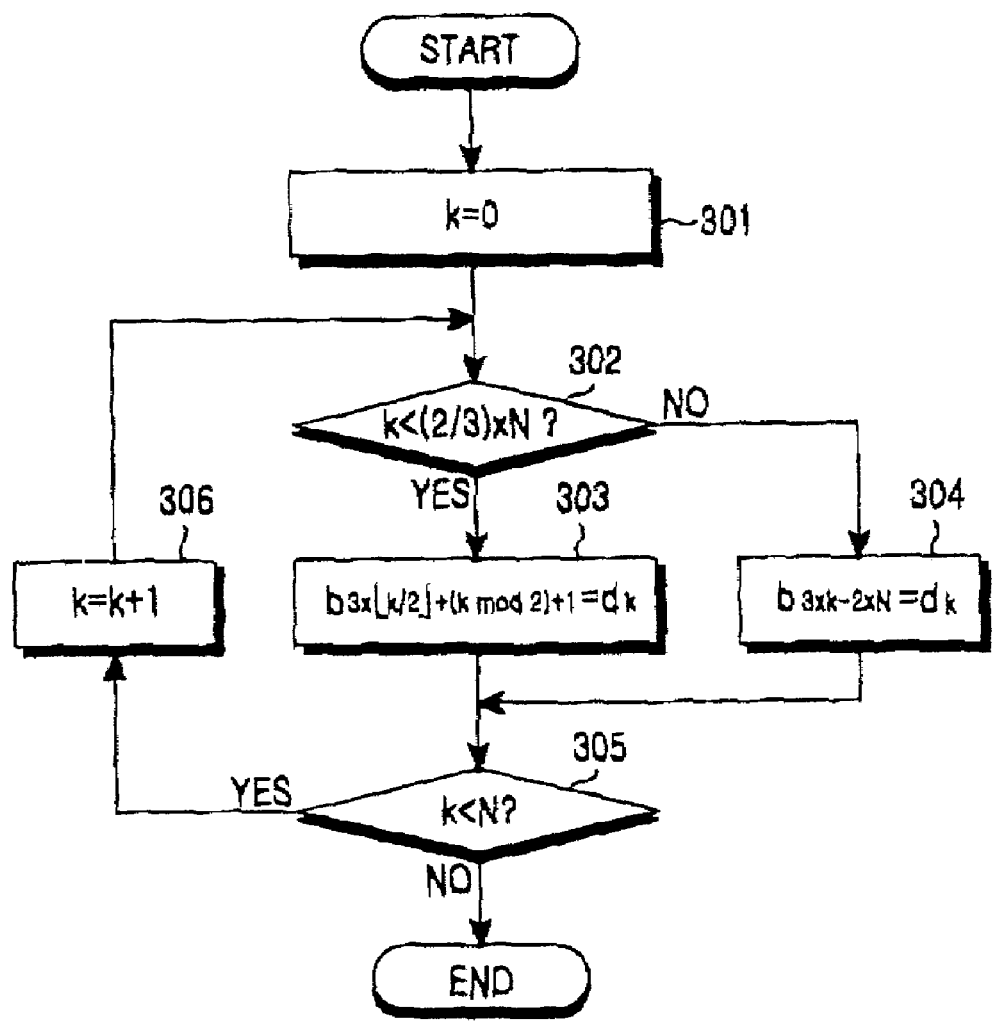
FIG. 10 illustrates a procedure for performing a bit rearrangement operation for 8PSK modulation in which power is uniformly allocated to the codeword sequence according to an embodiment of the present invention.

FIG. 10 illustrates a procedure for performing a bit rearrangement operation for 8PSK modulation in which power is uniformly allocated to the codeword sequence according to an embodiment of the present invention. This procedure is performed by the sequence mapper 130 of FIG. 1.

Referring to FIG. 10, the sequence mapper 130 sets k to zero (k=0) in step 301. The sequence mapper 130 determines in step 302 whether k is less than $\{(2/3)\times N\}$. If k is less than $\{(2/3)\times N\}$, the sequence mapper 130 performs an operation of step 303. Otherwise, the sequence mapper 130 performs an operation of step 304. In step 303, the sequence mapper 130 performs bit mapping on the codeword sequence in accordance with Equation (2). In step 304, the sequence mapper 130 performs bit mapping on the codeword sequence in accordance with Equation (3). The operations of steps 303 and 304 are repeatedly performed until it is determined in step 305 that the bit mapping has been completely performed on all the bits of the codeword sequence. That is, if it is determined in step 305 that k is less than N, the sequence mapper 130 increases k by 1 in step 306, and then returns to step 302.

Embodiment A-2 (for 16QAM Modulation)

As mentioned before, 2 of 4 bits constituting one 16QAM-modulated bit have higher reliability than the remaining 2 bits. If it is assumed that the signal constellation diagram of FIG. 4 is used, a second bit $s_1$ and a fourth bit $s_3$ have higher reliability than a first bit $s_0$ and a third bit $s_2$. In this case, an operation of rearranging the output codeword sequence of the channel encoder or the channel interleaver before modulation by the sequence mapper 130 is performed as follows.

1. For the bits in a first period, the sequence mapper 130 sequentially maps first to $\{(1/2)\times N\}^{th}$ bits to positions of a second bit $s_1$ and a fourth bit $s_3$ in each of (N/4) modulated bits.

2. For the bits in a second period, the sequence mapper 130 sequentially maps the remaining $\{(1/2)\times N+1\}^{th}$ to $N^{th}$ bits to positions of a first bit $s_0$ and a third bit $s_2$ in each of (N/4) modulated bits.

These processes are summarized into Equations (4) and (5). The bits of the codeword sequence before rearrangement are rearranged as shown in FIG. 11.

$$b_{(2\times k)-(0\times N)+1}=d_k, \text{ for } k<(1/2)\times N \quad (4)$$

$$b_{(2\times k)-(1\times N)+0}=d_k, \text{ for } k\geq(1/2)\times N \quad (5)$$

Figure 11:
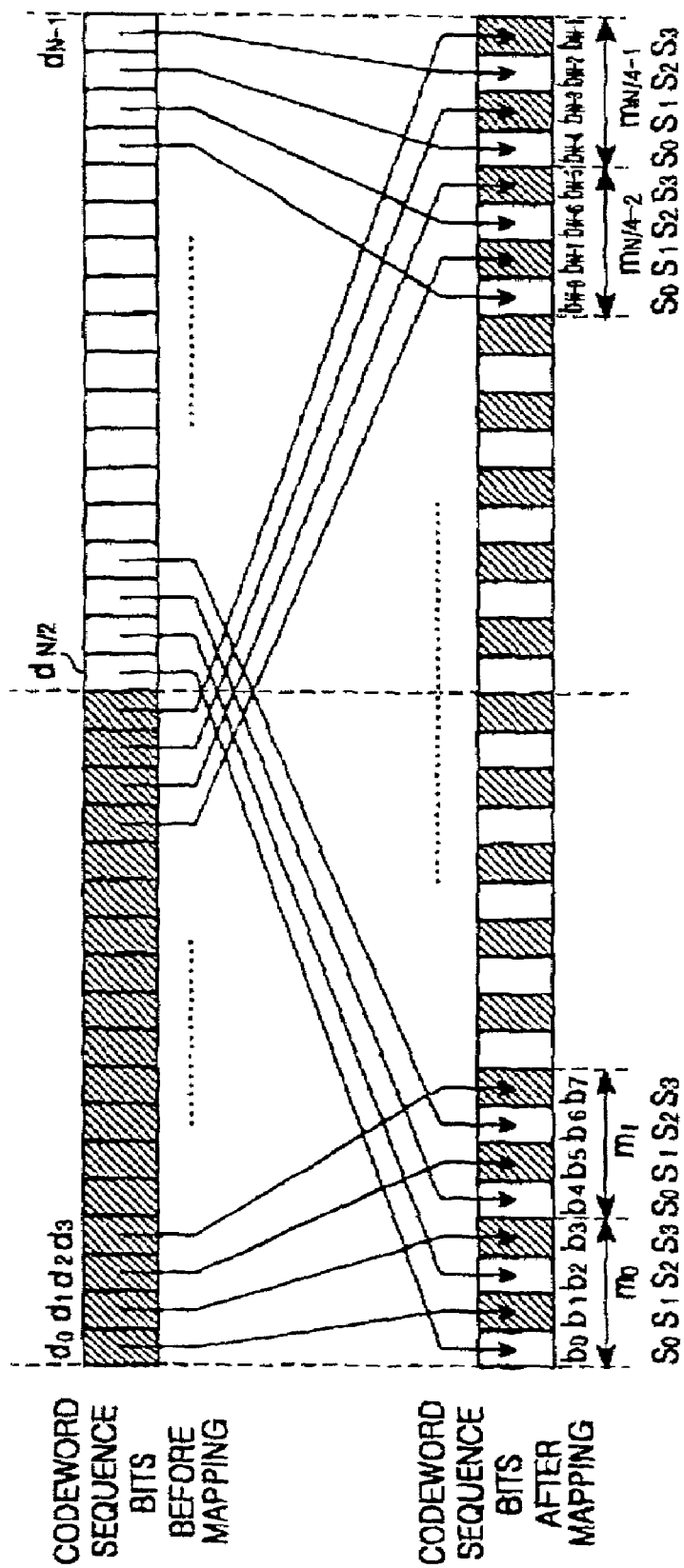
FIG. 11 illustrates a bit rearrangement operation for 16QAM modulation in which power is uniformly allocated to the codeword sequence according to an embodiment of the present invention.

FIG. 11 illustrates a bit rearrangement operation for 16QAM modulation in which power is uniformly allocated to the codeword sequence according to an embodiment of the present invention. Referring to FIG. 11, a codeword sequence comprised of an N-bit stream is divided into a first period and a second period. The first period is a duration between a first bit $d_0$ and a $\{(1/2)\times N\}^{th}$ bit $d_{N/2-1}$ of the codeword sequence, and the second period is a duration between a $\{(1/2)\times N+1\}^{th}$ bit $d_{N/2}$ and an $N^{th}$ bit $d_{N-1}$ of the codeword sequence. Here, the modulated bit is comprised of 4 bits, and the number of modulated bits corresponding to the codeword sequence is N/4.

A first bit $d_0$ in the first period of the codeword sequence is mapped to a second bit position $m_0,s_1$ (i.e. $b_1$) of a first modulated bit, and a second bit $d_1$ in the first period is mapped to a fourth bit position $m_0,s_3$ (i.e. $b_3$) of the first modulated bit. A third bit $d_2$ in the first period is mapped to a second bit position $m_1,s_1$ (i.e. $b_5$) of a second modulated bit, and a fourth bit $d_3$ in the first period is mapped to a fourth bit position $m_1,s_3$ (i.e. $b_7$) of the second modulated bit. A $\{(1/2)\times N-1\}^{th}$ bit $d_{N/2-2}$ in the first period is mapped to a second bit position $m_{N/4-1},s_1$ (i.e. $b_{N-3}$) of an $(N/4)^{th}$ modulated bit, the last modulated bit, and a $\{(1/2)\times N\}^{th}$ bit $d_{N/2-1}$, the last bit in the first period is mapped to a fourth bit position $m_{N/4-1},s_3$ (i.e. $b_{N-1}$) of the last modulated bit.

A $\{(1/2)\times N+1\}^{th}$ bit $d_{N/2}$, a first bit in the second period of the codeword sequence is mapped to a first bit position $m_0,s_0$ (i.e. $b_0$) of the first modulated bit, a $\{(1/2)\times N+2\}^{th}$ bit $d_{N/2+1}$, a second bit in the second period is mapped to a third bit position $m_0,s_2$ (i.e. $b_2$) of the first modulated bit. An $(N-1)^{th}$ bit $d_{N-2}$ in the second period is mapped to a first bit position $m_{N/4-1},s_0$ (i.e. $b_{N-4}$) of an $\{N/4\}^{th}$ modulated bit, the last modulated bit, and an $N^{th}$ bit $d_{N-1}$, the last bit in the second period is mapped to a third bit position $m_{N/4-1},s_2$ (i.e. $b_{N-2}$) of an $(N/4)^{th}$ modulated bit.

Figure 12:
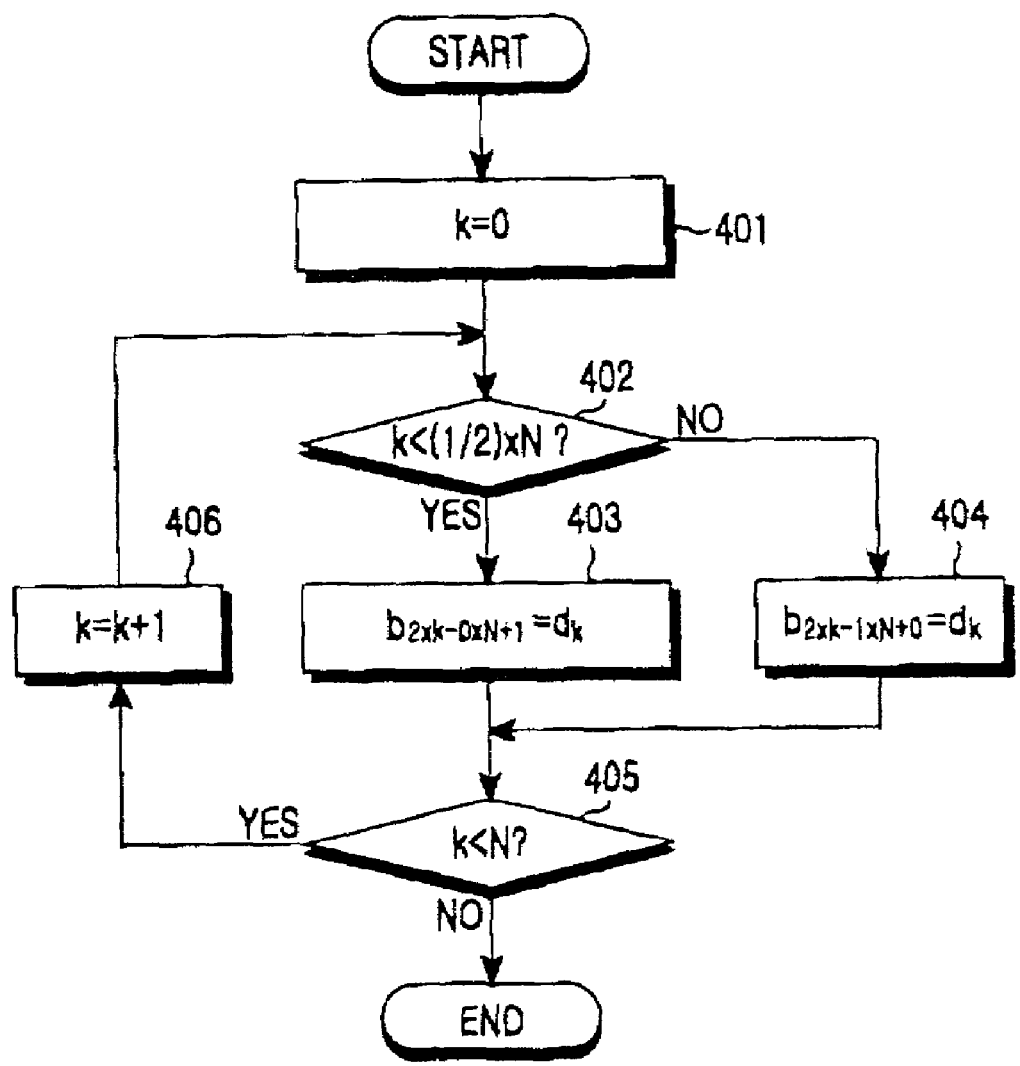
FIG. 12 illustrates a procedure for performing a bit rearrangement operation for 16QAM modulation in which power is uniformly allocated to the codeword sequence according to an embodiment of the present invention.

FIG. 12 illustrates a procedure for performing a bit rearrangement operation for 16QAM modulation in which power is uniformly allocated to the codeword sequence according to an embodiment of the present invention. This procedure is performed by the sequence mapper 130 of FIG. 1.

Referring to FIG. 12, the sequence mapper 130 sets k to zero (k=0) in step 401. The sequence mapper 130 determines in step 402 whether k is less than $\{(1/2)\times N\}$. If k is less than $\{(1/2)\times N\}$, the sequence mapper 130 performs an operation of step 403. Otherwise, the sequence mapper 130 performs an operation of step 404. In step 403, the sequence mapper 130 performs bit mapping on the codeword sequence in accordance with Equation (4). In step 404, the sequence mapper 130 performs bit mapping on the codeword sequence in accordance with Equation (5). The operations of steps 403 and 404 are repeatedly performed until it is determined in step 405 that the bit mapping has been completely performed on all the bits of the codeword sequence. That is, if it is determined in step 405 that k is less than N, the sequence mapper 130 increases k by 1 in step 406, and then returns to step 402.

Embodiment A-3 (for 64QAM Modulation)

As mentioned before, 2 of 6 bits constituting one 64QAM-modulated bit have higher reliability than the remaining 2 pairs of the bits. If it is assumed that the signal constellation diagram of FIG. 5 is used, a third bit $s_2$ and a sixth bit $s_5$ have higher reliability than a second bit $s_1$ and a fifth bit $s_4$, and a first bit $s_0$ and a fourth bit $s_3$ have the lowest reliability. In this case, an operation of rearranging the output codeword sequence of the channel encoder or the channel interleaver before modulation by the sequence mapper 130 is performed as follows.

1. For the bits in a first period, the sequence mapper 130 sequentially maps first to $\{(1/3)\times N\}^{th}$ bits to positions of a third bit $s_2$ and a sixth bit $s_5$ in each of (N/6) modulated bits.

2. For the bits in a second period, the sequence mapper 130 sequentially maps $\{(1/3)\times N+1\}^{th}$ to $\{(2/3)\times N\}^{th}$ bits to positions of a second bit $s_1$ and a fifth bit $s_4$ in each of (N/6) modulated bits.

3. For the bits in a third period, the sequence mapper 130 sequentially maps the remaining $\{(2/3)\times N+1\}^{th}$ to $N^{th}$ bits to positions of a first bit $s_0$ and a fourth bit $s_3$ in each of (N/6) modulated bits.

Figure 13:
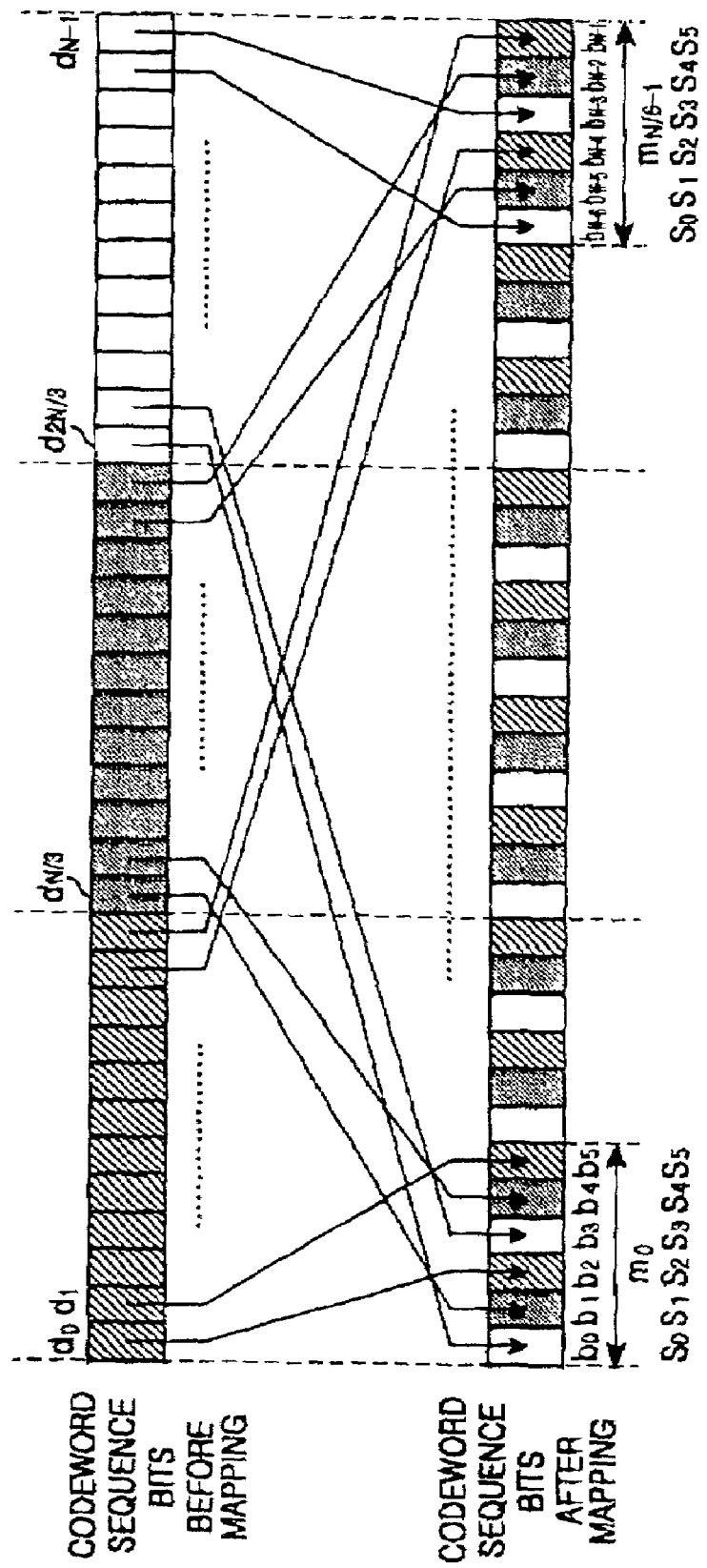
FIG. 13 illustrates a bit rearrangement operation for 64QAM modulation in which power is uniformly allocated to the codeword sequence according to an embodiment of the present invention.

These processes are summarized into Equations (6) to (8). The bits of the codeword sequence before rearrangement are rearranged as shown in FIG. 13.

$$b_{(3\times k)-(0\times N)+2}=d_k, \text{ for } k<(1/3)\times N \quad (6)$$

$$b_{(3\times k)-(1\times N)+1}=d_k, \text{ for } (1/3)\times N\leq k<(2/3)\times N \quad (7)$$

$$b_{(3\times k)-(2\times N)+0}=d_k, \text{ for } k\geq(2/3)\times N \quad (8)$$

FIG. 13 illustrates a bit rearrangement operation for 64QAM modulation in which power is uniformly allocated to the codeword sequence according to an embodiment of the present invention. Referring to FIG. 13, a codeword sequence comprised of an N-bit stream is divided into a first period, a second period and a second period. The first period is a duration between a first bit $d_0$ and a $\{(1/3)\times N\}^{th}$ bit $d_{N/3-1}$ of the codeword sequence. The second period is a duration between a $\{(1/3)\times N+1\}^{th}$ bit $d_{N/3}$ and a $\{(2/3)\times N\}^{th}$ bit $d_{2N/3-1}$ of the codeword sequence. The third period is a duration between a $\{(2/3)\times N+1\}^{th}$ bit $d_{2N/3}$ and an $N^{th}$ bit $d_{N-1}$ of the codeword sequence. Here, the modulated bit is comprised of 6 bits, and the number of modulated bits corresponding to the codeword sequence is N/6.

A first bit $d_0$ in the first period of the codeword sequence is mapped to a third bit position $m_0,s_2$ (i.e. $b_2$) of a first modulated bit, and a second bit $d_1$ in the first period is mapped to a sixth bit position $m_0,s_5$ (i.e. $b_5$) of the first modulated bit. A third bit $d_2$ in the first period is mapped to a third bit position $m_1,s_2$ (i.e. $b_8$) of a second modulated bit, and a fourth bit $d_3$ in the first period is mapped to a sixth bit position $m_1,s_5$ (i.e. $b_{11}$) of the second modulated bit. A $\{(1/3) \times N-1\}^{th}$ bit $d_{N/3-2}$ in the first period is mapped to a third bit position $m_{N/6-1},s_2$ (i.e. $b_{N-4}$) of an $(N/6)^{th}$ modulated bit, the last modulated bit, and a $\{(1/3) \times N\}^{th}$ bit $d_{N/3-1}$, the last bit in the first period is mapped to a sixth bit position $m_{N/6-1},s_5$ (i.e. $b_{N-1}$) of the last modulated bit.

A $\{(1/3) \times N+1\}^{th}$ bit $d_{N/3}$, a first bit in the second period of the codeword sequence is mapped to a second bit position $m_0,s_1$ (i.e. $b_1$) of the first modulated bit, and a $\{(1/3) \times N+2\}^{th}$ bit $d_{N/3+1}$, a second bit in the second period is mapped to a fifth bit position $m_0,s_4$ (i.e. $b_4$) of the first modulated bit. A $\{(2/3) \times N-1\}^{th}$ bit $d_{2N/3-2}$ in the second period of the codeword sequence is mapped to a second bit position $m_{N/6-1},s_1$ (i.e. $b_{N-5}$) of the $(N/6)^{th}$ modulated bit, the last modulated bit, and a $\{(2/3) \times N\}^{th}$ bit $d_{2N/3-1}$, the last bit in the second period is mapped to a fifth bit position $m_{N/6-1},s_4$ (i.e. $b_{N-2}$) of the last modulated bit.

A $\{(2/3) \times N+1\}^{th}$ bit $d_{2N/3}$, a first bit in the third period of the codeword sequence is mapped to a first bit position $m_0,s_0$ (i.e. $b_0$) of the first modulated bit, and a $\{(2/3) \times N+2\}^{th}$ bit $d_{2N/3+1}$, a second bit in the third period is mapped to a fourth bit position $b_0,s_3$ of the first modulated bit. An $(N-1)^{th}$ bit $d_{N-2}$ in the third period of the codeword sequence is mapped to a first bit position $m_{N/6-1},s_0$ (i.e. $b_{N-6}$) of the $(N/6)^{th}$ modulated bit, the last modulated bit, and an $N^{th}$ bit $d_{N-1}$, the last bit in the fourth period is mapped to a third bit position $m_{N/6-1},s_3$ (i.e. $b_{N-3}$) of the last modulated bit.

Figure 14:
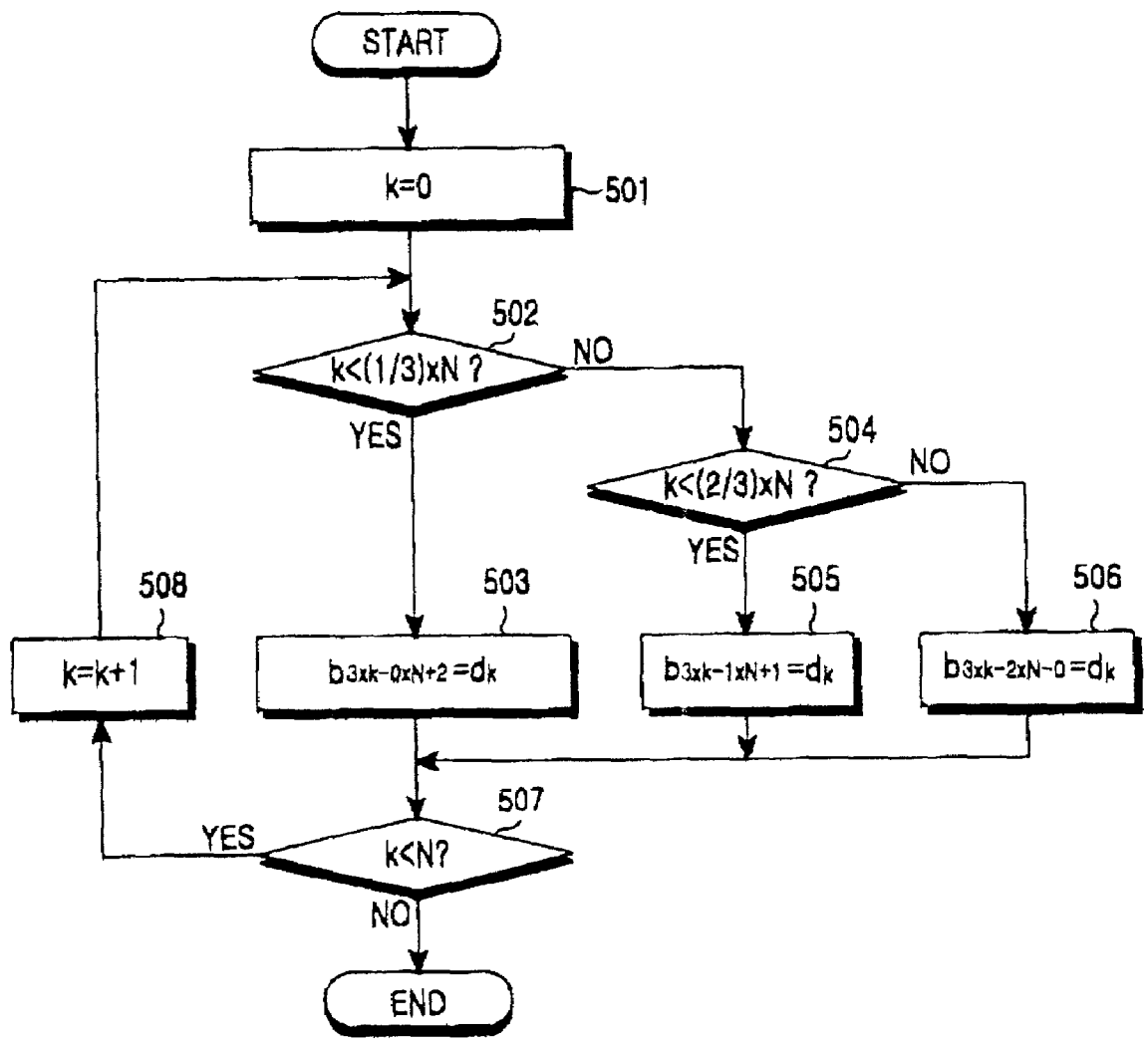
FIG. 14 illustrates a procedure for performing a bit rearrangement operation for 64QAM modulation in which power is uniformly allocated to the codeword sequence according to an embodiment of the present invention.

FIG. 14 illustrates a procedure for performing a bit rearrangement operation for 64QAM modulation in which power is uniformly allocated to the codeword sequence according to an embodiment of the present invention. This procedure is performed by the sequence mapper 130 of FIG. 1.

Referring to FIG. 14, the sequence mapper 130 sets k to zero (k=0) in step 501. The sequence mapper 130 determines in step 502 whether k is less than $\{(1/3) \times N\}$. If k is less than $\{(1/3) \times N\}$, the sequence mapper 130 performs an operation of step 503. Otherwise, the sequence mapper 130 performs an operation of step 504. The sequence mapper 130 determines in step 504 whether k is less than $\{(2/3) \times N\}$. If k is larger than or equal to $\{(1/3) \times N\}$ and less than $\{(2/3) \times N\}$, the sequence mapper 130 performs an operation of step 505. Otherwise, the sequence mapper 130 performs an operation of step 506. In step 503, the sequence mapper 130 performs bit mapping on the codeword sequence in accordance with Equation (6). In step 505, the sequence mapper 130 performs bit mapping on the codeword sequence in accordance with Equation (7). In step 506, the sequence mapper 130 performs bit mapping on the codeword sequence in accordance with Equation (8). The operations of steps 503, 505 and 506 are repeatedly performed until it is determined in step 507 that the bit mapping has been completely performed on all the bits of the codeword sequence. That is, if it is determined in step 507 that k is less than N, the sequence mapper 130 increases k by 1 in step 508, and then returns to step 502.

B. Different Power Levels Being Allocated to Front Part and Rear Part of Codeword Sequence A description of an operation for the case where the power is non-uniformly allocated to the codeword sequence can be separately made for the following two cases.

Figure 7:
FIG. 7 illustrates a case where a higher power level is allocated to a front part of the codeword sequence.
Figure 7:
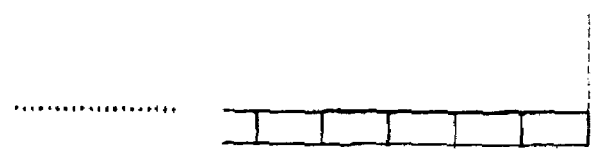

In a first case, a higher power level is applied to the front part of the codeword sequence, while a lower power level is applied to the rear part of the codeword sequence. Such power allocation is illustrated in FIG. 7. In this case, the output bits of the channel encoder or the channel interleaver are rearranged in the same method described above as used when the power is uniformly allocated to the codeword sequence. This is because when the power is unavoidably non-uniformly allocated to the codeword sequence, it is preferable to allocate a higher power level to the systematic part and a lower power level to the parity part in order to secure better performance.

Figure 8:
FIG. 8 illustrates a case where a higher power level is allocated to a rear part of the codeword sequence.
Figure 8:
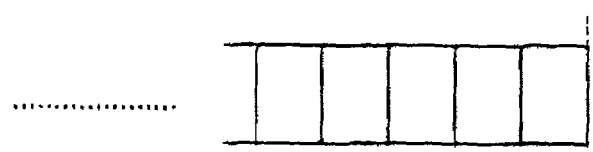

In a second case, to the contrary, a lower power level is applied to the front part of the codeword sequence, while a higher power level is applied to the rear part of the codeword sequence. Such power allocation is illustrated in FIG. 8. In this case, the bit rearrangement method used when the power is uniformly allocated to the codeword sequence is modified because allocating a higher power level to the systematic part shows better performance than allocating a higher power level to the parity part. That is, in order to allocate a higher power level to the systematic part, it is necessary to arrange a specific part of the codeword sequence to the bit positions with the same reliability in an order that is reversed with respect to the order as described in the cases described above. An operation of this case will be described with reference to the respective modulation techniques.

Embodiment B-1 (for 8PSK Modulation)

1. For the bits in a first period, the sequence mapper 130 maps, in reverse order, first to $\{(2/3) \times N\}^{th}$ bits to positions of a third bit $s_2$ and a second bit $s_1$ in each of (N/3) modulated bits.

2. For the bits in a second period, the sequence mapper 130 maps, in reverse order, the remaining $\{(2/3) \times N+1\}^{th}$ to $N^{th}$ bits to a position of a first bit $s_0$ in each of (N/3) modulated bits.

These processes are summarized into Equations (9) and (10). The bits of the codeword sequence before rearrangement are rearranged as shown in FIG. 15.

$$b_{1 \times (N-1)-(3 \times \lfloor k/2 \rfloor + (k \bmod 2))} = d_k, \text{ for } k < (2/3) \times N \qquad (9)$$

$$b_{3 \times (N-1) - 3 \times k} = d_k, \text{ for } k \geq (2/3) \times N \qquad (10)$$

Figure 15:
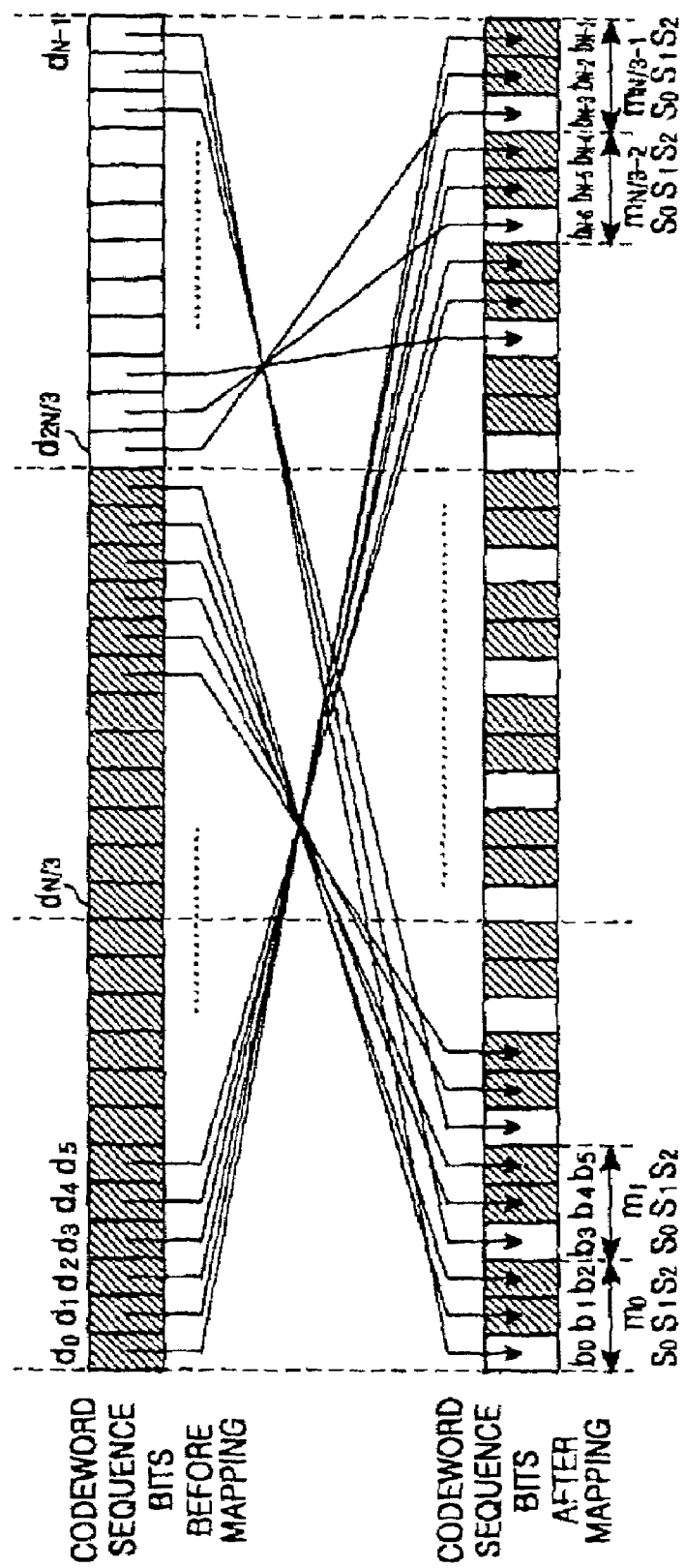
FIG. 15 illustrates a bit rearrangement operation for 8PSK modulation in which a higher power level is allocated to the rear part of the codeword sequence according to an embodiment of the present invention.

FIG. 15 illustrates a bit rearrangement operation for 8PSK modulation in which a higher power level is allocated to the rear part of the codeword sequence according to an embodiment of the present invention. Referring to FIG. 15, a codeword sequence comprised of an N-bit stream is divided into a first period and a second period. The first period is a duration between a first bit $d_0$ and a $\{(2/3) \times N\}^{th}$ bit $d_{2N/3-1}$ of the codeword sequence, and the second period is a duration between a $\{(2/3) \times N+1\}^{th}$ bit $d_{2N/3}$ and an $N^{th}$ bit $d_{N-1}$ of the codeword sequence. Here, the modulated bit is comprised of 3 bits, and the number of modulated bits corresponding to the codeword sequence is N/3.

A first bit $d_0$ in the first period of the codeword sequence is mapped to a third bit position $m_{N/3-1},s_2$ (i.e. $b_{N-1}$) of an $(N/3)^{th}$ modulated bit, the last modulated bit, and a second bit $d_1$ in the first period of the codeword sequence is mapped to a second bit position $m_{N/3-1},s_1$ (i.e. $b_{N-2}$) of the last modulated bit. A third bit $d_2$ in the first period is mapped to a third bit position $m_{N/3-2},s_2$ (i.e. $b_{N-4}$) of an $\{(N/3)-1\}^{th}$ modulated bit, and a fourth bit $d_3$ in the first period is mapped to a second bit position $m_{N/3-2},s_1$ (i.e. $b_{N-5}$) of the $\{(N/3)-1\}^{th}$ modulated bit. A $\{(2/3) \times N-1\}^{th}$ bit $d_{2N/3-2}$ in the first period is mapped to a third bit position $m_0,s_2$ (i.e. $b_2$) of a first modulated bit, and a $\{(2/3) \times N\}^{th}$ bit $d_{2N/3-1}$, the last bit in the first period is mapped to a second bit position $m_0,s_1$ (i.e. $b_1$) of the first modulated bit.

A $\{(2/3)\times N+1\}^{th}$ bit $d_{2N/3}$, a first bit in the second period of the codeword sequence is mapped to a first bit position $m_{N/3-1},s_0$ (i.e. $b_{N-3}$) of an $(N/3)^{th}$ modulated bit, the last modulated bit, and a $\{(2/3)\times N+2\}^{th}$ bit $d_{2N/3+1}$, a second bit in the second period is mapped to a first bit position $m_{N/3-2},s_0$ (i.e. $b_{N-6}$) of an $\{(N/3)-1\}^{th}$ modulated bit. An $(N-1)^{th}$ bit $d_{N-2}$ in the second period is mapped to a first bit position $m_1,s_0$ (i.e. $b_3$) of a second modulated bit, and an $N^{th}$ bit $d_{N-1}$, the last bit in the second period is mapped to a first bit position $m_0,s_0$ (i.e. $b_0$) of a first modulated bit.

Figure 16:
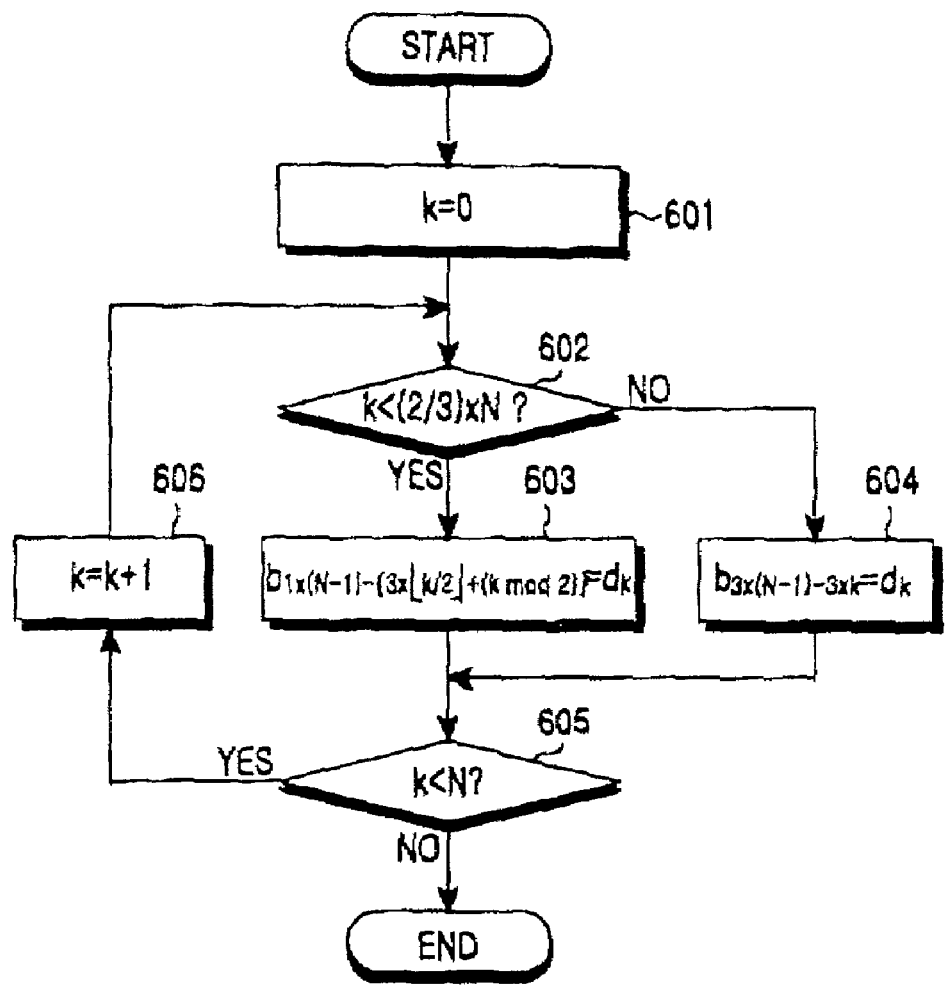
FIG. 16 illustrates a procedure for performing a bit rearrangement operation for 8PSK modulation in which a higher power level is allocated to the rear part of the codeword sequence according to an embodiment of the present invention.

FIG. 16 illustrates a procedure for performing a bit rearrangement operation for 8PSK modulation in which a higher power level is allocated to the rear part of the codeword sequence according to an embodiment of the present invention. This procedure is performed by the sequence mapper 130 of FIG. 1.

Referring to FIG. 16, the sequence mapper 130 sets k to zero (k=0) in step 601. The sequence mapper 130 determines in step 602 whether k is less than $\{(2/3)\times N\}$. If k is less than $\{(2/3)\times N\}$, the sequence mapper 130 performs an operation of step 603. Otherwise, the sequence mapper 130 performs an operation of step 604. In step 603, the sequence mapper 130 performs bit mapping on the codeword sequence in accordance with Equation (9). In step 604, the sequence mapper 130 performs bit mapping on the codeword sequence in accordance with Equation (10). The operations of steps 603 and 604 are repeatedly performed until it is determined in step 605 that the bit mapping has been completely performed on all the bits of the codeword sequence. That is, if it is determined in step 605 that k is less than N, the sequence mapper 130 increases k by 1 in step 606, and then returns to step 602.

Embodiment B-2 (for 16QAM Modulation)

1. The sequence mapper 130 arranges the output codeword sequence of the channel encoder or the channel interleaver in the order of the systematic part and the parity part.

2. For the bits in a first period, the sequence mapper 130 maps, in reverse order, first to $\{(1/2)\times N\}^{th}$ bits to positions of a fourth bit $s_3$ and a second bit $s_1$ in each of (N/4) modulated bits.

3. For the bits in a second period, the sequence mapper 130 maps, in reverse order, the remaining $\{(1/2)\times N+1\}^{th}$ to $N^{th}$ bits to positions of a third bit $s_2$ and a first bit $s_0$ in each of (N/4) modulated bits.

These processes are summarized into Equations (11) and (12). The bits of the codeword sequence before rearrangement are rearranged as shown in FIG. 17.

$$b_{1\times(N-1)-2\times k}=d_k, \text{ for } k<(1/2)\times N \quad (11)$$

$$b_{2\times(N-1)-2\times k}=d_k, \text{ for } k\geq(1/2)\times N \quad (12)$$

Figure 17:
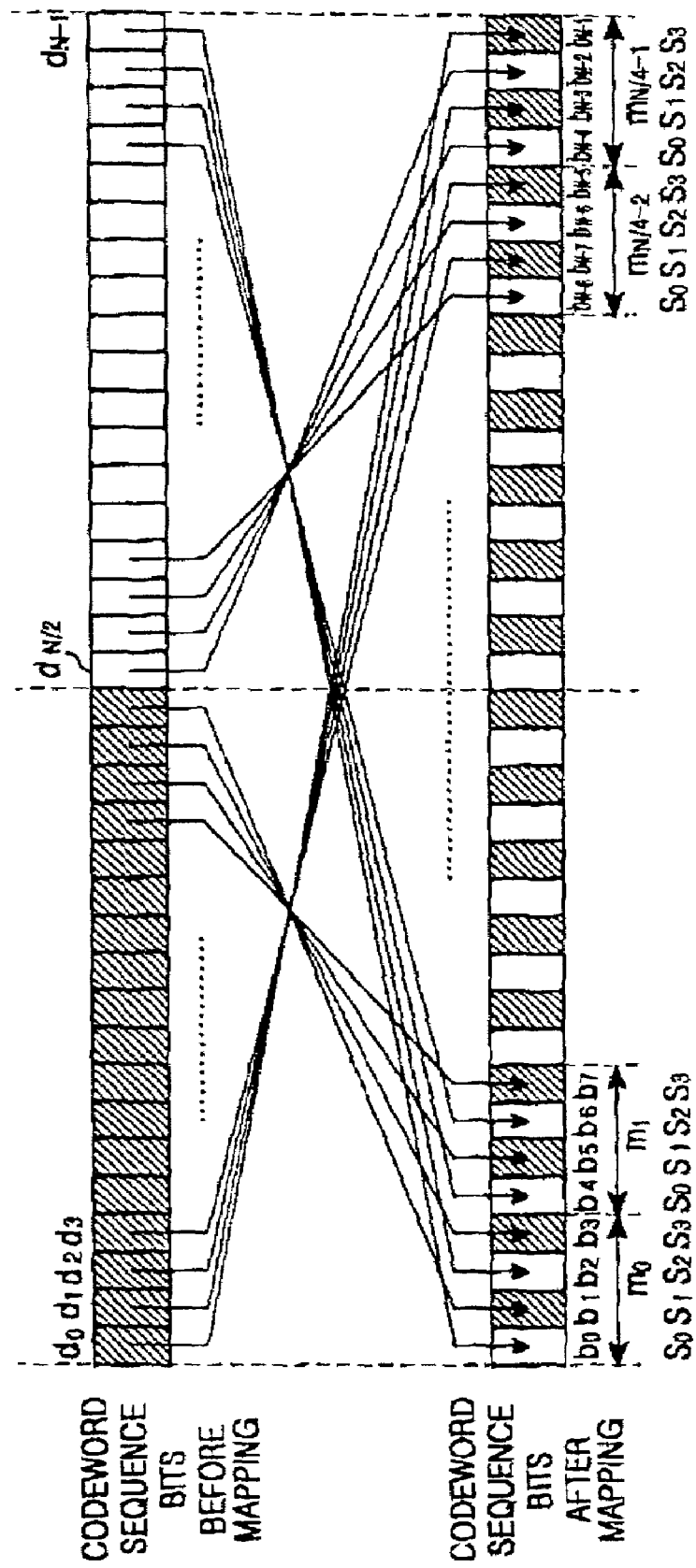
FIG. 17 illustrates a bit rearrangement operation for 16QAM modulation in which a higher power level is allocated to the rear part of the codeword sequence according to an embodiment of the present invention.

FIG. 17 illustrates a bit rearrangement operation for 16QAM modulation in which a higher power level is allocated to the rear part of the codeword sequence according to an embodiment of the present invention. Referring to FIG. 17, a codeword sequence comprised of an N-bit stream is divided into a first period and a second period. The first period is a duration between a first bit $d_0$ and a $\{(1/2)\times N\}^{th}$ bit $d_{N/2-1}$ of the codeword sequence, and the second period is a duration between a $\{(1/2)\times N+1\}^{th}$ bit $d_{N/2}$ and an $N^{th}$ bit $d_{N-1}$ of the codeword sequence. Here, the modulated bit is comprised of 4 bits, and the number of modulated bits corresponding to the codeword sequence is N/4.

A first bit $d_0$ in the first period of the codeword sequence is mapped to a fourth bit position $m_{N/4-1},s_3$ (i.e. $b_{N-1}$) of an $(N/4)^{th}$ modulated bit, the last modulated bit, and a second bit $d_1$ in the first period of the codeword sequence is mapped to a second bit position $m_{N/4-1},s_1$ (i.e. $b_{N-3}$) of the last modulated bit. A third bit $d_2$ in the first period is mapped to a fourth bit position $m_{N/4-2},s_3$ (i.e. $b_{N-5}$) of an $\{(N/4)-1\}^{th}$ modulated bit, and a fourth bit $d_3$ in the first period is mapped to a second bit position $m_{N/4-2},s_1$ (i.e. $b_{N-7}$) of the $\{(N/4)-1\}^{th}$ modulated bit. A $\{(1/2)\times N-1\}^{th}$ bit $d_{N/2-2}$ in the first period is mapped to a fourth bit position $m_0,s_3$ (i.e. $b_3$) of a first modulated bit, and a $\{(1/2)\times N\}^{th}$ bit $d_{N/2-1}$, the last bit in the first period is mapped to a second bit position $m_0,s_1$ (i.e. $b_1$) of the first modulated bit.

A $\{(1/2)\times N+1\}^{th}$ bit $d_{N/2}$, a first bit in the second period of the codeword sequence is mapped to a third bit position $m_{N/4-1},s_2$ (i.e. $b_{N-2}$) of an $(N/4)^{th}$ modulated bit, the last modulated bit, and a $\{(1/2)\times N+2\}^{th}$ bit $d_{N/2+1}$, a second bit in the second period is mapped to a first bit position $m_{N/4-1},s_0$ (i.e. $b_{N-4}$) of the last modulated bit. An $(N-1)^{th}$ bit $d_{N-2}$ in the second period is mapped to a third bit position $m_0,s_2$ (i.e. $b_2$) of a first modulated bit, and an $N^{th}$ bit $d_{N-1}$, the last bit in the second period is mapped to a first bit position $m_0,s_0$ (i.e. $b_0$) of the first modulated bit.

Figure 18:
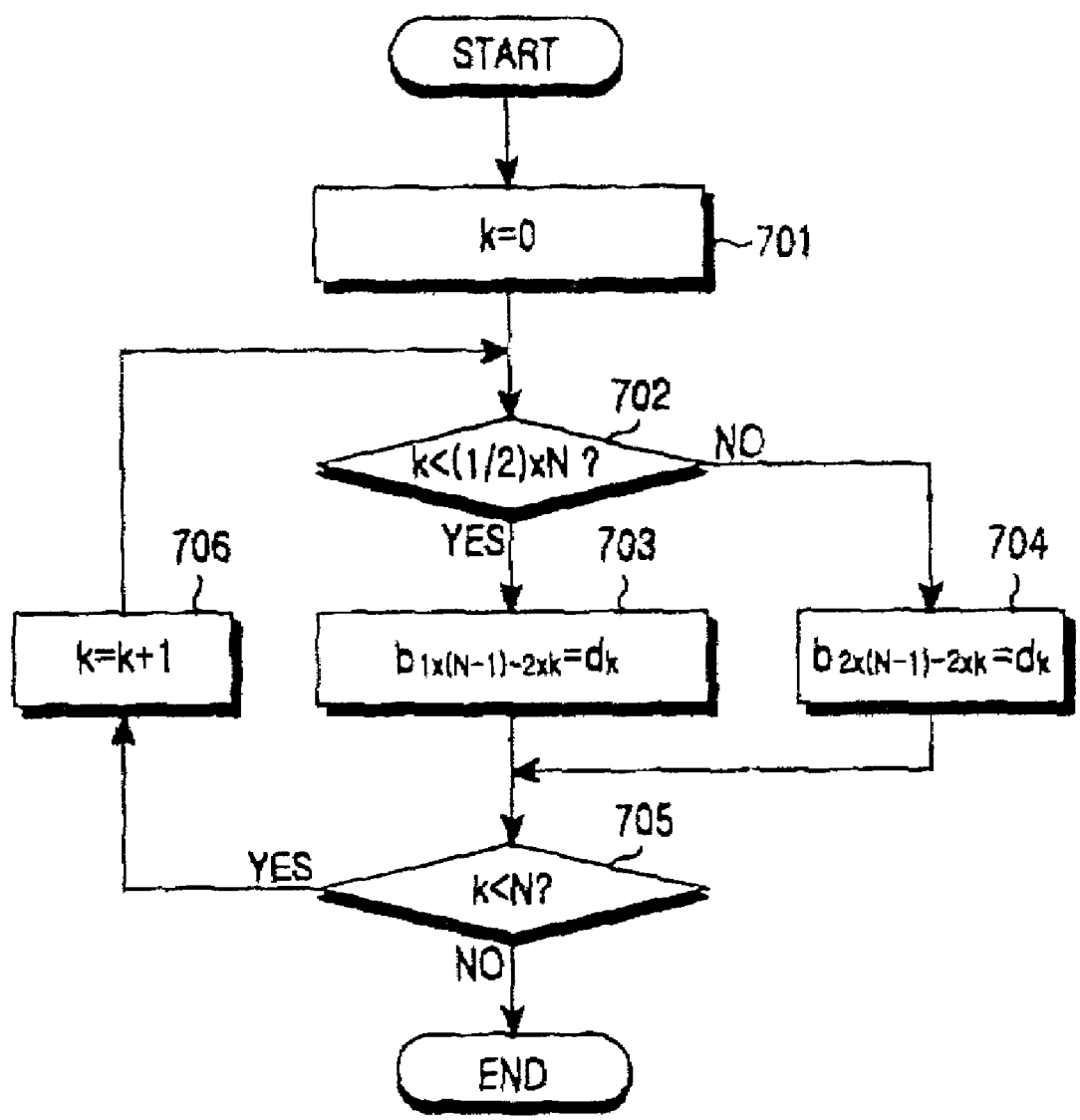
FIG. 18 illustrates a procedure for performing a bit rearrangement operation for 16QAM modulation in which a higher power level is allocated to the rear part of the codeword sequence according to an embodiment of the present invention.

FIG. 18 illustrates a procedure for performing a bit rearrangement operation for 16QAM modulation in which a higher power level is allocated to the rear part of the codeword sequence according to an embodiment of the present invention. This procedure is performed by the sequence mapper 130 of FIG. 1.

Referring to FIG. 18, the sequence mapper 130 sets k to zero (k=0) in step 701. The sequence mapper 130 determines in step 702 whether k is less than $\{(1/2)\times N\}$. If k is less than $\{(1/2)\times N\}$, the sequence mapper 130 performs an operation of step 703. Otherwise, the sequence mapper 130 performs an operation of step 704. In step 703, the sequence mapper 130 performs bit mapping on the codeword sequence in accordance with Equation (11). In step 704, the sequence mapper 130 performs bit mapping on the codeword sequence in accordance with Equation (12). The operations of steps 703 and 704 are repeatedly performed until it is determined in step 705 that the bit mapping has been completely performed on all the bits of the codeword sequence. That is, if it is determined in step 705 that k is less than N, the sequence mapper 130 increases k by 1 in step 706, and then returns to step 702.

Embodiment B-3 (for 64QAM Modulation)

1. For the bits in a first period, the sequence mapper 130 maps, in reverse order, first to $\{(1/3)\times N\}^{th}$ bits to positions of a sixth bit $s_5$ and a third bit $s_2$ in each of (N/6) modulated bits.

2. For the bits in a second period, the sequence mapper 130 maps, in reverse order, $\{(1/3)\times N+1\}^{th}$ to $\{(2/3)\times N\}^{th}$ bits to positions of a fifth bit $s_4$ and a second bit $s_1$ in each of (N/6) modulated bits.

3. For the bits in a third period, the sequence mapper 130 maps, in reverse order, the remaining $\{(2/3)\times N+1\}^{th}$ to $N^{th}$ bits to positions of a fourth bit $s_3$ and a first bit $s_0$ in each of (N/6) modulated bits.

Figure 19:
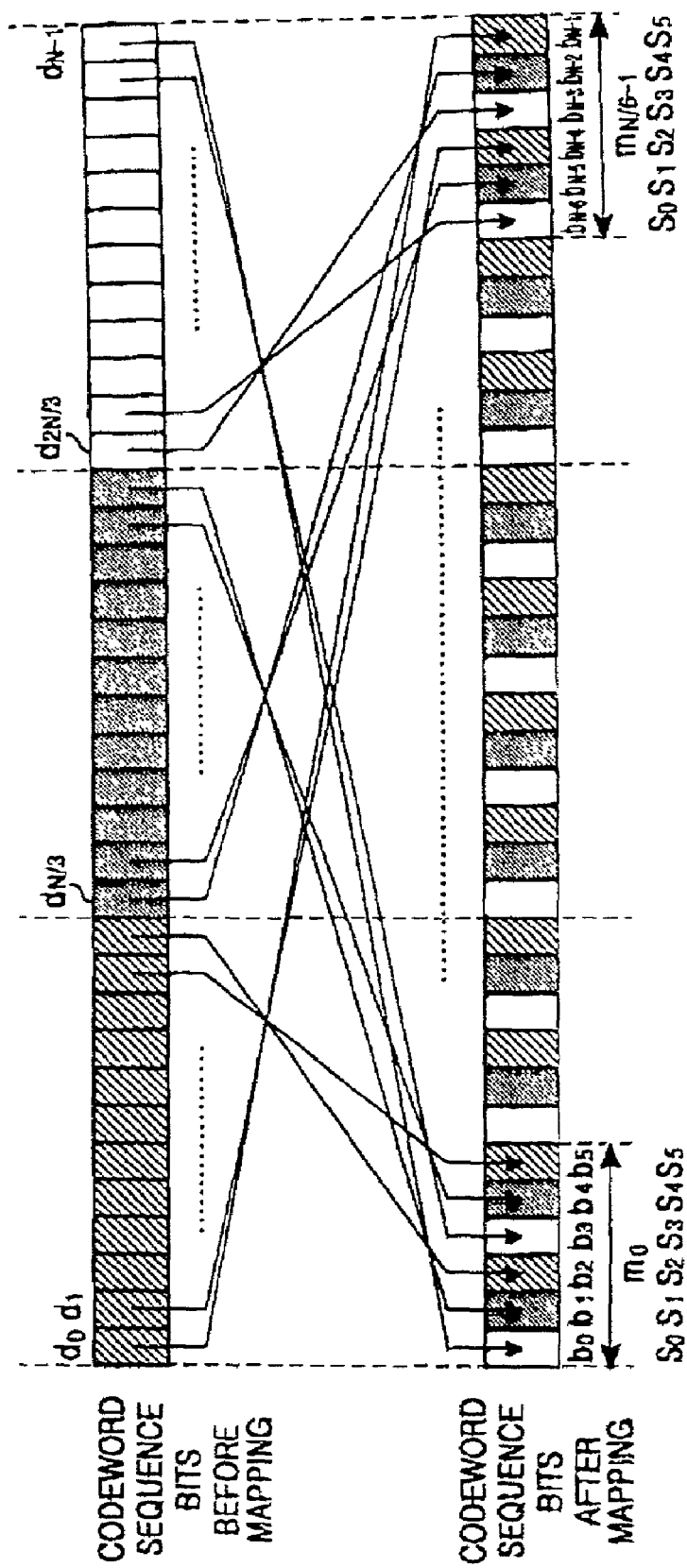
FIG. 19 illustrates a bit rearrangement operation for 64QAM modulation in which a higher power level is allocated to the rear part of the codeword sequence according to an embodiment of the present invention.

These processes are summarized into Equations (13) to (15). The bits of the codeword sequence before rearrangement are rearranged as shown in FIG. 19.

$$b_{1\times(N-1)-3\times k}=d_k, \text{ for } k<(1/3)\times N \quad (13)$$

$$b_{2\times(N-1)-3\times k}=d_k, \text{ for } (1/3)\times N\leq k<(2/3)\times N \quad (14)$$

$$b_{3\times(N-1)-3\times k}=d_k, \text{ for } k\geq(2/3)\times N \quad (15)$$

FIG. 19 illustrates a bit rearrangement operation for 64QAM modulation in which a higher power level is allocated to the rear part of the codeword sequence according to an embodiment of the present invention. Referring to FIG. 19, a codeword sequence comprised of an N-bit stream is divided into a first period, a second period and a second period. The first period is a duration between a first bit $d_0$ and a $\{(1/3)\times N\}^{th}$ bit $d_{N/3-1}$ of the codeword sequence. The second period is a duration between a $\{(1/3)\times N+1\}^{th}$ bit $d_{N/3}$ and a $\{(2/3)\times N\}^{th}$ bit $d_{2N/3-1}$ of the codeword sequence. The third period is a duration between a $\{(2/3)\times N+1\}^{th}$ bit $d_{2N/3}$ and an $N^{th}$ bit $d_{N-1}$ of the codeword sequence. Here, the modulated bit is comprised of 6 bits, and the number of modulated bits corresponding to the codeword sequence is N/6.

A first bit $d_0$ in the first period of the codeword sequence is mapped to a sixth bit position $m_{N/6-1},s_5$ (i.e. $b_{N-1}$) of an $(N/6)^{th}$ modulated bit, the last modulated bit, and a second bit $d_1$ in the first period is mapped to a third bit position $m_{N/6-1},s_2$ (i.e. $b_{N-4}$) of the last modulated bit. A third bit $d_2$ in the first period is mapped to a sixth bit position $m_{N/6-2},s_5$ (i.e. $b_{N-7}$) of an $\{(N/6)-1\}^{th}$ modulated bit, and a fourth bit $d_3$ in the first period is mapped to a third bit position $m_{N/6-2},s_2$ (i.e. $b_{N-10}$) of the $\{(N/6)-1\}^{th}$ modulated bit. A $\{(1/3)\times N-1\}^{th}$ bit $d_{N/3-2}$ in the first period is mapped to a sixth bit position $m_0,s_5$ (i.e. $b_5$) of a first modulated bit, and a $\{(1/3)\times N\}^{th}$ bit $d_{N/3-1}$, the last bit in the first period is mapped to a third bit position $m_0,s_2$ (i.e. $b_2$) of the first modulated bit.

A $\{(1/3)\times N+1\}^{th}$ bit $d_{N/3}$, a first bit in the second period of the codeword sequence is mapped to a fifth bit position $m_{N/6-1},s_4$ (i.e. $b_{N-2}$) of an $(N/6)^{th}$ modulated bit, the last modulated bit, and a $\{(1/3)\times N+2\}^{th}$ bit $d_{N/3+1}$, a second bit in the second period is mapped to a second bit position $m_{N/6-1},s_1$ (i.e. $b_{N-5}$) of the last modulated bit. A $\{(2/3)\times N-1\}^{th}$ bit $d_{2N/3-2}$ in the second period of the codeword sequence is mapped to a fifth bit position $m_0,s_4$ (i.e. $b_4$) of a first modulated bit, and a $\{(2/3)\times N\}^{th}$ bit $d_{2N/3-1}$, the last bit in the second period is mapped to a second bit position $m_0,s_1$ (i.e. $b_1$) of the first modulated bit.

A $\{(2/3)\times N+1\}^{th}$ bit $d_{2N/3}$, a first bit in the third period of the codeword sequence is mapped to a fourth bit position $m_{N/6-1},s_3$ (i.e. $b_{N-3}$) of an $(N/6)^{th}$ modulated bit, the last modulated bit, and a $\{(2/3)\times N+2\}^{th}$ bit $d_{2N/3+1}$, a second bit in the third period is mapped to a first bit position $m_{N/6-1},s_0$ (i.e. $b_{N-6}$) of the last modulated bit. An $(N-1)^{th}$ bit $d_{N-2}$ in the third period of the codeword sequence is mapped to a fourth bit position $m_0,s_3$ (i.e. $b_3$) of a first modulated bit, and an $N^{th}$ bit $d_{N-1}$, the last bit in the third period is mapped to a first bit position $m_0,s_0$ (i.e. $b_0$) of the first modulated bit.

Figure 20:
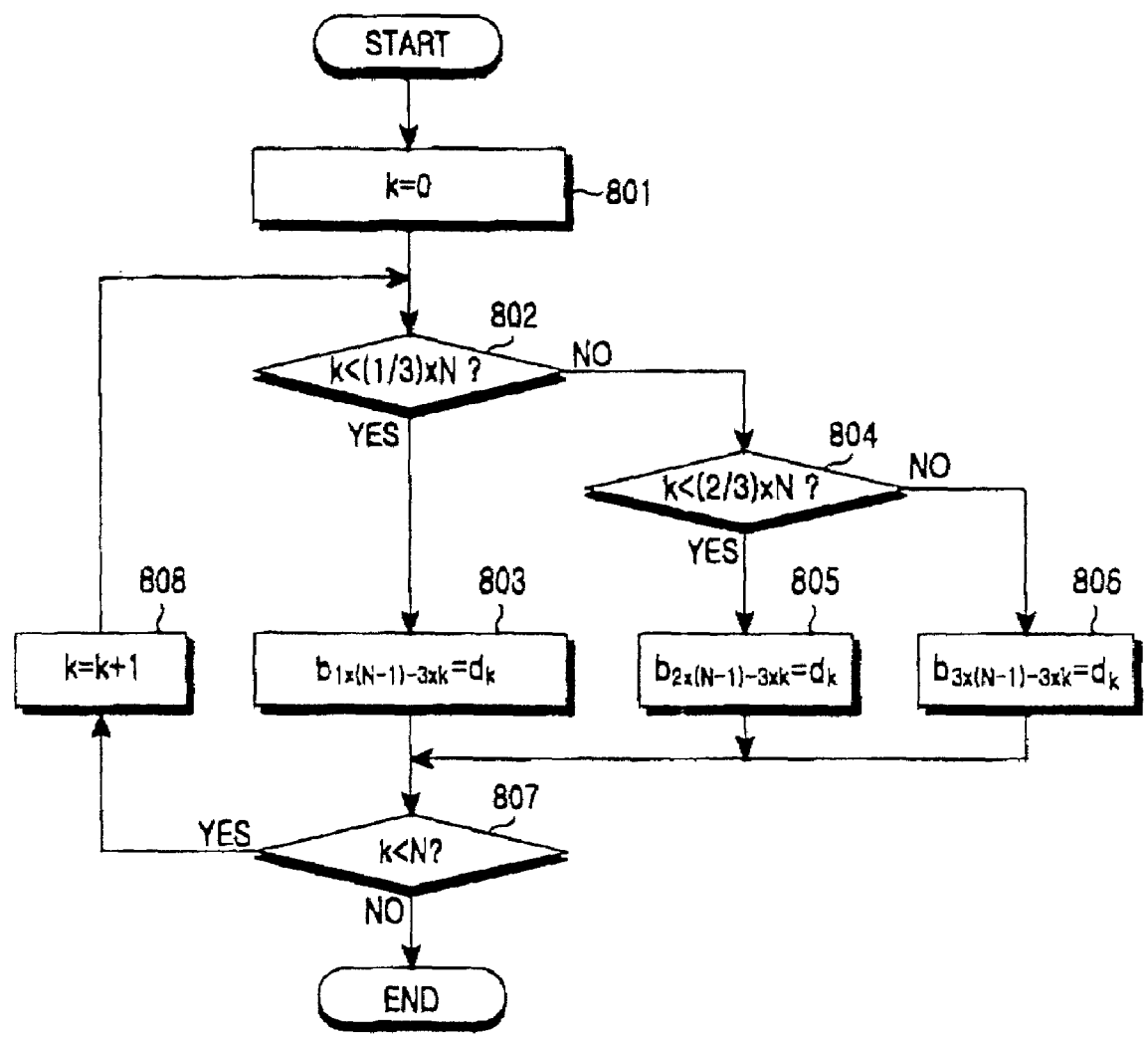
FIG. 20 illustrates a procedure for performing a bit rearrangement operation for 64QAM modulation in which a higher power level is allocated to the rear part of the codeword sequence according to an embodiment of the present invention.

FIG. 20 illustrates a procedure for performing a bit rearrangement operation for 64QAM modulation in which a higher power level is allocated to the rear part of the codeword sequence according to an embodiment of the present invention. This procedure is performed by the sequence mapper 130 of FIG. 1.

Referring to FIG. 20, the sequence mapper 130 sets k to zero (k=0) in step 801. The sequence mapper 130 determines in step 802 whether k is less than $\{(1/3)\times N\}$. If k is less than $\{(1/3)\times N\}$, the sequence mapper 130 performs an operation of step 803. Otherwise, the sequence mapper 130 performs an operation of step 804. The sequence mapper 130 determines in step 804 whether k is less than $\{(2/3)\times N\}$. If k is larger than or equal to $\{(1/3)\times N\}$ and less than $\{(2/3)\times N\}$, the sequence mapper 130 performs an operation of step 805. Otherwise, the sequence mapper 130 performs an operation of step 806. In step 803, the sequence mapper 130 performs bit mapping on the codeword sequence in accordance with Equation (13). In step 805, the sequence mapper 130 performs bit mapping on the codeword sequence in accordance with Equation (14). In step 806, the sequence mapper 130 performs bit mapping on the codeword sequence in accordance with Equation (15). The operations of steps 803, 805 and 806 are repeatedly performed until it is determined in step 807 that the bit mapping has been completely performed on all the bits of the codeword sequence. That is, if it is determined in step 807 that k is less than N, the sequence mapper 130 increases k by 1 in step 808, and then returns to step 802.

Heretofore, the description has been made of the operation of rearranging the output codeword sequence bits of the channel encoder or the channel interleaver before modulation according to the embodiments of the present invention. Next, a description will be made of an operation of arranging output values of a demodulator in the order of the original codeword sequence before channel decoding or channel deinterleaving.

The operation of arranging the output values of the demodulator in the order of the original codeword sequence is achieved by reversly performing the above-described rearranging operation. If an output sequence of the demodulator is represented by $\{q_0,q_1,\ldots,q_k,\ldots,q_{N-2},q_{N-1}\}$, the sequence arranged in the original order before channel decoding or channel deinterleaving is represented by $\{p_0,p_1,\ldots,p_k,\ldots,p_{N-2},p_{N-1}\}$, a subscript of the left term b in Equations (2) to (15) is represented by m, and a subscript of the right term d is represented by n, then a process of arranging output sequence values of the demodulator in the original order before channel decoding or channel deinterleaving can be expressed by $$q_m \to p_n, \text{ for all } m \text{ and } n \text{ (however, } m \text{ and } n \in \{0,1,\ldots,N-1\}) \tag{16}$$

Embodiments Based on Second Perspective

A description of the bit rearrangement operation according to embodiments of the present invention will be separately made for one case where power is uniformly allocated to the codeword sequence and another case where different power levels are allocated to the front part and the rear part of the codeword sequence. Further, a description of each case will be separately made for 8PSK, 16QAM and 64QAM. In the following description of the bit rearrangement operation, it will be assumed that the number of modulated bits constituting one modulated bit sequence is N, and a codeword sequence before rearrangement, i.e., an output sequence of the channel encoder or a channel interleaver is represented by $\{x(0),\ldots,x(k),\ldots,x(N\times m-1)\}$, and a codeword sequence after rearrangement is represented by $s_0(i),\ldots,s_{m-1}(i)$, where $i \in \{0,\ldots,N-1\}$. Moreover, it will be assumed that the codeword sequence before rearrangement is arranged in the order of the systematic part and the parity part. If the codeword sequence is not arranged in the order of the systematic part and the parity part, straightforward pre-processing is included to arrange the sequence in this order.

C. Power Being Uniformly Allocated to Codeword Sequence

When the power is uniformly allocated to the codeword sequence, it is possible to achieve performance improvement in terms of an average packet error rate by utilizing the intact rearrangement principle. FIG. 6 illustrates a case where the power is uniformly allocated to the codeword sequence.

Embodiment C-1 (for 8PSK Modulation)

As mentioned before, 2 of 3 bits constituting one 8PSK-modulated bit have higher reliability than the remaining 1 bit. If it is assumed that the signal constellation diagram of FIG. 3 is used, a second bit $s_1$ and a third bit $s_2$ have higher reliability than a first bit $s_0$. In this case, an operation of rearranging the output codeword sequence of the channel encoder or the channel interleaver before modulation by the sequence mapper 130 of FIG. 1 is performed as follows.

1. For the bits in a first period, the sequence mapper 130 sequentially maps first to $\{2 \times N\}^{th}$ bits to positions of a second bit $s_1$ and a third bit $s_2$ in each of N modulated bits.

2. For the bits in a second period, the sequence mapper 130 sequentially maps the remaining $\{2 \times N+1\}^{th}$ to $\{3 \times N\}^{th}$ bits to a position of a first bit $s_0$ in each of N modulated bits.

Figure 21:
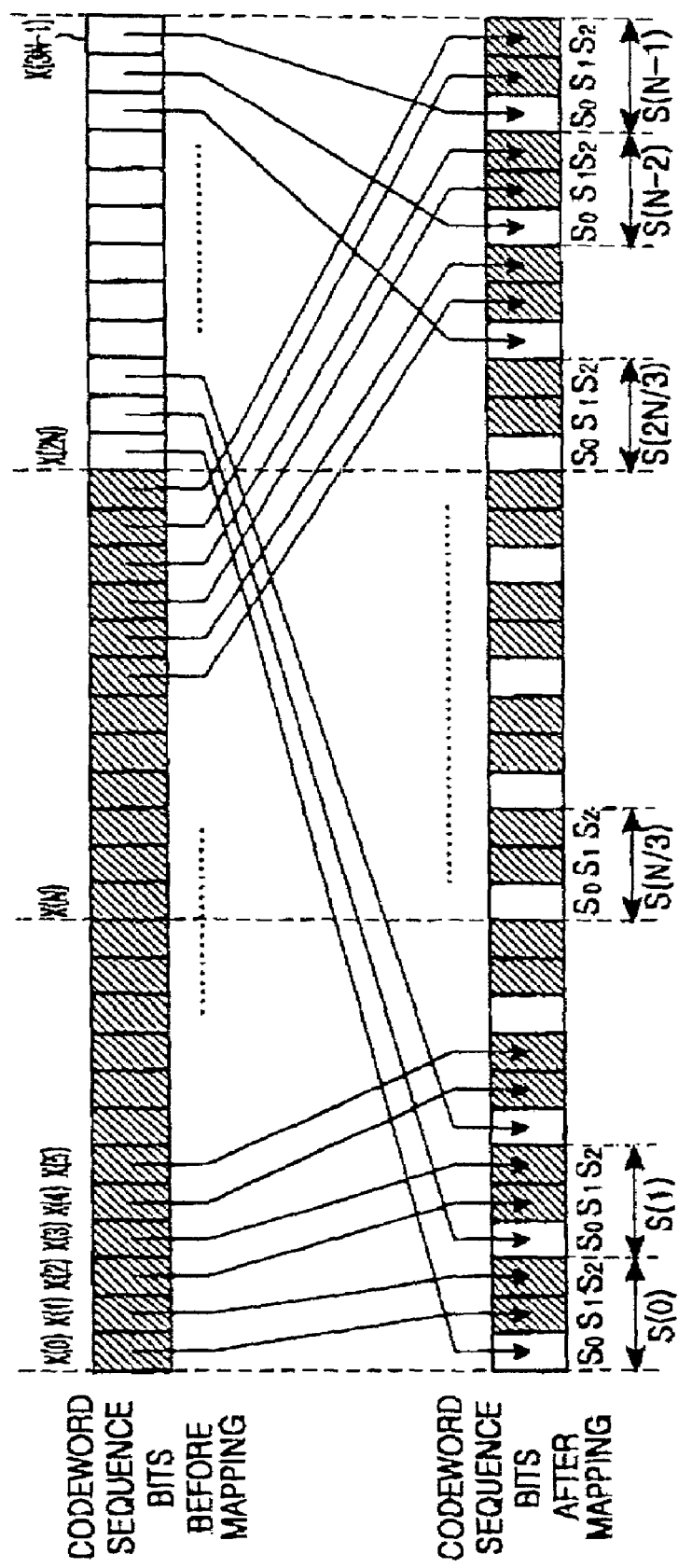
FIG. 21 illustrates a bit rearrangement operation for 8PSK modulation in which power is uniformly allocated to the codeword sequence according to an embodiment of the present invention.

These processes are summarized into Equations (17) to (19). The bits of the codeword sequence before rearrangement are rearranged as shown in FIG. 21.

$$s_0(i)=x(2 \times N+i) \qquad (17)$$

$$s_1(i)=x(2 \times i) \qquad (18)$$

$$s_2(i)=x(2 \times i+1) \qquad (19)$$

FIG. 21 illustrates a bit rearrangement operation for 8PSK modulation in which power is uniformly allocated to the codeword sequence according to an embodiment of the present invention. It should be noted that this bit rearrangement operation is identical to the bit rearrangement operation shown in FIG. 9.

Referring to FIG. 21, a codeword sequence comprised of a 3N-bit stream is divided into a first period and a second period. The first period is a duration between a first bit x(0) and a $\{2 \times N\}^{th}$ bit x(2N-1) of the codeword sequence, and the second period is a duration between a $\{2 \times N+1\}^{th}$ bit x(2N) and a $\{3 \times N\}^{th}$ bit x(3N-1) of the codeword sequence. Here, the modulated bit is comprised of 3 bits, and the number of modulated bits corresponding to the codeword sequence is N.

A first bit x(2N) in the second period of the codeword sequence is mapped to a first bit position $s_0(0)$ of a first modulated bit, a first bit x(0) in the first period of the codeword sequence is mapped to a second bit position $s_1(0)$ of the first modulated bit, and a second bit x(1) in the first period of the codeword sequence is mapped to a third bit position $s_2(0)$ of the first modulated bit.

A second bit x(2N+1) in the second period of the codeword sequence is mapped to a first bit position $s_0(1)$ of a second modulated bit, a third bit x(2) in the first period of the codeword sequence is mapped to a second bit position $s_1(1)$ of the second modulated bit, and a fourth bit x(3) in the first period of the codeword sequence is mapped to a third bit position $s_2(1)$ of the second modulated bit.

A third bit x(2N+2) in the second period of the codeword sequence is mapped to a first bit position $s_0(2)$ of a third modulated bit, a fifth bit x(4) in the first period of the codeword sequence is mapped to a second bit position $s_1(2)$ of the third modulated bit, and a sixth bit x(5) in the first period of the codeword sequence is mapped to a third bit position $s_2(2)$ of the third modulated bit.

A $\{3N-1\}^{th}$ bit x(3N-2) in the second period of the codeword sequence is mapped to a first bit position $s_0(N-2)$ of an $(N-1)^{th}$ modulated bit, a $\{2N-3\}^{th}$ bit x(2N-4) in the first period of the codeword sequence is mapped to a second bit position $s_1(N-2)$ of the $(N-1)^{th}$ modulated bit, and a $\{2N-2\}^{th}$ bit x(2N-3) in the first period of the codeword sequence is mapped to a third bit position $s_2(N-2)$ of the $(N-1)^{th}$ modulated bit.

A $\{3 \times N\}^{th}$ bit x(3N-1) in the second period of the codeword sequence is mapped to a first bit position $s_0(N-1)$ of an $N^{th}$ modulated bit, a $\{2N-1\}^{th}$ bit x(2N-2) in the first period of the codeword sequence is mapped to a second bit position $s_1(N-1)$ of the $N^{th}$ modulated bit, and a $\{2 \times N\}^{th}$ bit x(2N-1) in the first period of the codeword sequence is mapped to a third bit position $s_2(N-1)$ of the $N^{th}$ modulated bit.

Figure 22:
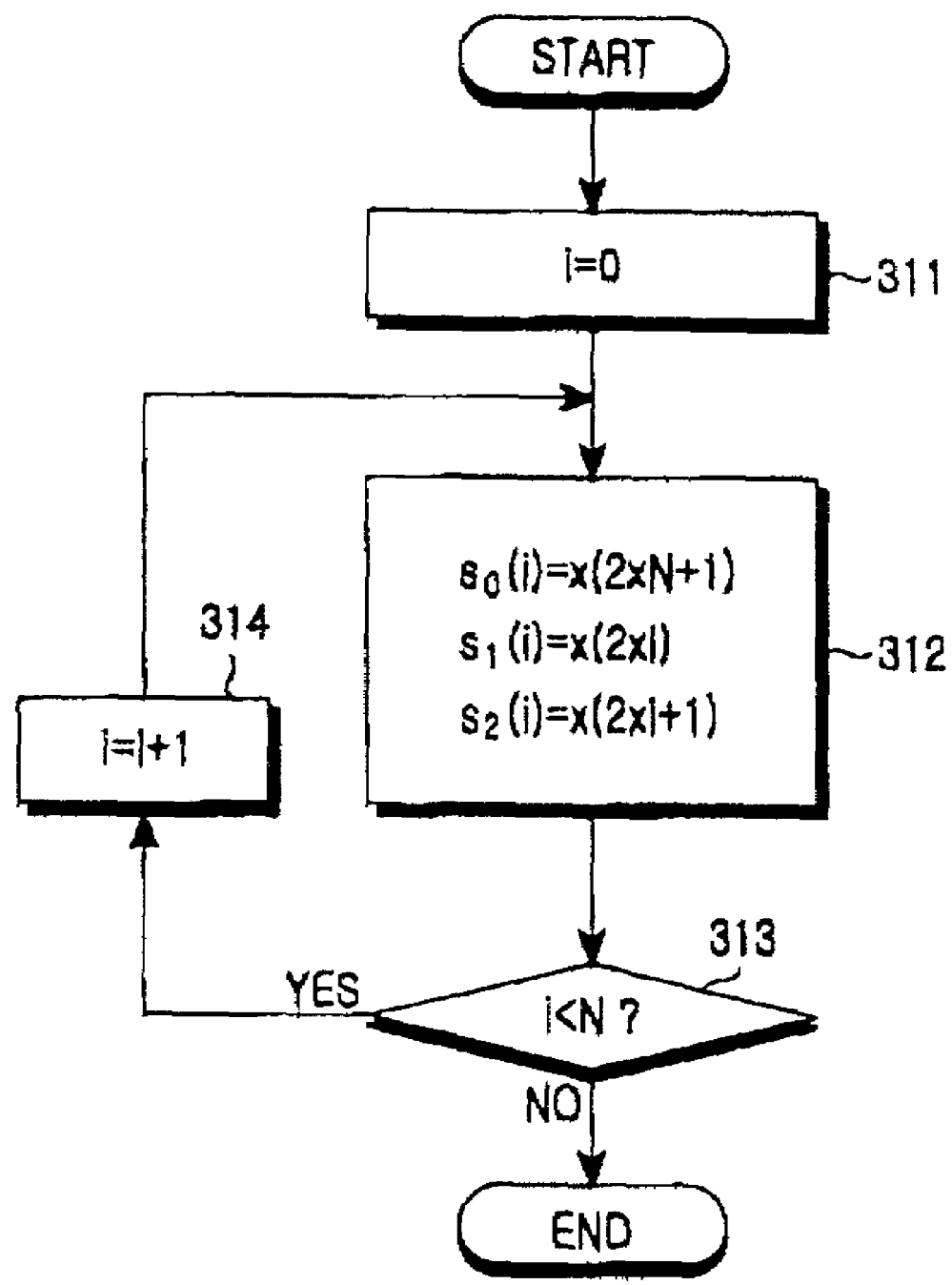
FIG. 22 illustrates a procedure for performing a bit rearrangement operation for 8PSK modulation in which power is uniformly allocated to the codeword sequence according to an embodiment of the present invention.

FIG. 22 illustrates a procedure for performing a bit rearrangement operation for 8PSK modulation in which power is uniformly allocated to the codeword sequence according to an embodiment of the present invention. This procedure is performed by the sequence mapper 130 of FIG. 1.

Referring to FIG. 22, in step 311, the sequence mapper 130 sets i to zero (i=0). In step 312, the sequence mapper 130 performs an operation of rearranging the bits of the codeword sequence in the corresponding bit positions of the modulated bit in accordance with Equations (17) to (19). That is, the sequence mapper 130 maps a bit x(2×N+i) in a bit stream of the codeword sequence to a first bit position $s_0(i)$ of an $i^{th}$ modulated bit, maps a bit x(2×i) in the bit stream of the codeword sequence to a second bit position $s_1(i)$ of the $i^{th}$ modulated bit, and maps a bit x(2×i+1) in the bit stream of the codeword sequence to a third bit position $s_2(i)$ of the $i^{th}$ modulated bit. The operation of step 312 is repeatedly performed until it is determined in step 313 that the bit mapping has been completely performed on all the bits of the codeword sequence. That is, if it is determined in step 313 that i is less than N, the sequence mapper 130 increases i by 1 in step 314, and then returns to step 312.

Embodiment C-2 (for 16QAM Modulation)

As mentioned before, 2 of 4 bits constituting one 16QAM-modulated bit have higher reliability than the remaining 2 bits. If it is assumed that the signal constellation diagram of FIG. 4 is used, a second bit $s_1$ and a fourth bit $s_3$ have higher reliability than a first bit $s_0$ and a third bit $s_2$. In this case, an operation of rearranging the output codeword sequence of the channel encoder or the channel interleaver before modulation by the sequence mapper 130 of FIG. 1 is performed as follows.

1. For the bits in a first period, the sequence mapper 130 sequentially maps first to $\{2 \times N\}^{th}$ bits to positions of a second bit $s_1$ and a fourth bit $s_3$ in each of N modulated bits.

2. For the bits in a second period, the sequence mapper 130 sequentially maps the remaining $\{2 \times N+1\}^{th}$ to $\{4 \times N\}^{th}$ bits to positions of a first bit $s_0$ and a third bit $s_2$ in each of N modulated bits.

Figure 23:
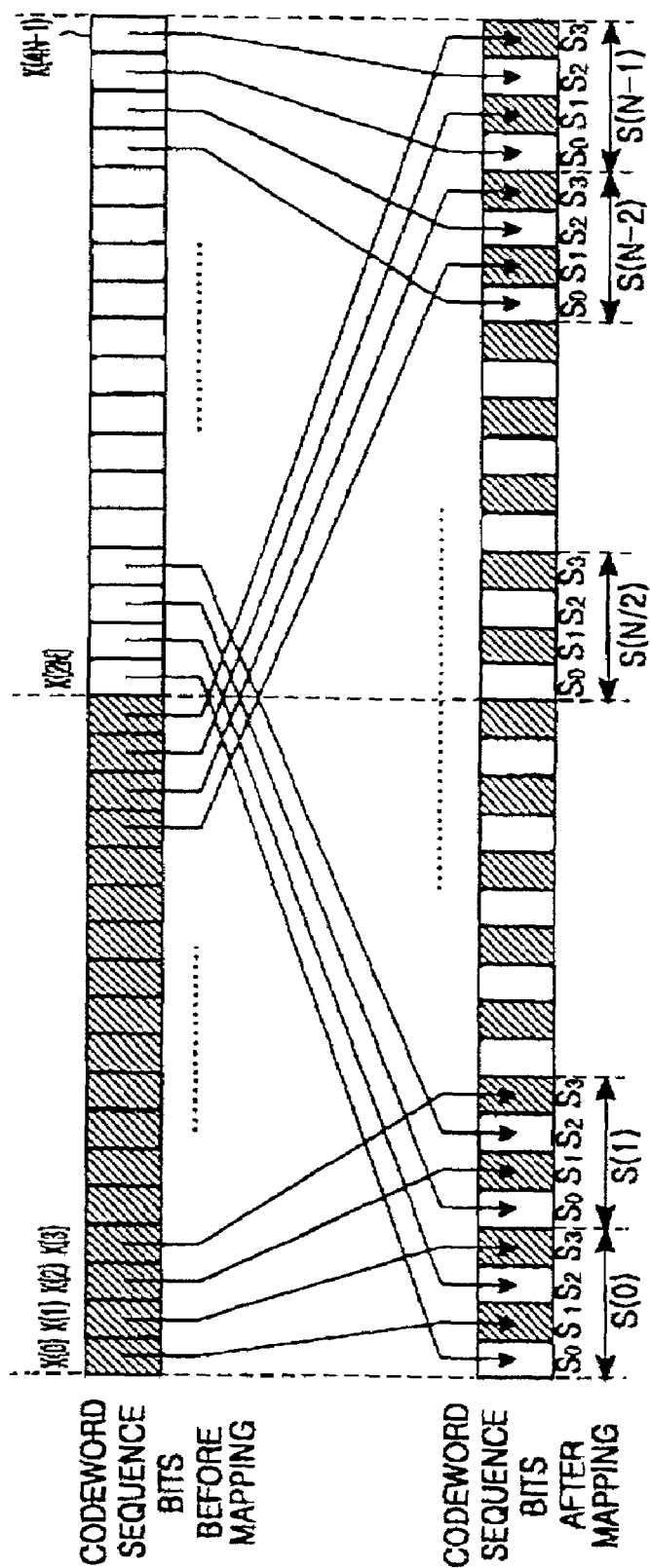
FIG. 23 illustrates a bit rearrangement operation for 16QAM modulation in which power is uniformly allocated to the codeword sequence according to an embodiment of the present invention.

These processes are summarized into Equations (20) to (23). The bits of the codeword sequence before rearrangement are rearranged as shown in FIG. 23.

$$s_0(i)=x(2 \times N+2 \times i) \qquad (20)$$

$$s_1(i)=x(2 \times i) \qquad (21)$$

$$s_2(i)=x(2 \times N+2 \times i+1) \qquad (22)$$

$$s_3(i)=x(2 \times i+1) \qquad (23)$$

FIG. 23 illustrates a bit rearrangement operation for 16QAM modulation in which power is uniformly allocated to the codeword sequence according to an embodiment of the present invention. It should be noted that this bit rearrangement operation is identical to the bit rearrangement operation shown in FIG. 11.

Referring to FIG. 23, a codeword sequence comprised of a 4N-bit stream is divided into a first period and a second period. The first period is a duration between a first bit x(0) and a $\{2 \times N\}^{th}$ bit x(2N-1) of the codeword sequence, and the second period is a duration between a $\{2\times N+1\}^{th}$ bit x(2N) and a $\{4\times N\}^{th}$ bit x(4N−1) of the codeword sequence. Here, the modulated bit is comprised of 4 bits, and the number of modulated bits corresponding to the codeword sequence is N.

A first bit x(2N) in the second period of the codeword sequence is mapped to a first bit position $s_0(0)$ of a first modulated bit, a first bit x(0) in the first period of the codeword sequence is mapped to a second bit position $s_1(0)$ of the first modulated bit, a second bit x(2N+1) n the second period of the codeword sequence is mapped to a third bit position $s_2(0)$ of the first modulated bit, and a second bit x(1) in the first period of the codeword sequence is mapped to a fourth bit position $s_3(0)$ of the first modulated bit.

A third bit x(2N+2) in the second period of the codeword sequence is mapped to a first bit position $s_0(1)$ of a second modulated bit, a third bit x(2) in the first period of the codeword sequence is mapped to a second bit position $s_1(1)$ of the second modulated bit, a fourth bit x(2N+3) in the second period of the codeword sequence is mapped to a third bit position $s_2(1)$ of the second modulated bit, and a fourth bit x(3) in the first period of the codeword sequence is mapped to a fourth bit position $s_3(1)$ of the second modulated bit.

A $\{4N-3\}^{th}$ bit x(4N−4) in the second period of the codeword sequence is mapped to a first bit position $s_0(N-2)$ of an $(N-1)^{th}$ modulated bit, a $\{2N-3\}^{th}$ bit x(2N−4) in the first period of the codeword sequence is mapped to a second bit position $s_1(N-2)$ of the $(N-1)^{th}$ modulated bit, a $\{4N-2\}^{th}$ bit x(4N−3) in the second period of the codeword sequence is mapped to a third bit position $s_2(N-2)$ of the $(N-1)^{th}$ modulated bit, and a $\{2N-2\}^{th}$ bit x(2N−3) in the first period of the codeword sequence is mapped to a fourth bit position $s_3(N-2)$ of the $(N-1)^{th}$ modulated bit.

A $\{4N-1\}^{th}$ bit x(4N−2) in the second period of the codeword sequence is mapped to a first bit position $s_0(N-1)$ of an $N^{th}$ modulated bit, a $\{2N-1\}^{th}$ bit x(2N−2) in the first period of the codeword sequence is mapped to a second bit position $s_1(N-1)$ of the $N^{th}$ modulated bit, a $\{4\times N\}^{th}$ bit x(4N−1) in the second period of the codeword sequence is mapped to a third bit position $s_2(N-1)$ of the $N^{th}$ modulated bit, and a $\{2\times N\}^{th}$ bit x(2N−1) in the first period of the codeword sequence is mapped to a fourth bit position $s_3(N-1)$ of the $N^{th}$ modulated bit.

Figure 24:
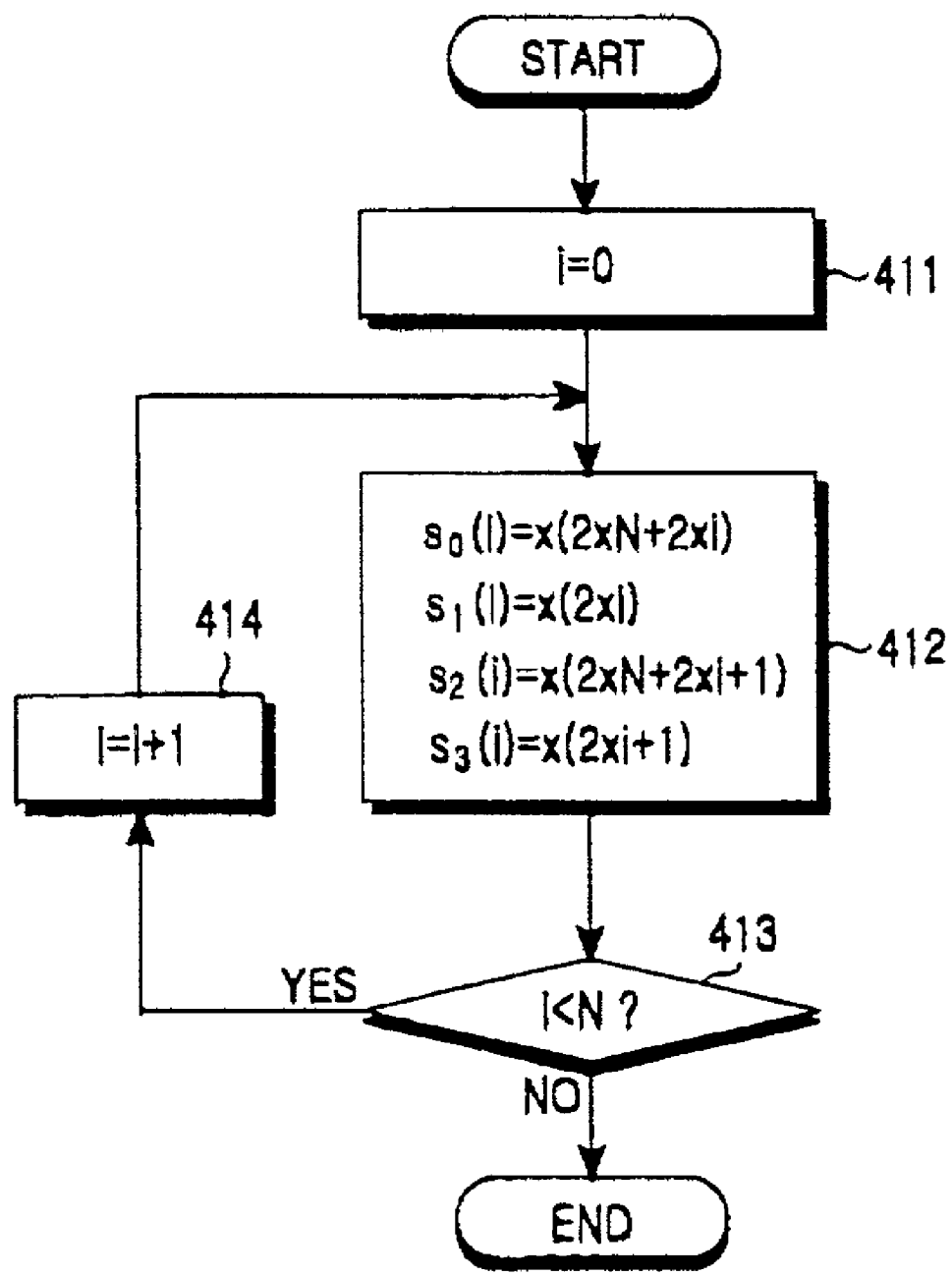
FIG. 24 illustrates a procedure for performing a bit rearrangement operation for 16QAM modulation in which power is uniformly allocated to the codeword sequence according to an embodiment of the present invention.

FIG. 24 illustrates a procedure for performing a bit rearrangement operation for 16QAM modulation in which power is uniformly allocated to the codeword sequence according to an embodiment of the present invention. This procedure is performed by the sequence mapper 130 of FIG. 1.

Referring to FIG. 24, in step 411, the sequence mapper 130 sets i to zero (i=0). In step 412, the sequence mapper 130 performs an operation of rearranging the bits of the codeword sequence in the corresponding bit positions of the modulated bit in accordance with Equations (20) to (23). That is, the sequence mapper 130 maps a bit x(2×N+2×i) in a bit stream of the codeword sequence to a first bit position $s_0(i)$ of an $i^{th}$ modulated bit, maps a bit x(2×i) in the bit stream of the codeword sequence to a second bit position $s_1(i)$ of the $i^{th}$ modulated bit, maps a bit x(2×N+2×i+1) in the bit stream of the codeword sequence to a third bit position $s_2(i)$ of the $i^{th}$ modulated bit, and maps a bit x(2×i+1) in the bit stream of the codeword sequence to a fourth bit position $s_3(i)$ of the $i^{th}$ modulated bit. The operation of step 412 is repeatedly performed until it is determined in step 413 that the bit mapping has been completely performed on all the bits of the codeword sequence. That is, if it is determined in step 413 that i is less than N, the sequence mapper 130 increases i by 1 in step 414, and then returns to step 412.

Embodiment C-3 (for 64QAM Modulation)

As mentioned before, 2 of 6 bits constituting one 64QAM-modulated bit have higher reliability than the remaining 2 pairs of the bits. If it is assumed that the signal constellation diagram of FIG. 5 is used, a third bit $s_2$ and a sixth bit $s_5$ have higher reliability than a second bit $s_1$ and a fifth bit $s_4$, and a first bit $s_0$ and a fourth bit $s_3$ have the lowest reliability. In this case, an operation of rearranging the output codeword sequence of the channel encoder or the channel interleaver before modulation by the sequence mapper 130 is performed as follows.

1. For the bits in a first period, the sequence mapper 130 sequentially maps first to $\{2\times N\}^{th}$ bits to positions of a third bit $s_2$ and a sixth bit $s_5$ in each of N modulated bits.

2. For the bits in a second period, the sequence mapper 130 sequentially maps $\{2\times N+1\}^{th}$ to $\{4\times N\}^{th}$ bits to positions of a second bit $s_1$ and a fifth bit $s_4$ in each of N modulated bits.

3. For the bits in a third period, the sequence mapper 130 sequentially maps the remaining $\{4\times N+1\}^{th}$ to $\{6\times N\}^{th}$ bits to positions of a first bit $s_0$ and a fourth bit $s_3$ in each of N modulated bits.

Figure 25:
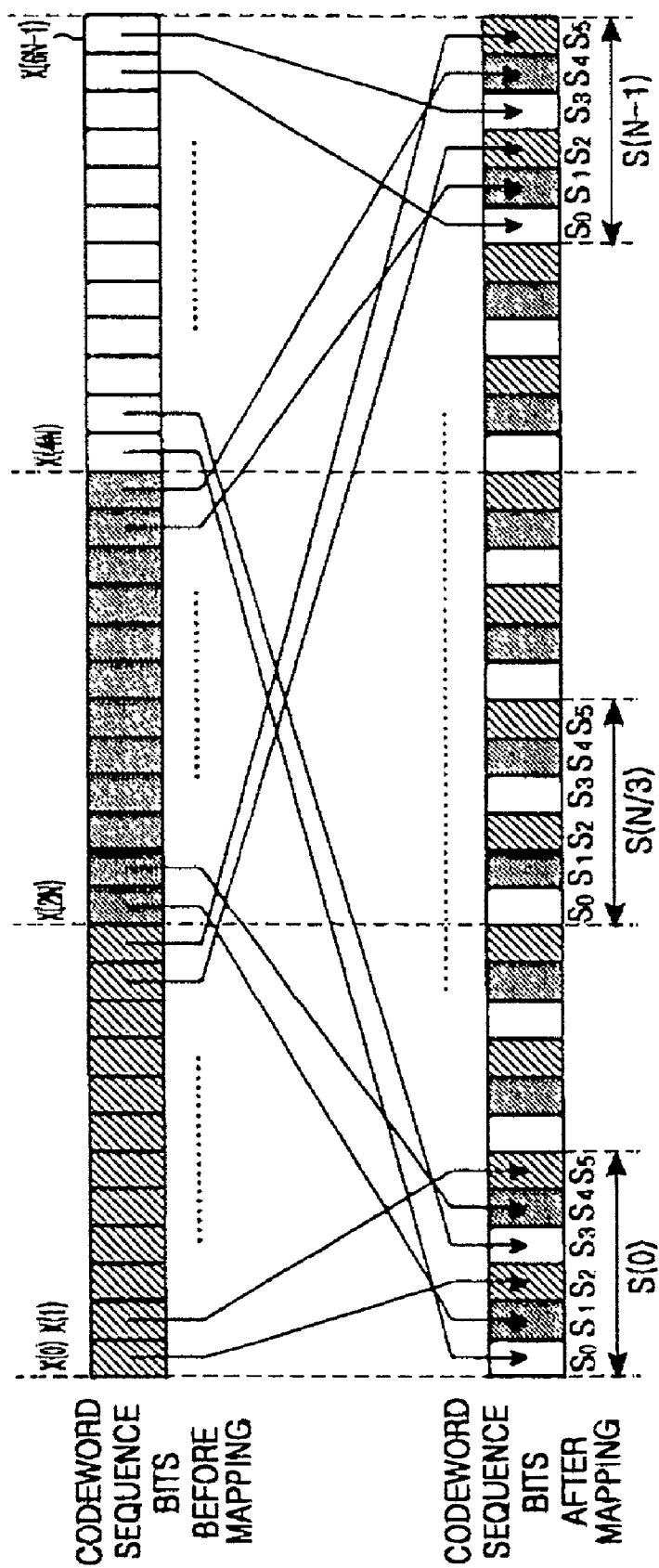
FIG. 25 illustrates a bit rearrangement operation for 64QAM modulation in which power is uniformly allocated to the codeword sequence according to an embodiment of the present invention.

These processes are summarized into Equations (24) to (29). The bits of the codeword sequence before rearrangement are rearranged as shown in FIG. 25.

$$s_0(i)=x(4\times N+2\times i) \quad (24)$$

$$s_1(i)=x(2\times N+2\times i) \quad (25)$$

$$s_2(i)=x(2\times i) \quad (26)$$

$$s_3(i)=x(4\times N+2\times i+1) \quad (27)$$

$$s_4(i)=x(2\times N+2\times i+1) \quad (28)$$

$$s_5(i)=x(2\times i+1) \quad (29)$$

FIG. 25 illustrates a bit rearrangement operation for 64QAM modulation in which power is uniformly allocated to the codeword sequence according to an embodiment of the present invention. It should be noted that this bit rearrangement operation is identical to the bit rearrangement operation shown in FIG. 13.

Referring to FIG. 25, a codeword sequence comprised of a 6N-bit stream is divided into a first period, a second period and a third period. The first period is a duration between a first bit x(0) and a $\{2\times N\}^{th}$ bit x(2N−1) of the codeword sequence. The second period is a duration between a $\{2\times N+1\}^{th}$ bit x(2N) and a $\{4\times N\}^{th}$ bit x(4N−1) of the codeword sequence. The third period is a duration between a $\{4\times N+1\}^{th}$ bit x(4N) and an $\{6\times N\}^{th}$ bit x(6N−1) of the codeword sequence. Here, the modulated bit is comprised of 6 bits, and the number of modulated bits corresponding to the codeword sequence is N.

A first bit $x_{4N}$ in the third period of the codeword sequence is mapped to a first bit position $s_0(0)$ of a first modulated bit, a first bit x(2N) in the second period of the codeword sequence is mapped to a second bit position $s_1(0)$ of the first modulated bit, a first bit x(0) in the first period of the codeword sequence is mapped to a third bit position $s_2(0)$ of the first modulated bit, a second bit x(4N+1) in the third period of the codeword sequence is mapped to a fourth bit position $s_3(0)$ of the first modulated bit, a second bit x(2N+1) in the second period of the codeword sequence is mapped to a fifth bit position $s_4(0)$ of the first modulated bit, and a second bit $x(1)$ in the first period of the codeword sequence is mapped to a sixth bit position $s_5(0)$ of the first modulated bit.

A $\{6N-1\}^{th}$ bit $x(6N-2)$ in the third period of the codeword sequence is mapped to a first bit position $s_0(N-1)$ of an $N^{th}$ modulated bit, a $\{4N-1\}^{th}$ bit $x(4N-2)$ in the second period of the codeword sequence is mapped to a second bit position $s_1(N-1)$ of the $N^{th}$ modulated bit, a $\{2N-1\}^{th}$ bit $x(2N-2)$ in the first period of the codeword sequence is mapped to a third bit position $s_2(N-1)$ of the $N^{th}$ modulated bit, a $\{6 \times N\}^{th}$ bit $x(6N-1)$ in the third period of the codeword sequence is mapped to a fourth bit position $s_3(N-1)$ of the $N^{th}$ modulated bit, a $\{4 \times N\}^{th}$ bit $x(4N-1)$ in the second period of the codeword sequence is mapped to a fifth bit position $s_4(N-1)$ of the $N^{th}$ modulated bit, and a $\{2 \times N\}^{th}$ bit $x(2N-1)$ in the first period of the codeword sequence is mapped to a sixth bit position $s_5(N-1)$ of the $N^{th}$ modulated bit.

Figure 26:
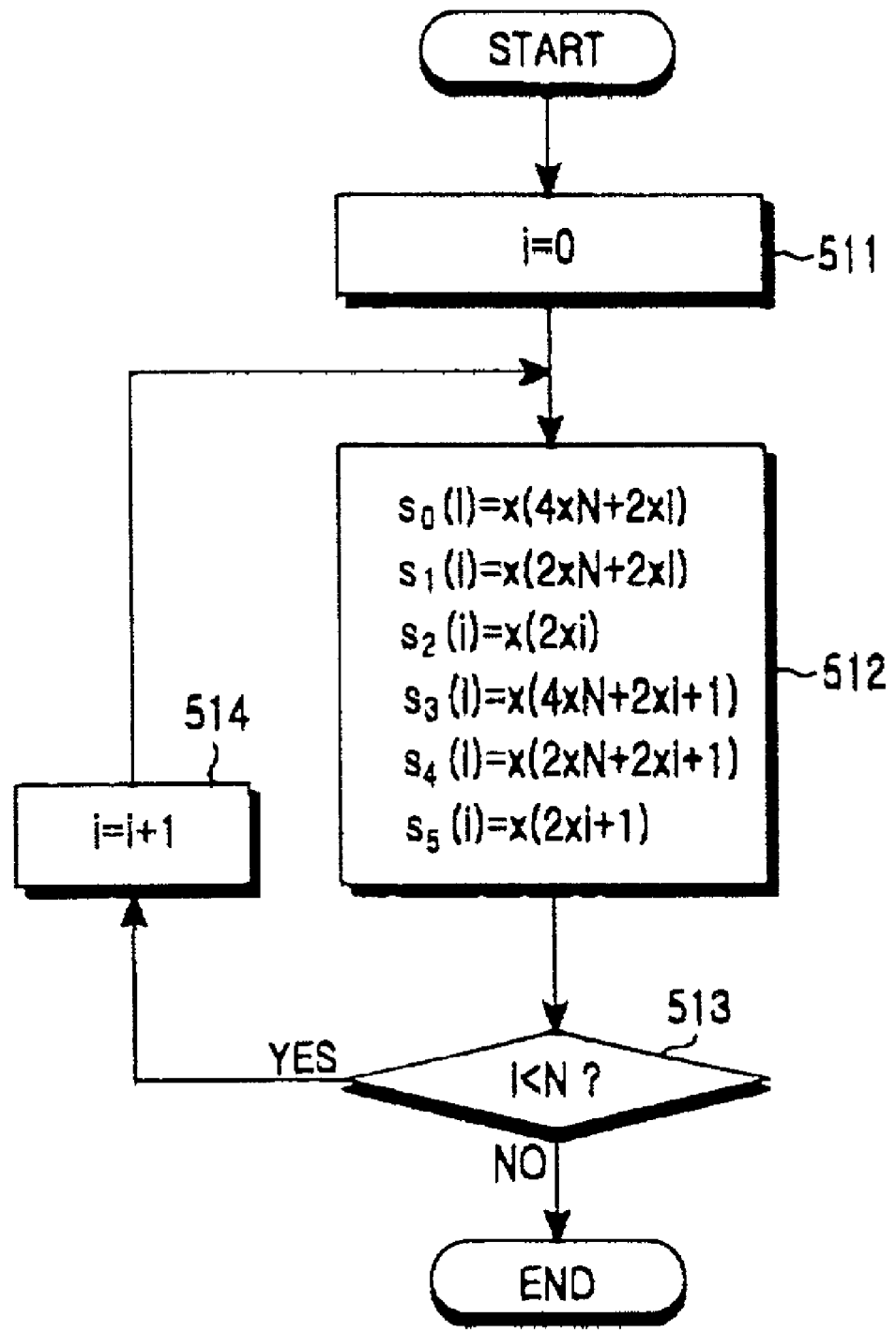
FIG. 26 illustrates a procedure for performing a bit rearrangement operation for 64QAM modulation in which power is uniformly allocated to the codeword sequence according to an embodiment of the present invention.

FIG. 26 illustrates a procedure for performing a bit rearrangement operation for 64QAM modulation in which power is uniformly allocated to the codeword sequence according to an embodiment of the present invention. This procedure is performed by the sequence mapper 130 of FIG. 1.

Referring to FIG. 26, in step 511, the sequence mapper 130 sets i to zero (i=0). In step 512, the sequence mapper 130 performs an operation of rearranging the bits of the codeword sequence in the corresponding bit positions of the modulated bit in accordance with Equations (24) to (29). That is, the sequence mapper 130 maps a bit $x(4 \times N+2 \times i)$ in a bit stream of the codeword sequence to a first bit position $s_0(i)$ of an $i^{th}$ modulated bit, maps a bit $x(2 \times N+2 \times i)$ in the bit stream of the codeword sequence to a second bit position $s_1(i)$ of the $i^{th}$ modulated bit, maps a bit $x(2 \times i)$ in the bit stream of the codeword sequence to a third bit position $s_2(i)$ of the $i^{th}$ modulated bit, maps a bit $x(4 \times N+2 \times i+1)$ in the bit stream of the codeword sequence to a fourth bit position $s_3(i)$ of the $i^{th}$ modulated bit, maps a bit $x(2 \times N+2 \times i+1)$ in the bit stream of the codeword sequence to a fifth bit position $s_4(i)$ of the $i^{th}$ modulated bit, and maps a bit $x(2 \times i+1)$ in the bit stream of the codeword sequence to a sixth bit position $s_5(i)$ of the $i^{th}$ modulated bit. The operation of step 512 is repeatedly performed until it is determined in step 513 that the bit mapping has been completely performed on all the bits of the codeword sequence. That is, if it is determined in step 513 that i is less than N, the sequence mapper 130 increases i by 1 in step 514, and then returns to step 512.

D. Different Power Levels Being Allocated to Front Part and Rear Part of Codeword Sequence A description of an operation for the case where the power is non-uniformly allocated to the codeword sequence can be separately made for the following two cases.

In a first case, a higher power level is applied to the front part of the codeword sequence, while a lower power level is applied to the rear part of the codeword sequence. Such power allocation is illustrated in FIG. 7. In this case, the output bits of the channel encoder or the channel interleaver are rearranged in the same method as used when the power is uniformly allocated to the codeword sequence. This is because when the power is unavoidably non-uniformly allocated to the codeword sequence, it is preferable to allocate a higher power level to the systematic part and a lower power level to the parity part in order to secure better performance.

In a second case, to the contrary, a lower power level is applied to the front part of the codeword sequence, while a higher power level is applied to the rear part of the codeword sequence. Such power allocation is illustrated in FIG. 8. In this case, the bit rearrangement method used when the power is uniformly allocated to the codeword sequence is modified because allocating a higher power level to the systematic part shows better performance than allocating a higher power level to the parity part. That is, in order to allocate a higher power level to the systematic part, it is necessary to arrange a specific part of the codeword sequence to the bit positions with the same reliability in an order that is reversed with respect to the order as described in the above cases. An operation of this case will be described with reference to the respective modulation techniques.

Embodiment D-1 (for 8PSK Modulation)

1. For the bits in a first period, the sequence mapper 130 maps, in reverse order, first to $\{2 \times N\}^{th}$ bits to positions of a third bit $s_2$ and a second bit $s_1$ in each of N modulated bits.

2. For the bits in a second period, the sequence mapper 130 maps, in reverse order, the remaining $\{2 \times N+1\}^{th}$ to $\{3 \times N\}^{th}$ bits to a first bit position $s_0$ in each of N modulated bits.

Figure 27:
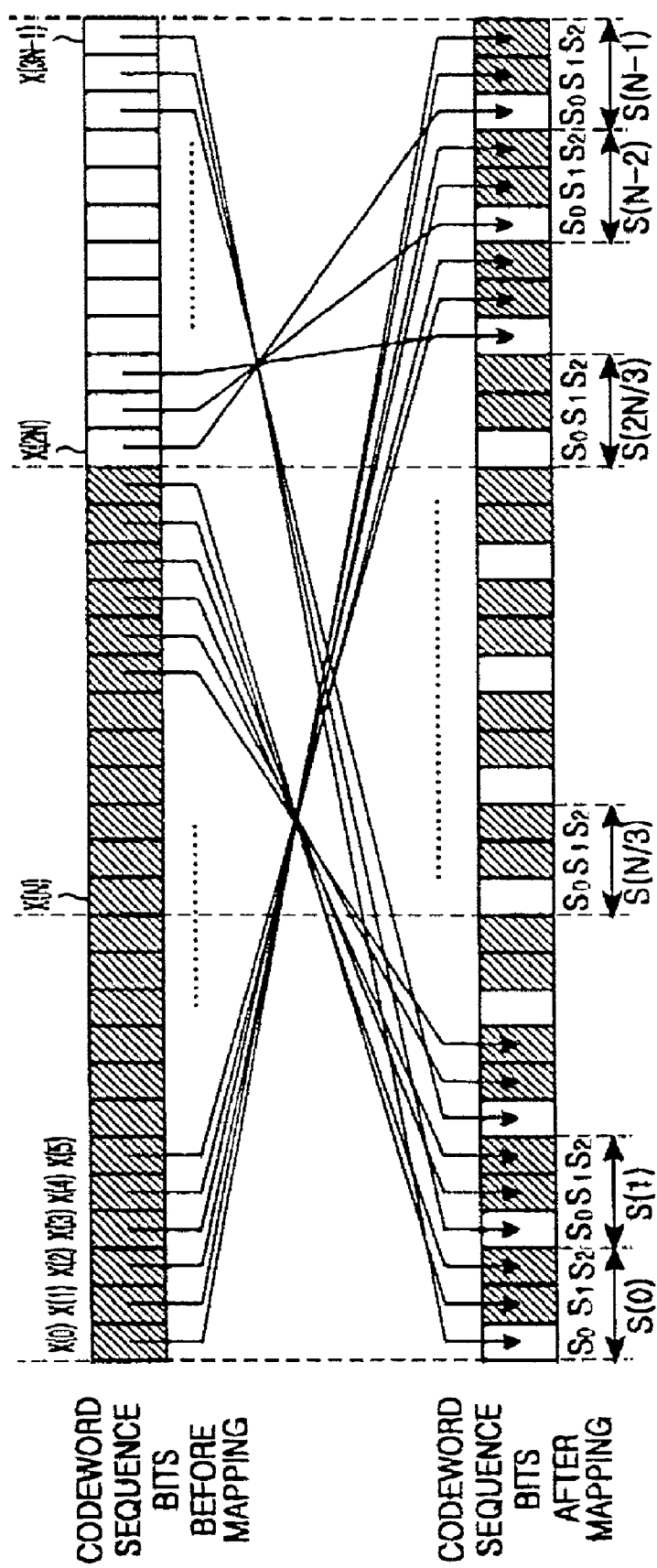
FIG. 27 illustrates a bit rearrangement operation for 8PSK modulation in which a higher power level is allocated to the rear part of the codeword sequence according to an embodiment of the present invention.

These processes are summarized into Equations (30) and (32). The bits of the codeword sequence before rearrangement are rearranged as shown in FIG. 27.

$$s_0(N-1-i)=x(2 \times N+i) \tag{30}$$

$$s_1(N-1-i)=x(2 \times i+1) \tag{31}$$

$$s_2(N-1-i)=x(2 \times i) \tag{32}$$

FIG. 27 illustrates a bit rearrangement operation for 8PSK modulation in which a higher power level is allocated to the rear part of the codeword sequence according to an embodiment of the present invention. It should be noted that this bit rearrangement operation is identical to the bit rearrangement operation shown in FIG. 15.

Referring to FIG. 27, a codeword sequence comprised of a 3N-bit stream is divided into a first period and a second period. The first period is a duration between a first bit $x_0$ and a $\{2 \times N\}^{th}$ bit $x(2N-1)$ of the codeword sequence, and the second period is a duration between a $\{2 \times N+1\}^{th}$ bit $x(2N)$ and a $\{3 \times N\}^{th}$ bit $x(3N-1)$ of the codeword sequence. Here, the modulated bit is comprised of 3 bits, and the number of modulated bits corresponding to the codeword sequence is N.

A $\{3 \times N\}^{th}$ bit $x(3N-1)$ in the second period of the codeword sequence is mapped to a first bit position $s_0(0)$ of a first modulated bit, a $\{2 \times N\}^{th}$ bit $x(2N-1)$ in the first period of the codeword sequence is mapped to a second bit position $s_1(0)$ of the first modulated bit, and a $\{2 \times N-1\}^{th}$ bit $x(2N-2)$ in the first period of the codeword sequence is mapped to a third bit position $s_2(0)$ of the first modulated bit.

A $\{3 \times N-1\}^{th}$ bit $x(3N-2)$ in the second period of the codeword sequence is mapped to a first bit position $s_0(1)$ of a second modulated bit, a $\{2 \times N-2\}^{th}$ bit $x(2N-3)$ in the first period of the codeword sequence is mapped to a second bit position $s_1(1)$ of the second modulated bit, and a $\{2 \times N-3\}^{th}$ bit $x(2N-4)$ in the first period of the codeword sequence is mapped to a third bit position $s_2(1)$ of the second modulated bit.

A $\{3 \times N-2\}^{th}$ bit $x(3N-3)$ in the second period of the codeword sequence is mapped to a first bit position $s_0(2)$ of a third modulated bit, a $\{2 \times N-4\}^{th}$ bit $x(2N-5)$ in the first period of the codeword sequence is mapped to a second bit position $s_1(2)$ of the third modulated bit, and a $\{2 \times N-5\}^{th}$ bit $x(2N-6)$ in the first period of the codeword sequence is mapped to a third bit position $s_2(2)$ of the third modulated bit.

A second bit x(2N+1) in the second period of the codeword sequence is mapped to a first bit position $s_0(N-2)$ of an $\{N-1\}^{th}$ modulated bit, a fourth bit x(3) in the first period of the codeword sequence is mapped to a second bit position $s_1(N-2)$ of the $\{N-1\}^{th}$ modulated bit, and a third bit x(2) in the first period of the codeword sequence is mapped to a third bit position $s_2(N-2)$ of the $\{N-1\}^{th}$ modulated bit.

A first bit x(2N) in the second period of the codeword sequence is mapped to a first bit position $s_0(N-1)$ of an $N^{th}$ modulated bit, a second bit x(1) in the first period of the codeword sequence is mapped to a second bit position $s_1(N-1)$ of the $N^{th}$ modulated bit, and a first bit x(0) in the first period of the codeword sequence is mapped to a third bit position $s_2(N-1)$ of the $N^{th}$ modulated bit.

Figure 28:
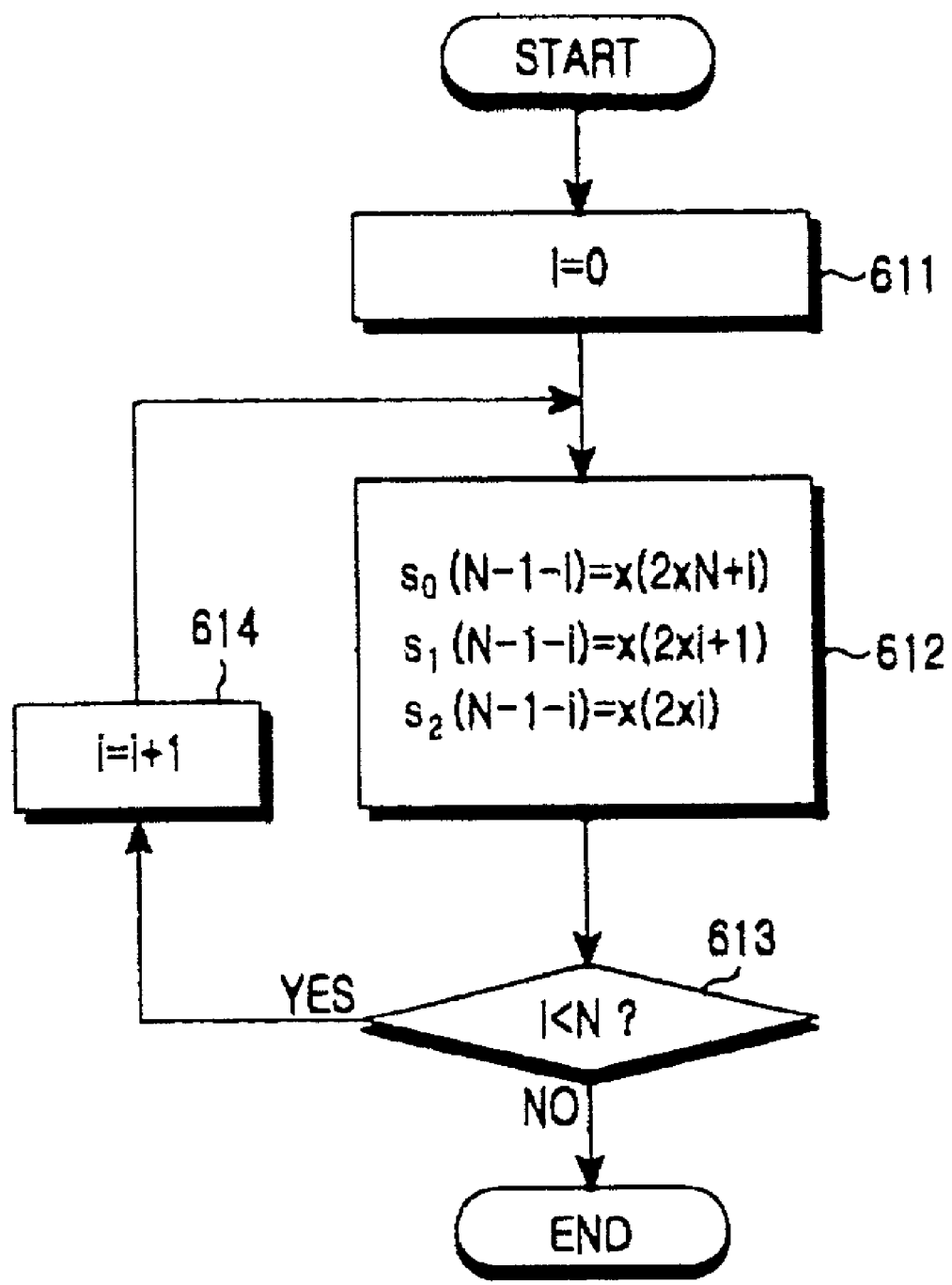
FIG. 28 illustrates a procedure for performing a bit rearrangement operation for 8PSK modulation in which a higher power level is allocated to the rear part of the codeword sequence according to an embodiment of the present invention.

FIG. 28 illustrates a procedure for performing a bit rearrangement operation for 8PSK modulation in which a higher power level is allocated to the rear part of the codeword sequence according to an embodiment of the present invention. This procedure is performed by the sequence mapper 130 of FIG. 1.

Referring to FIG. 28, in step 611, the sequence mapper 130 sets i to zero (i=0). In step 612, the sequence mapper 130 performs an operation of rearranging the bits of the codeword sequence in the corresponding bit positions of the modulated bit in accordance with Equations (30) to (32). That is, the sequence mapper 130 maps a bit x(2×N+i) in a bit stream of the codeword sequence to a first bit position $s_0(N-1-i)$ of an $\{N-1-i\}^{th}$ modulated bit, maps a bit x(2×i+1) in the bit stream of the codeword sequence to a second bit position $s_1(N-1-i)$ of the $\{N-1-i\}^{th}$ modulated bit, and maps a bit x(2×i) in the bit stream of the codeword sequence to a third bit position $s_2(N-1-i)$ of the $\{N-1-i\}^{th}$ modulated bit. The operation of step 612 is repeatedly performed until it is determined in step 613 that the bit mapping has been completely performed on all the bits of the codeword sequence. That is, if it is determined in step 613 that i is less than N, the sequence mapper 130 increases i by 1 in step 614, and then returns to step 612.

Embodiment D-2 (for 16QAM Modulation)

1. For the bits in a first period, the sequence mapper 130 maps, in reverse order, first to $\{2 \times N\}^{th}$ bits to positions of a fourth bit $s_3$ and a second bit $s_1$ in each of N modulated bits.

2. For the bits in a second period, the sequence mapper 130 maps, in reverse order, the remaining $\{2 \times N+1\}^{th}$ to $\{4 \times N\}^{th}$ bits to positions of a third bit $s_2$ and a first bit $s_0$ in each of N modulated bits.

These processes are summarized into Equations (33) and (36). The bits of the codeword sequence before rearrangement are rearranged as shown in FIG. 17.

$$s_0(N-1-i) = x(2 \times N + 2 \times i + 1) \quad (33)$$

$$s_1(N-1-i) = x(2 \times i + 1) \quad (34)$$

$$s_2(N-1-i) = x(2 \times N + 2 \times i) \quad (35)$$

$$s_3(N-1-i) = x(2 \times i) \quad (36)$$

Figure 29:
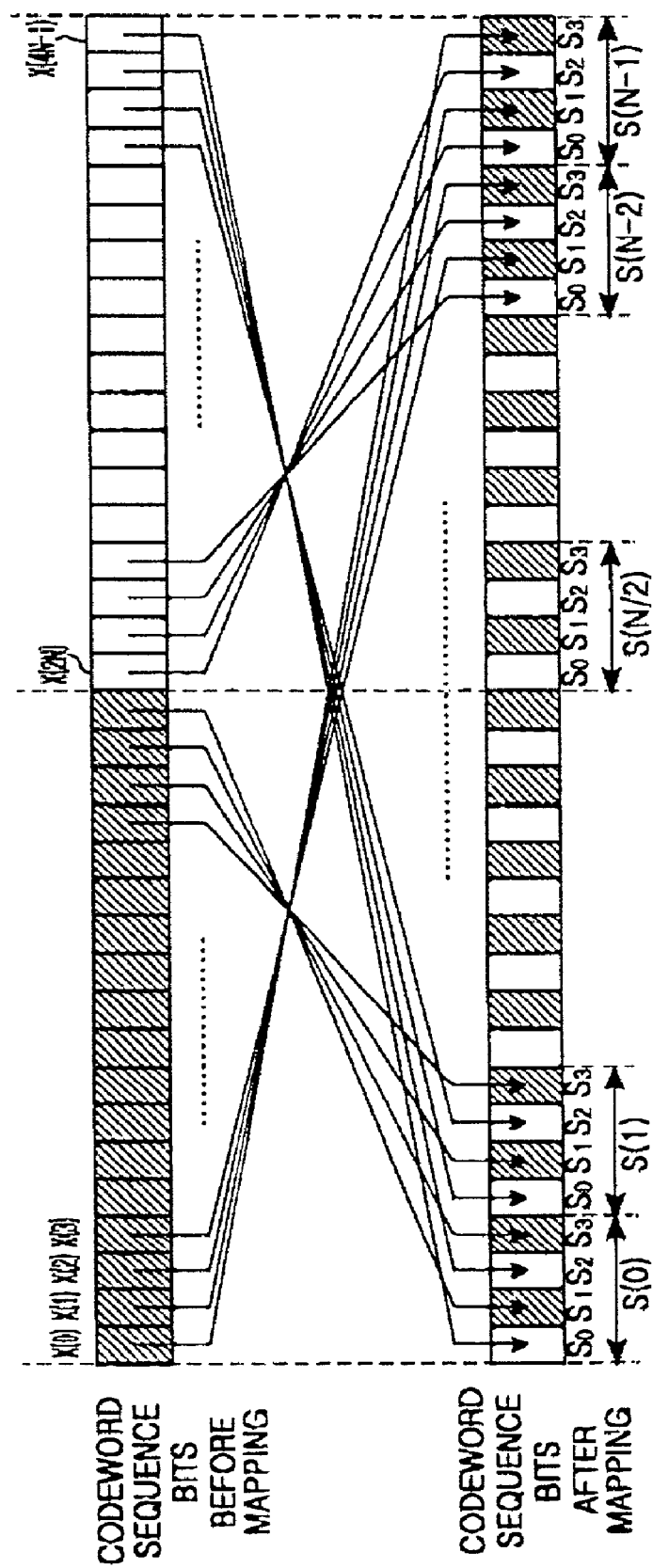
FIG. 29 illustrates a bit rearrangement operation for 16QAM modulation in which a higher power level is allocated to the rear part of the codeword sequence according to an embodiment of the present invention.

FIG. 29 illustrates a bit rearrangement operation for 16QAM modulation in which a higher power level is allocated to the rear part of the codeword sequence according to an embodiment of the present invention. It should be noted that this bit rearrangement operation is identical to the bit rearrangement operation shown in FIG. 17.

Referring to FIG. 29, a codeword sequence comprised of a 4N-bit stream is divided into a first period and a second period. The first period is a duration between a first bit x(0) and a $\{2 \times N\}^{th}$ bit x(2N-1) of the codeword sequence, and the second period is a duration between a $\{2 \times N+1\}^{th}$ bit x(2N) and a $\{4 \times N\}^{th}$ bit x(4N-1) of the codeword sequence. Here, the modulated bit is comprised of 4 bits, and the number of modulated bits corresponding to the codeword sequence is N.

A $\{4 \times N\}^{th}$ bit x(4N-1) in the second period of the codeword sequence is mapped to a first bit position $s_0(0)$ of a first modulated bit, a $\{2 \times N\}^{th}$ bit x(2N-1) in the first period of the codeword sequence is mapped to a second bit position $s_1(0)$ of the first modulated bit, a $\{4 \times N-1\}^{th}$ bit x(4N-2) in the second period of the codeword sequence is mapped to a third bit position $s_2(0)$ of the first modulated bit, and a $\{2 \times N-1\}^{th}$ bit x(2N-2) in the first period of the codeword sequence is mapped to a fourth bit position $s_3(0)$ of the first modulated bit.

A $\{4 \times N-2\}^{th}$ bit x(4N-3) in the second period of the codeword sequence is mapped to a first bit position $s_0(1)$ of a second modulated bit, a $\{2 \times N-2\}^{th}$ bit x(2N-3) in the first period of the codeword sequence is mapped to a second bit position $s_1(1)$ of the second modulated bit, a $\{4 \times N-3\}^{th}$ bit x(4N-4) in the second period of the codeword sequence is mapped to a third bit position $s_2(1)$ of the second modulated bit, and a $\{2 \times N-3\}^{th}$ bit x(2N-4) in the first period of the codeword sequence is mapped to a fourth bit position $s_3(1)$ of the second modulated bit.

A fourth bit x(2N+3) in the second period of the codeword sequence is mapped to a first bit position $s_0(N-2)$ of an $\{N-1\}^{th}$ modulated bit, a fourth bit x(3) in the first period of the codeword sequence is mapped to a second bit position $s_1(N-2)$ of the $\{N-1\}^{th}$ modulated bit, a third bit x(2N+2) in the second period of the codeword sequence is mapped to a third bit position $s_2(N-2)$ of the $\{N-1\}^{th}$ modulated bit, and a third bit x(2) in the first period of the codeword sequence is mapped to a fourth bit position $s_3(N-2)$ of the $\{N-1\}^{th}$ modulated bit.

A second bit x(2N+1) in the second period of the codeword sequence is mapped to a first bit position $s_0(N-1)$ of an $N^{th}$ modulated bit, a second bit x(1) in the first period of the codeword sequence is mapped to a second bit position $s_1(N-1)$ of the $N^{th}$ modulated bit, a first bit x(2N) in the second period of the codeword sequence is mapped to a third bit position $s_2(N-1)$ of the $N^{th}$ modulated bit, and a first bit x(0) in the first period of the codeword sequence is mapped to a fourth bit position $s_3(N-1)$ of the $N^{th}$ modulated bit.

Figure 30:
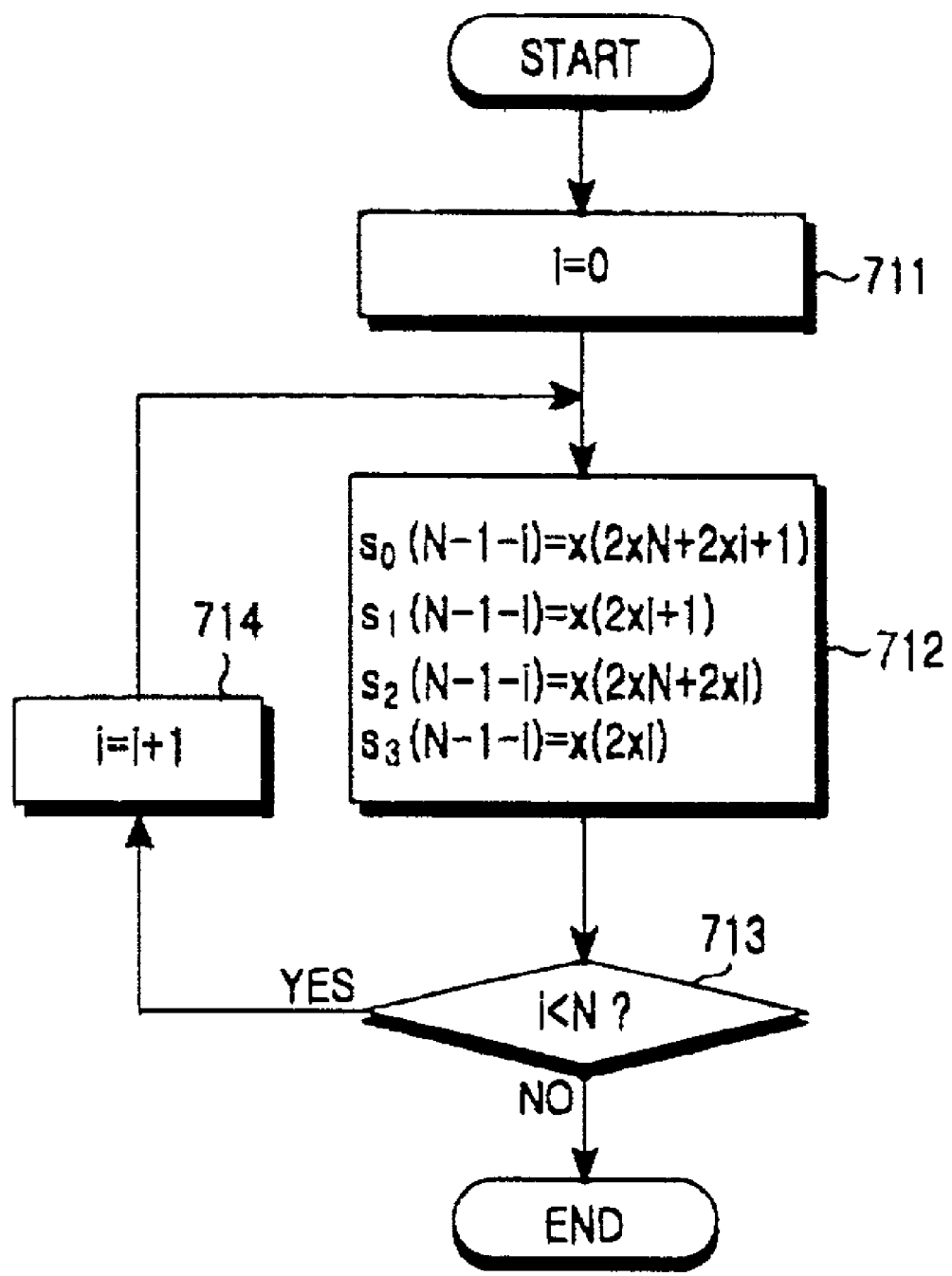
FIG. 30 illustrates a procedure for performing a bit rearrangement operation for 16QAM modulation in which a higher power level is allocated to the rear part of the codeword sequence according to an embodiment of the present invention.

FIG. 30 illustrates a procedure for performing a bit rearrangement operation for 16QAM modulation in which a higher power level is allocated to the rear part of the codeword sequence according to an embodiment of the present invention. This procedure is performed by the sequence mapper 130 of FIG. 1.

Referring to FIG. 30, in step 711, the sequence mapper 130 sets i to zero (i=0). In step 712, the sequence mapper 130 performs an operation of rearranging the bits of the codeword sequence in the corresponding bit positions of the modulated bit in accordance with Equations (33) to (36). That is, the sequence mapper 130 maps a bit x(2×N+2×i+1) in a bit stream of the codeword sequence to a first bit position $s_0(N-1-i)$ of an $\{N-1-i\}^{th}$ modulated bit, maps a bit x(2×i+1) in the bit stream of the codeword sequence to a second bit position $s_1(N-1-i)$ of the $\{N-1-i\}^{th}$ modulated bit, maps a bit x(2×N+2×i) in the bit stream of the codeword sequence to a third bit position $s_2(N-1-i)$ of the $\{N-1-i\}^{th}$ modulated bit, and maps a bit x(2×i) in the bit stream of the codeword sequence to a fourth bit position $s_3(N-1-i)$ of the $\{N-1-i\}^{th}$ modulated bit. The operation of step 712 is repeatedly performed until it is determined in step 713 that the bit mapping has been completely performed on all the bits of the codeword sequence. That is, if it is determined in step 713 that i is less than N, the sequence mapper 130 increases i by 1 in step 714, and then returns to step 712.

Embodiment D-3 (for 64QAM Modulation)

1. For the bits in a first period, the sequence mapper 130 maps, in reverse order, first to $\{2 \times N\}^{th}$ bits to positions of a sixth bit $s_5$ and a third bit $s_2$ in each of N modulated bits.

2. For the bits in a second period, the sequence mapper 130 maps, in reverse order, $\{2 \times N+1\}^{th}$ to $\{4 \times N\}^{th}$ bits to positions of a fifth bit $s_4$ and a second bit $s_1$ in each of N modulated bits.

3. For the bits in a third period, the sequence mapper 130 maps, in reverse order, the remaining $\{4 \times N+1\}^{th}$ to $\{6 \times N\}^{th}$ bits to positions of a fourth bit $s_3$ and a first bit $s_0$ in each of N modulated bits.

Figure 31:
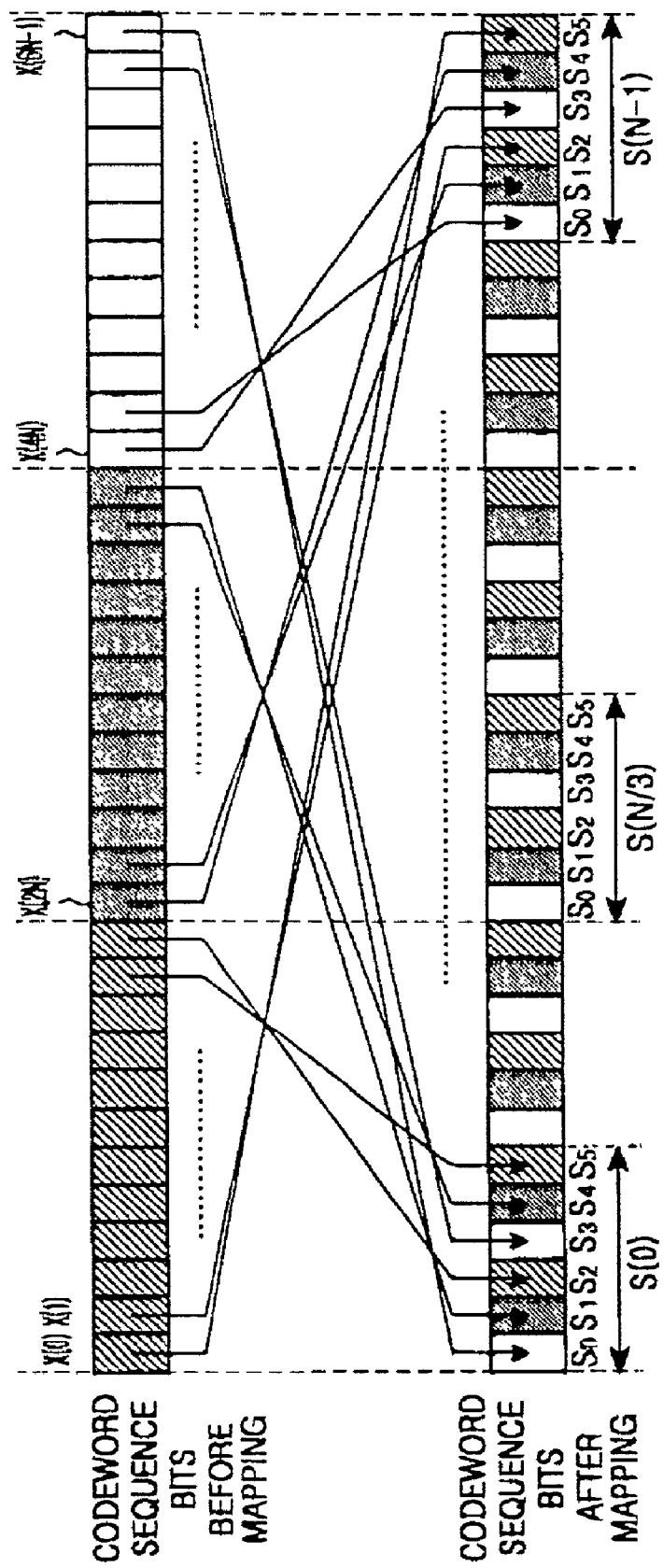
FIG. 31 illustrates a bit rearrangement operation for 64QAM modulation in which a higher power level is allocated to the rear part of the codeword sequence according to an embodiment of the present invention.

These processes are summarized into Equations (37) to (42). The bits of the codeword sequence before rearrangement are rearranged as shown in FIG. 31.

$$s_0(N-1-i)=x(4 \times N+2 \times i+1) \quad (37)$$

$$s_1(N-1-i)=x(2 \times N+2 \times i+1) \quad (38)$$

$$s_2(N-1-i)=x(2 \times i+1) \quad (39)$$

$$s_3(N-1-i)=x(4 \times N+2 \times i) \quad (40)$$

$$s_4(N-1-i)=x(2 \times N+2 \times i) \quad (41)$$

$$s_5(N-1-i)=x(2 \times i) \quad (42)$$

FIG. 31 illustrates a bit rearrangement operation for 64QAM modulation in which a higher power level is allocated to the rear part of the codeword sequence according to an embodiment of the present invention. It should be noted that this bit rearrangement operation is identical to the bit rearrangement operation shown in FIG. 19.

Referring to FIG. 31, a codeword sequence comprised of a 6N-bit stream is divided into a first period, a second period and a third period. The first period is a duration between a first bit x(0) and a $\{2 \times N\}^{th}$ bit x(2N-1) of the codeword sequence. The second period is a duration between a $\{2 \times N+1\}^{th}$ bit x(2N) and a $\{4 \times N\}^{th}$ bit x(4N-1) of the codeword sequence. The third period is a duration between a $\{4 \times N+1\}^{th}$ bit x(4N) and an $\{6 \times N\}^{th}$ bit x(6N-1) of the codeword sequence. Here, the modulated bit is comprised of 6 bits, and the number of modulated bits corresponding to the codeword sequence is N.

A $\{6 \times N\}^{th}$ bit x(6N-1) in the third period of the codeword sequence is mapped to a first bit position $s_0(0)$ of a first modulated bit, a $\{4 \times N\}^{th}$ bit x(4N-1) in the second period of the codeword sequence is mapped to a second bit position $s_1(0)$ of the first modulated bit, a $\{2 \times N\}^{th}$ bit x(2N-1) in the first period of the codeword sequence is mapped to a third bit position $s_2(0)$ of the first modulated bit, a $\{6 \times N-1\}^{th}$ bit x(6N-2) in the third period of the codeword sequence is mapped to a fourth bit position $s_3(0)$ of the first modulated bit, a $\{4 \times N-1\}^{th}$ bit x(4N-2) in the second period of the codeword sequence is mapped to a fifth bit position $s_4(0)$ of the first modulated bit, and a $\{2 \times N-1\}^{th}$ bit x(2N-2) in the first period of the codeword sequence is mapped to a sixth bit position $s_5(0)$ of the first modulated bit.

A second bit x(4N+1) in the third period of the codeword sequence is mapped to a first bit position $s_0(N-1)$ of an $N^{th}$ modulated bit, a second bit x(2N+1) in the second period of the codeword sequence is mapped to a second bit position $s_1(N-1)$ of the $N^{th}$ modulated bit, a second bit x(1) in the first period of the codeword sequence is mapped to a third bit position $s_2(N-1)$ of the $N^{th}$ modulated bit, a first bit x(4N) in the third period of the codeword sequence is mapped to a fourth bit position $s_3(N-1)$ of the $N^{th}$ modulated bit, a first bit x(2N) in the second period of the codeword sequence is mapped to a fifth bit position $s_4(N-1)$ of the $N^{th}$ modulated bit, and a first bit x(0) in the first period of the codeword sequence is mapped to a sixth bit position $s_5(N-1)$ of the $N^{th}$ modulated bit.

Figure 32:
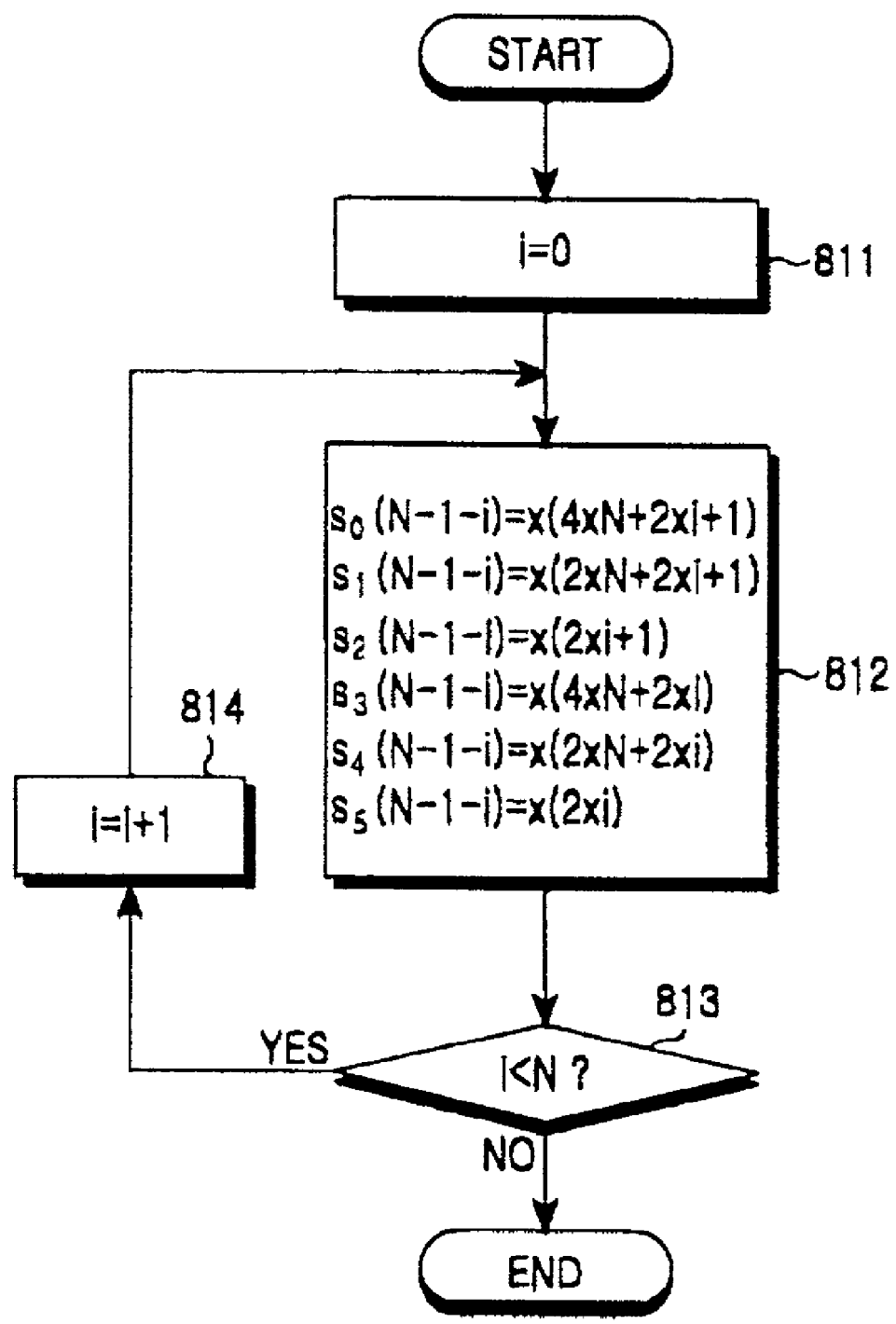
FIG. 32 illustrates a procedure for performing a bit rearrangement operation for 64QAM modulation in which a higher power level is allocated to the rear part of the codeword sequence according to an embodiment of the present invention.

FIG. 32 illustrates a procedure for performing a bit rearrangement operation for 64QAM modulation in which a higher power level is allocated to the rear part of the codeword sequence according to an embodiment of the present invention. This procedure is performed by the sequence mapper 130 of FIG. 1.

Referring to FIG. 32, in step 811, the sequence mapper 130 sets i to zero (i=0). In step 812, the sequence mapper 130 performs an operation of rearranging the bits of the codeword sequence in the corresponding bit positions of the modulated bit in accordance with Equations (37) to (42). That is, the sequence mapper 130 maps a bit x(4×N+2×i+1) in a bit stream of the codeword sequence to a first bit position $s_0(N-1-i)$ of an $\{N-1-i\}^{th}$ modulated, maps a bit x(2×N+2×i+1) in the bit stream of the codeword sequence to a second bit position $s_1(N-1-i)$ of the $\{N-1-i\}^{th}$ modulated bit, maps a bit x(2×i+1) in the bit stream of the codeword sequence to a third bit position $s_2(N-1-i)$ of the $\{N-1-i\}^{th}$ modulated bit, maps a bit x(4×N+2×i) in the bit stream of the codeword sequence to a fourth bit position $s_3(N-1-i)$ of the $\{N-1-i\}^{th}$ modulated bit, maps a bit x(2×N+2×i) in the bit stream of the codeword sequence to a fifth bit position $s_4(N-1-i)$ of the $\{N-1-i\}^{th}$ modulated bit, and maps a bit x(2×i) in the bit stream of the codeword sequence to a sixth bit position $s_5(N-1-i)$ of the $\{N-1-i\}^{th}$ modulated bit. The operation of step 812 is repeatedly performed until it is determined in step 813 that the bit mapping has been completely performed on all the bits of the codeword sequence. That is, if it is determined in step 813 that i is less than N, the sequence mapper 130 increases i by 1 in step 814, and then returns to step 812.

Heretofore, the description has been made of the operation of rearranging the output codeword sequence bits of the channel encoder or the channel interleaver before modulation according to the embodiments of the present invention. Next, a description will be made of an operation of arranging output values of a demodulator in the order of the original codeword sequence before channel decoding or channel deinterleaving.

The operation of arranging the output values of the demodulator in the order of the original codeword sequence is achieved by reversly performing the above-described rearranging operation. If an output sequence of the demodulator is represented by $\{t_0(i), \ldots, t_{m-1}(i)\}$ (where i∈$\{0, \ldots, N-1\}$) and the sequence arranged in the original order before channel decoding or channel deinterleaving is represented by $\{y_0, \ldots, y_k, \ldots, y_{N \times m-1}\}$, then a method of arranging output values of the demodulator in the original order before channel decoding or channel deinterleaving can be expressed by shifting the right terms of Equations (17) to (42) to the left terms while substituting 'y' for 'x', and shifting the left terms to the right terms while substituting 't' for 's'. For example, Equation (42) can be changed to $y_{(2 \times i)}=t_5(N-1-i)$, and used in arranging the output values of the demodulator in the original order.

Performance Analysis

Figure 33:
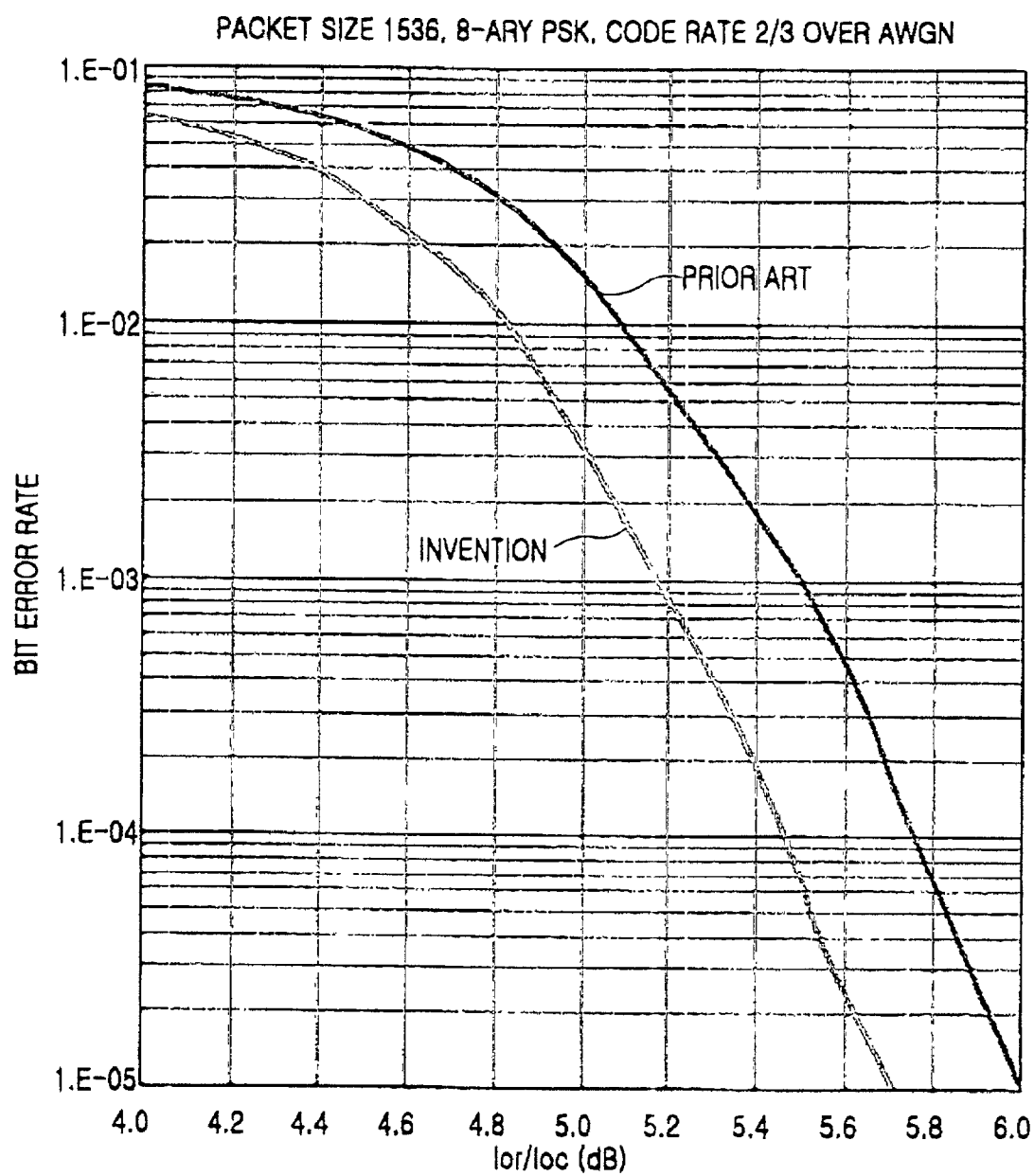
FIG. 33 illustrates average bit error rate performance of the present invention in comparison with that of the prior art for 8PSK modulation in the case where power is uniformly allocated to a codeword sequence.

FIG. 33 illustrates average bit error rate performance of the present invention in comparison with that of the prior art for 8PSK modulation in the case where power is uniformly allocated to a codeword sequence.

Figure 34:
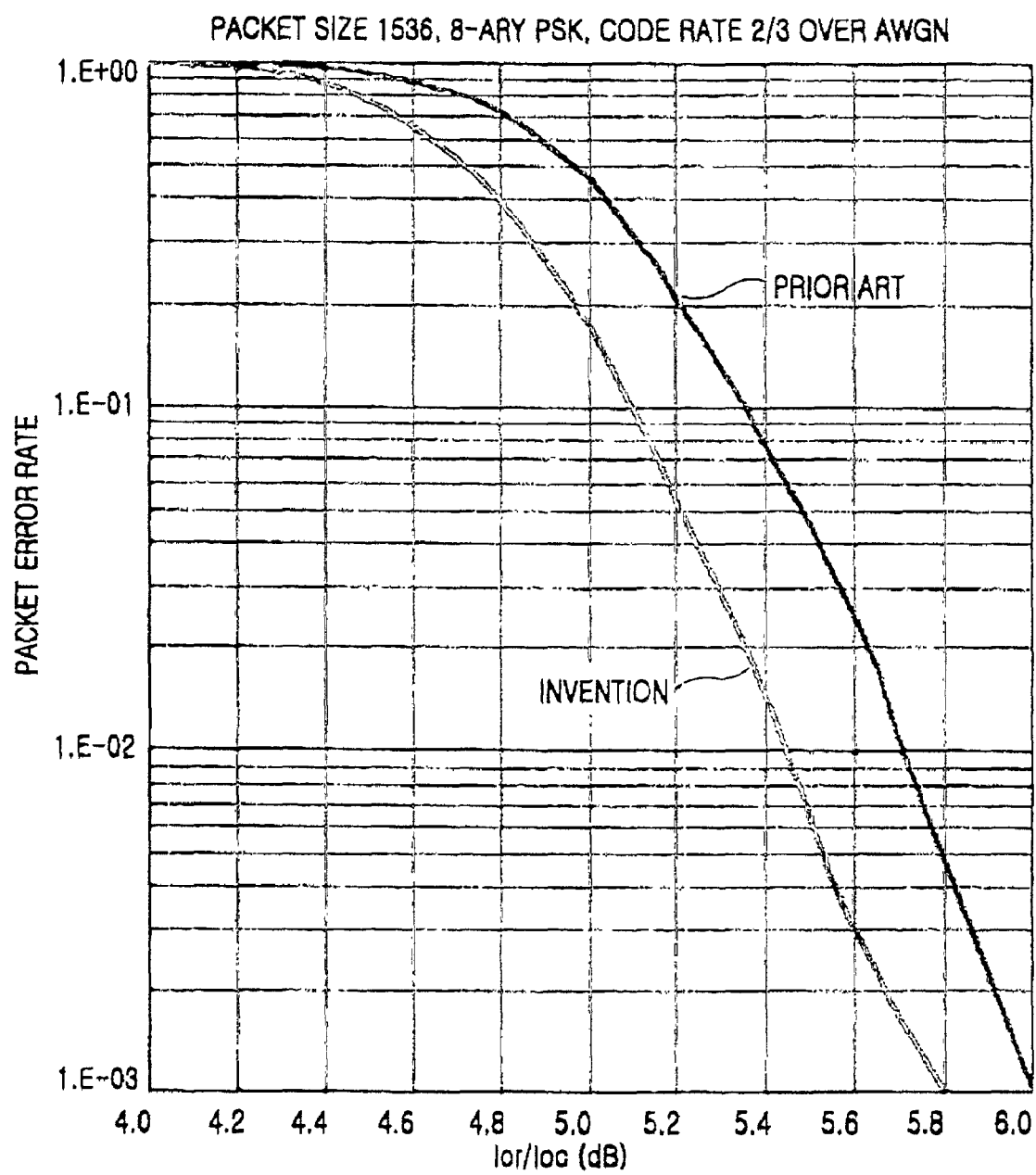
FIG. 34 illustrates average packet error rate performance of the present invention in comparison with that of the prior art for 8PSK modulation in the case where which power is uniformly allocated to a codeword sequence.

FIG. 34 illustrates average packet error rate performance of the present invention in comparison with that of the prior art for 8PSK modulation in the case where which power is uniformly allocated to a codeword sequence.

Figure 35:
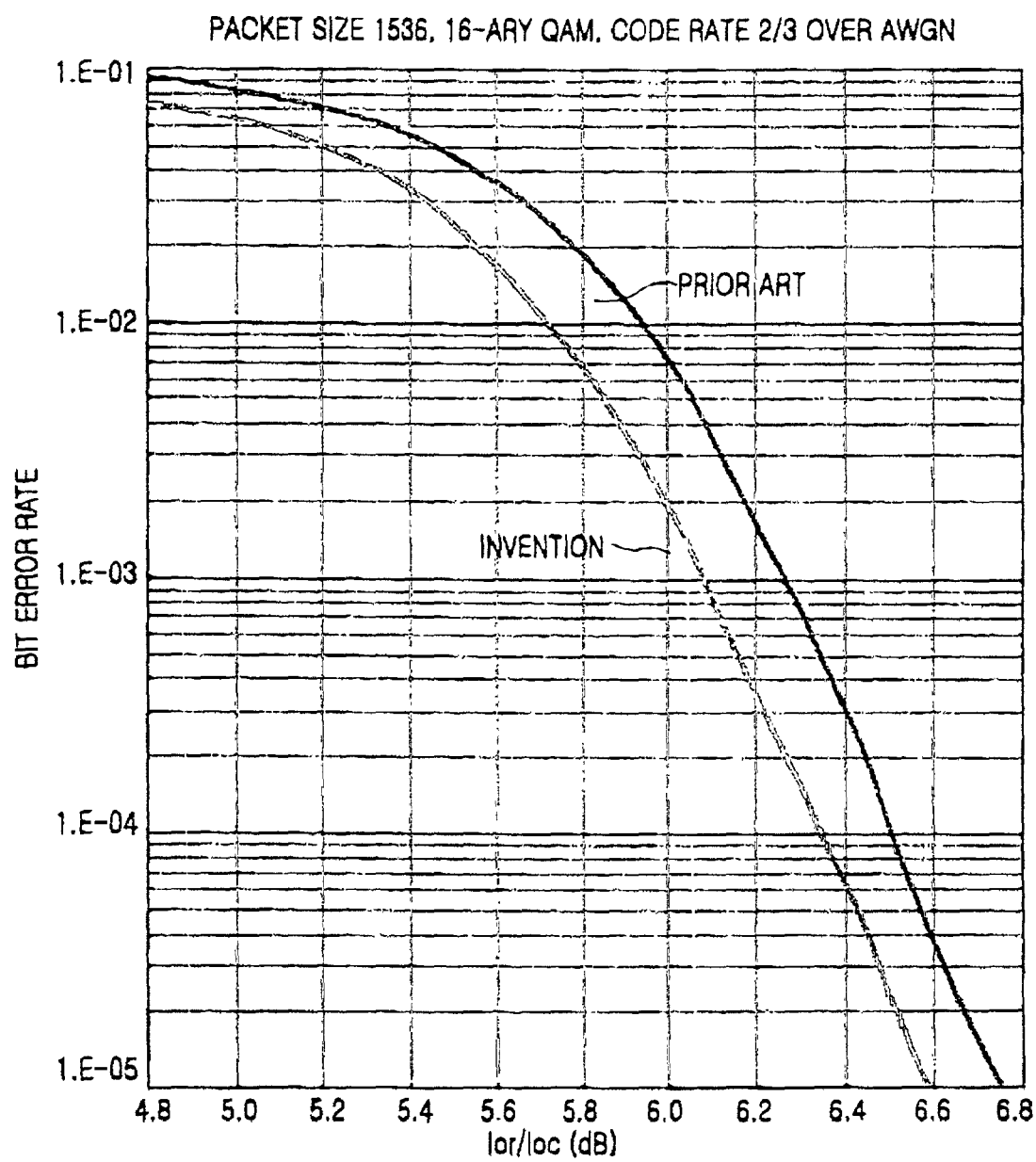
FIG. 35 illustrates average bit error rate performance of the present invention in comparison with that of the prior art for 16QAM modulation in the case where power is uniformly allocated to a codeword sequence.

FIG. 35 illustrates average bit error rate performance of the present invention in comparison with that of the prior art for 16QAM modulation in the case where power is uniformly allocated to a codeword sequence.

Figure 36:
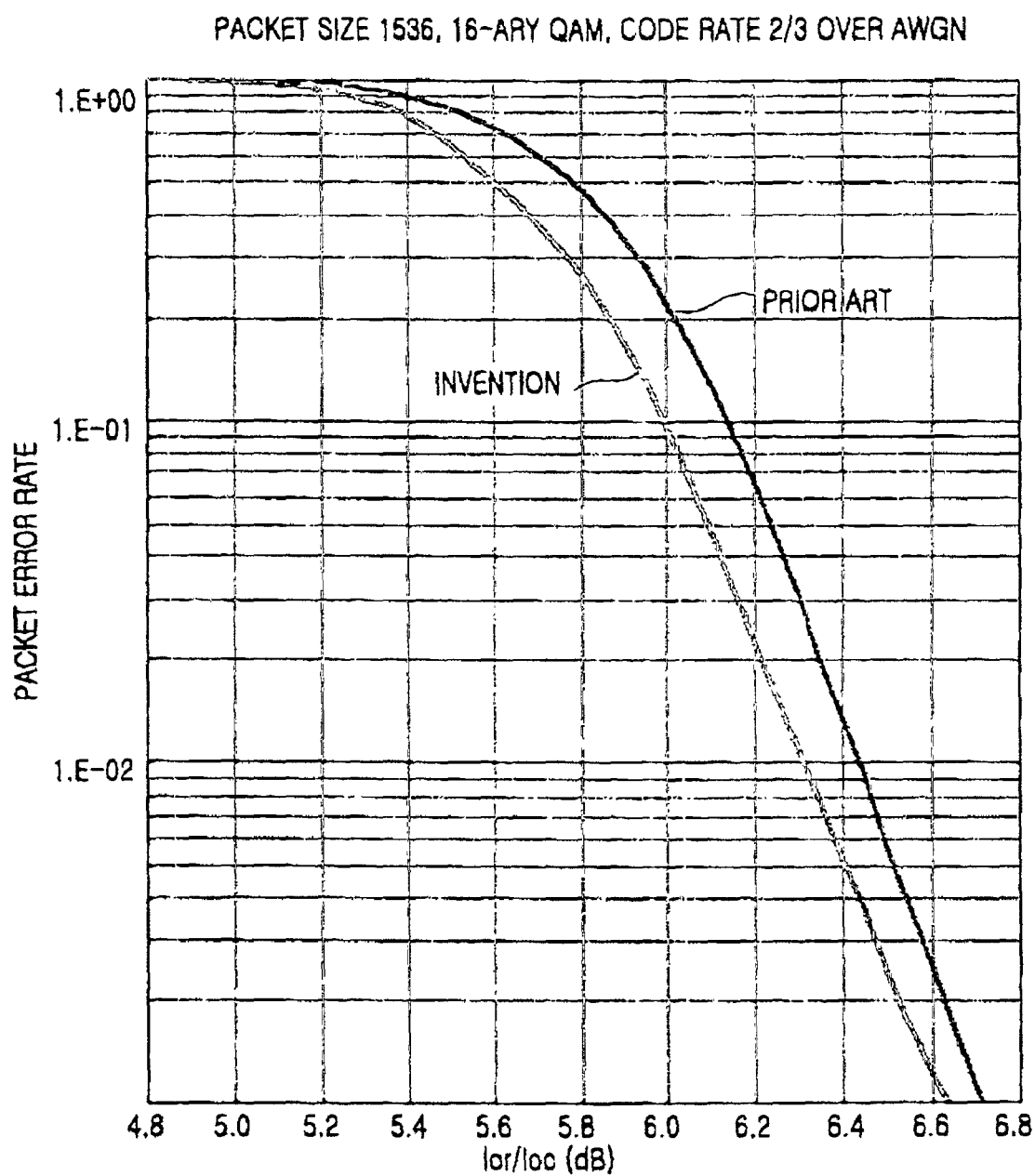
FIG. 36 illustrates average packet error rate performance of the present invention in comparison with that of the prior art for 16QAM modulation in the case where which power is uniformly allocated to a codeword sequence.

FIG. 36 illustrates average packet error rate performance of the present invention in comparison with that of the prior art for 16QAM modulation in the case where which power is uniformly allocated to a codeword sequence.

It is noted from FIGS. 33 to 36 that the codeword sequence bits rearranged according to the embodiments of the present invention show better performance than the non-rearranged codeword sequence bits of the prior art.

As described above, the communication system using multi-level modulation having a higher modulation level than QPSK modulation according to the present invention rearranges output codeword sequence bits of the channel encoder or the channel interleaver before modulation, such that the bits belonging to a systematic part are arranged in bit positions with higher reliability of the bits constituting a multi-level modulated bit, and arranging output values of the demodulator in the original order before channel decoding or channel deinterleaving, thus contributing to an improvement in the average bit error rate and the average packet error rate. In addition, the sequence rearrangement method according to the present invention can be implemented without an increase in system complexity and time delay.

While the invention has been shown and described with reference to a certain preferred embodiment thereof, it will be understood by those skilled in the art that various changes in form and details may be made therein without departing from the spirit and scope of the invention as defined by the appended claims. For example, although the invention has been described with reference to the 8PSK, 16QAM and 64QAM modulations, the sequence rearrangement method according to the present invention can also be applied to other modulations.

What is claimed is:

1. A method for mapping a stream of bits output from an encoder to a stream of bits for 8PSK (8-ary Phase Shift Keying) modulation, comprising the steps of:
    dividing the stream of bits from the turbo encoder into a first period and a second period, wherein the first period includes bits with higher priority and the second period includes bits with lower priority, wherein the stream of bits output from the turbo encoder is comprised of N bits, N is a positive integer, the first period includes first to $\{(2/3) \times N\}^{th}$ bits, and the second period includes $\{2/3) \times N+1\}^{th}$ to $N^{th}$ bits; and
    sequentially mapping the bits in the first period to bit positions with higher reliability in a stream of rearranged bits, and mapping the bits in the second period to bit positions with lower reliability in the stream of rearranged bits, said stream of rearranged bits comprising segments of 3 consecutive bits representing the bit positions of each 8PSK modulation symbol.

2. The method as claimed in claim 1, wherein the bit positions with higher reliability include second and third bit positions in the stream of 3 bits representing each of the bits for 8PSK modulation.

3. The method as claimed in claim 1, wherein the bit positions with lower reliability include a first bit position in the stream of 3 bits representing each of the bits for 8PSK modulation.

4. The method as claimed in claim 1, wherein the bits existing in the first period are mapped to the bit positions with higher reliability determined by $$b_{3 \times \lfloor k/2 \rfloor + (k \bmod 2) + 1} = d_k$$

where d indicates the bits existing in the first period, b indicates the bits with higher reliability, k indicates positions of the bits, 'A mod B' indicates a remainder obtained by dividing A by B, and $\lfloor X \rfloor$ indicates a maximum integer less than X.

5. The method as claimed in claim 1, wherein the bits existing in the first period are mapped to the bit positions with higher reliability determined by $$b_{1 \times (N-1) - (3 \times \lfloor k/2 \rfloor + (k \bmod 2))} = d_k$$

where d indicates the bits existing in the first period, b indicates the bits with higher reliability, k indicates positions of the bits, 'A mod B' indicates a remainder obtained by dividing A by B, and $\lfloor x \rfloor$ indicates a maximum integer less than X.

6. The method as claimed in claim 1, wherein the bits existing in the second period are mapped to the bit positions with lower reliability determined by $$b_{3 \times k - 2 \times N} = d_k$$

where d indicates the bits existing in the second period, b indicates the bits with lower reliability, and k indicates positions of the bits.

7. The method as claimed in claim 1, wherein the bits existing in the second period are mapped to the bit positions with lower reliability determined by $$b_{3 \times (N-1) - 3 \times k} = d_k$$

where d indicates the bits existing in the second period, b indicates the bits with lower reliability, and k indicates positions of the bits.

8. A method for mapping a stream of bits output from a turbo encoder to a stream of bits for 16QAM (16-ary Quadrature Amplitude Modulation) modulation, comprising the steps of:
    dividing the stream of bits from the turbo encoder into a first period and a second period, wherein the first period includes bits with higher priority and the second period includes bits with lower priority, wherein the stream of bits output from the turbo encoder is comprised of N bits, N is a positive integer, the first period includes first to $\{(1/2) \times N\}^{th}$ bits, and the second period includes $\{(1/2) \times N+1\}^{th}$ to $N^{th}$ bits; and
    mapping the bits existing in the first period to bit positions with higher reliability in a stream of 4 bits representing each of the bits for 16 QAM modulation, and mapping the bits existing in the second period to bit positions with lower reliability in the stream of 4 bits.

9. The method as claimed in claim 8, wherein the bit positions with higher reliability include second and fourth bit positions in the stream of 4 bits representing each of the bits for 16QAM modulation.

10. The method as claimed in claim 8, wherein the bit positions with lower reliability include a first bit position and a third bit position in the stream of 4 bits representing each of the bits for 16QAM modulation.

11. The method as claimed in claim 8, wherein the bits existing in the first period are mapped to the bit positions with higher reliability determined by $$b_{2 \times k - 0 \times N + 1} = d_k$$

where d indicates the bits existing in the first period, b indicates the bits with higher reliability, and k indicates positions of the bits.

12. The method as claimed in claim 8, wherein the bits existing in the first period are mapped to the bit positions with higher reliability determined by $$b_{1\times(N-1)-2\times k}=d_k$$

where d indicates the bits existing in the first period, b indicates the bits with higher reliability, and k indicates positions of the bits.

13. The method as claimed in claim 8 wherein the bits existing in the second period are mapped to the bit positions with lower reliability determined by $$b_{2\times k-1\times N+0}=d_k$$

where d indicates the bits existing in the second period, b indicates the bits with lower reliability, and k indicates positions of the bits.

14. The method as claimed in claim 8, wherein the bits existing in the second period are mapped to the bit positions with lower reliability determined by $$b_{2\times(N-1)-2\times k}=d_k$$

where d indicates the bits existing in the second period, b indicates the bits with lower reliability, and k indicates positions of the bits.

15. A method for mapping a stream of bits output from turbo encoder to a stream of bits for 64QAM (64-ary Quadrature Amplitude Modulation) modulation, comprising the steps of:

dividing the stream of bits from the turbo encoder into a first period, a second period and a third period, wherein the first period includes bits with higher priority, the second period includes bits with lower priority and the third period includes bits having lower priority than the bits in the first period and having higher priority than the bits in the second period, the stream of bits output from the turbo encoder is comprised of N bits, N is a positive integer, the first period includes first to $\{(1/3)\times N\}^{th}$ bits, the second period includes $\{(2/3)\times N+1\}^{th}$ to $N^{th}$ bits, and the third period includes $\{(1/3)\times N+1\}^{th}$ to $\{(2/3)\times N\}^{th}$ bits; and mapping the bits existing in the first period to bit positions with higher reliability in a stream of 6 bits representing each of the bits for 64QAM modulation, mapping the bits existing in the second period to bit positions with lower reliability in the stream of 6 bits, and mapping the bits existing in the third period to bit positions having lower reliability than the bits with higher reliability and having higher reliability than the bits with lower reliability in the stream of 6 bits.

16. The method as claimed in claim 15, wherein the bit positions with higher reliability include third and sixth bit positions in the stream of 6 bits representing each of the bits for 64QAM modulation.

17. The method as claimed in claim 15, wherein the bit positions with lower reliability include first and fourth bit positions in the stream of 6 bits representing each of the bits for 64QAM modulation.

18. The method as claimed in claim 15, wherein the bit positions corresponding to the bits existing in the third period include second and fifth bit positions in the stream of 6 bits representing each of the bits for 64 QAM.

19. The method as claimed in claim 15, wherein the bits existing in the first period are mapped to the bit positions with higher reliability determined by $$b_{3\times k-0\times N+2}=d_k$$

where d indicates the bits existing in the first period, b indicates the bits with higher reliability, and k indicates positions of the bits.

20. The method as claimed in claim 15, wherein the bits existing in the first period are mapped to the bit positions with higher reliability determined by $$b_{1\times(N-1)-3\times k}=d_k$$

where d indicates the bits existing in the first period, b indicates the bits with higher reliability, and k indicates positions of the bits.

21. The method as claimed in claim 15, wherein the bits existing in the second period are mapped to the bit positions with lower reliability determined by $$b_{3\times k-2\times N+0}=d_k$$

where d indicates the bits existing in the second period, b indicates the bits with lower reliability, and k indicates positions of the bits.

22. The method as claimed in claim 15, wherein the bits existing in the second period are mapped to the bit positions with lower reliability determined by $$b_{3\times(N-1)-3\times k}=d_k$$

where d indicates the bits existing in the second period, b indicates the bits with lower reliability, and k indicates positions of the bits.

23. The method as claimed in claim 15, wherein the bits existing in the third period are mapped to the bit positions determined by the following equation $$b_{3\times k-1\times N+1}=d_k$$

where d indicates the bits existing in the third period, b indicates the bits with medium reliability, and k indicates positions of the bits.

24. The method as claimed in claim 15, wherein the bits existing in the third period are mapped to the bit positions determined by the following equation $$b_{2\times(N-1)-3\times k}=d_k$$

where d indicates the bits existing in the third period, b indicates the bits with medium reliability, and k indicates positions of the bits.

25. A transmission apparatus in a communication system, comprising:

a turbo encoder;

a sequence mapper for dividing a stream of bits from the turbo encoder into a first period and a second period, the first period including bits with higher priority and the second period including bits with lower priority, and for mapping the bits existing in the first period to bit positions with higher reliability and the bits existing in the second period to bit positions with lower reliability in a stream of 3 bits representing each of the bits for 8PSK modulation, wherein when the stream of bits output from the turbo encoder is comprised of N bits, N is a positive integer, the first period includes first to $\{(2/3)\times N\}^{th}$ bits, and the second period includes $\{(2/3)\times N+1\}^{th}$ to $N^{th}$ bits; and a modulator for 8PSK modulating the mapped bits.

26. The transmission apparatus as claimed in claim 25, wherein the bit positions with higher reliability include second and third bit positions in the stream of 3 bits representing each of the bits for 8PSK modulation.

27. The transmission apparatus as claimed in claim 25, wherein the bit positions with lower reliability include a first bit position in the stream of 3 bits representing each of the bits for 8PSK modulation.

28. The transmission apparatus as claimed in claim 25, wherein the sequence mapper maps the bits existing in the first period to the bit positions with higher reliability determined by $$b_{3\times\lfloor k/2 \rfloor+(k \bmod 2)+1}=d_k$$

where d indicates the bits existing in the first period, b indicates the bits with higher reliability, k indicates positions of the bits, 'A mod B' indicates a remainder obtained by dividing A by B, and $\lfloor X \rfloor$ indicates a maximum integer less than X.

29. The transmission apparatus as claimed in claim 25, wherein the sequence mapper maps the bits existing in the first period to the bit positions with higher reliability determined by $$b_{1\times(N-1)-(3\times\lfloor k/2 \rfloor+(k \bmod 2))}=d_k$$

where d indicates the bits existing in the first period, b indicates the bits with higher reliability, k indicates positions of the bits, 'A mod B' indicates a remainder obtained by dividing A by B, and $\lfloor X \rfloor$ indicates a maximum integer less than X.

30. The transmission apparatus as claimed in claim 25, wherein the sequence mapper maps the bits existing in the second period to the bit positions with lower reliability determined by $$b_{3\times k-2\times N}=d_k$$

where d indicates the bits existing in the second period, b indicates the bits with lower reliability, and k indicates positions of the bits.

31. The transmission apparatus as claimed in claim 25, wherein the sequence mapper maps the bits existing in the second period to the bit positions with lower reliability determined by $$b_{3\times(N-1)-3\times k}=d_k$$

where d indicates the bits existing in the second period, b indicates the bits with lower reliability, and k indicates positions of the bits.

32. A transmission apparatus in a communication system, comprising:

a turbo encoder;

a sequence mapper for dividing the stream of bits from the turbo encoder into a first period and a second period, the first period including bits with higher priority and the second period including bits with lower priority, and for mapping the bits existing in the first period to bit positions with higher reliability and the bits existing in the second period to bit positions with lower reliability in a stream of 4 bits representing each of the modulated bits, wherein the stream of bits output from the turbo encoder is comprised of N bits, N is a positive integer, the first period includes first to $\{(1/2)\times N\}^{th}$ bits, and the second period includes $\{(1/2)\times N+1\}^{th}$ to $N^{th}$ bits; and a modulator for 16QAM modulating the mapped bits.

33. The transmission apparatus as claimed in claim 32, wherein the bit positions with higher reliability include second and fourth bit positions in the stream of 4 bits representing each of the bits for 16QAM modulation.

34. The transmission apparatus as claimed in claim 32, wherein the bit positions with lower reliability include first and third bit positions in the stream of 4 bits representing each of the bits for 16QAM modulation.

35. The transmission apparatus as claimed in claim 32, wherein sequence mapper maps the bits existing in the first period to the bit positions with higher reliability determined by $$b_{2\times k-0\times N+1}=d_k$$

where d indicates the bits existing in the first period, b indicates the bits with higher reliability, and k indicates positions of the bits.

36. The transmission apparatus as claimed in claim 32, wherein the sequence mapper maps the bits existing in the first period to the bit positions with higher reliability determined by $$b_{1\times(N-1)-2\times k}=d_k$$

where d indicates the bits existing in the first period, b indicates the bits with higher reliability, and k indicates positions of the bits.

37. The transmission apparatus as claimed in claim 32, wherein the sequence mapper maps the bits existing in the second period to the bit positions with lower reliability determined by $$b_{2\times k-1\times N+0}=d_k$$

where d indicates the bits existing in the second period, b indicates the bits with lower reliability, and k indicates positions of the bits.

38. The transmission apparatus as claimed in claim 32, wherein the sequence mapper maps the bits existing in the second period to the bit positions with lower reliability determined by $$b_{2\times(N-1)-2\times k}=d_k$$

where d indicates the bits existing in the second period, b indicates the bits with lower reliability, and k indicates positions of the bits.

39. A transmission apparatus in a communication system, comprising:

a turbo encoder;

a sequence mapper for dividing the stream of bits from the turbo encoder into a first period, a second period and a third period, the first period including bits with higher priority, the second period including bits with lower priority and the third period including bits having lower priority than the bits in the first period and having higher priority than the bits in the second period, for mapping the bits existing in the first period to bit positions with higher reliability in a stream of 6 bits representing each of the modulated bits, for mapping the bits existing in the second period to bit positions with lower reliability in the stream of 6 bits, and for mapping the bits existing in the third period to bit positions having lower reliability than the bits with higher reliability and having higher reliability than the bits with lower reliability in the stream of 6 bits, wherein when the stream of bits output from the turbo encoder is comprised of N bits, N is a positive integer, the first period includes first to $\{(1/3)\times N\}^{th}$ bits, the second period includes $\{(2/3)\times N+1\}^{th}$ to $N^{th}$ bits, and the third period includes $\{(1/3)\times N+1\}^{th}$ to $\{(2/3)\times N\}^{th}$ bits; and a modulator for 64QAM (64-ary Quadrature Amplitude Modulation) modulating the mapped bits.

40. The transmission apparatus as claimed in claim 39, wherein the bit positions with higher reliability include third and sixth bit positions in the stream of 6 bits representing each of the bits for 64QAM modulation.

41. The transmission apparatus as claimed in claim 39, wherein the bit positions with lower reliability include first and fourth bit positions in the stream of 6 bits representing each of the bits for 64QAM modulation.

42. The transmission apparatus as claimed in claim 39, wherein the bit positions corresponding to the bits existing in the third period include second and fifth bit positions in the stream of 6 bits representing each of the bits for 64QAM modulation.

43. The transmission apparatus as claimed in claim 39, wherein the sequence mapper maps the bits existing in the first period to the bit positions with higher reliability determined by $$b_{3 \times k - 0 \times N + 2} = d_k$$

where d indicates the bits existing in the first period, b indicates the bits with higher reliability, and k indicates positions of the bits.

44. The transmission apparatus as claimed in claim 39, wherein the sequence mapper maps the bits existing in the first period to the bit positions with higher reliability determined by $$b_{1 \times (N-1) - 3 \times k} = d_k$$

where d indicates the bits existing in the first period, b indicates the bits with higher reliability, and k indicates positions of the bits.

45. The transmission apparatus as claimed in claim 39, wherein the sequence mapper maps the bits existing in the second period to the bit positions with lower reliability determined by $$b_{3 \times k - 2 \times N + 0} = d_k$$

where d indicates the bits existing in the second period, b indicates the bits with lower reliability, and k indicates positions of the bits.

46. The transmission apparatus as claimed in claim 39 wherein the sequence mapper maps the bits existing in the second period to the bit positions with lower reliability determined by $$b_{3 \times (N-1) - 3 \times k} = d_k$$

where d indicates the bits existing in the second period, b indicates the bits with lower reliability, and k indicates positions of the bits.

47. The transmission apparatus as claimed in claim 39, wherein the sequence mapper maps the bits existing in the third period to the bit positions determined by the following equation $$b_{3 \times k - 1 \times N + 1} = d_k$$

where d indicates the bits existing in the third period, b indicates the bits with medium reliability, and k indicates positions of the bits.

48. The transmission apparatus as claimed in claim 39, wherein the sequence mapper maps the bits existing in the third period to the bit positions determined by the following equation $$b_{2 \times (N-1) - 3 \times k} = d_k$$

where d indicates the bits existing in the third period, b indicates the bits with medium reliability, and k indicates positions of the bits.

* * * * *